US012732867B2

(12) United States Patent
Thyagaturu et al.

(10) Patent No.: US 12,732,867 B2
(45) Date of Patent: Sep. 8, 2026

(54) EDGE COMPUTING OVER DISAGGREGATED RADIO ACCESS NETWORK FUNCTIONS

(71) Applicant: Intel Corporation, Santa Clara, CA (US)

(72) Inventors: Akhilesh Thyagaturu, Tempe, AZ (US); Mohit Garg, Hisar (IN); Vinodh Gopal, Westborough, MA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 17/704,658

(22) Filed: Mar. 25, 2022

(65) Prior Publication Data

US 2022/0232423 A1 Jul. 21, 2022

(51) Int. Cl.
*H04W 28/18* (2009.01)
*H04W 28/10* (2009.01)

(52) U.S. Cl.
CPC ........... *H04W 28/18* (2013.01); *H04W 28/10* (2013.01)

(58) Field of Classification Search
CPC .............................. H04W 28/10; H04W 28/18
See application file for complete search history.

(56) References Cited

U.S. PATENT DOCUMENTS

2022/0159090 A1* 5/2022 Ding ....................... H04L 67/60
2022/0159501 A1* 5/2022 Chou ....................... H04L 41/40
2022/0264335 A1* 8/2022 Ramamurthi ....... H04L 43/0829
2022/0417122 A1* 12/2022 Chou ................ H04W 28/0268

OTHER PUBLICATIONS

"Transforming the Telecommunications Industry with AMD EPYC Powered Solutions", AMD Solution Brief, 6 pages (Feb. 2019), https://www.amd.com/system/files/transforming-telecommunications-industry-epyc-powered-solutions.pdf.
"Flexible Performance for 5G vRAN Deployments", Workload Brief 0321/DL/MESH/338359-001US, Intel Corp., 3 bages (Mar. 29, 2021), https://www.intel.com/content/www/us/en/communications/flexible-performance-cost-efficiency-5g-vran-brief.html.
"E2E Network Slicing Architecture", Version 1.0, GSM Association, Official Document NG. 127, 48 pages (Jun. 3, 2021).
Chopra et al., "Intelligent 5G L2 Mac Scheduler: Powered by Capgemini NetAnticipate 5G on Intel Architecture", Capgemini Engineering and Intel Corp., 17 pages (last updated: Jun. 18, 2021), https://networkbuilders.intel.com/solutionslibrary/intelligent-5g-l2-mac-scheduler-powered-by-capgemini-hetanticipate-5g-on-intel-architecture.

(Continued)

*Primary Examiner* — Donald L Mills
(74) *Attorney, Agent, or Firm* — Essential Patents Group, LLP; Christopher K. Gagne

(57) ABSTRACT

The present disclosure describes edge computing over disaggregated radio access network (RAN) infrastructure through dynamic edge data extraction. Edge data is extracted at intermediate stages of RAN processing, provided to edge compute functions, and inserted back into the RAN processing pipeline. These mechanisms allow for the processing of edge data traffic much closer to the data source than existing approaches, which decreases the overall latency and delay. Additionally, these mechanisms do not require changes to already existing network protocols, allowing for non-complex adoption and implementation.

23 Claims, 11 Drawing Sheets

(56) References Cited

OTHER PUBLICATIONS

"Intel FPGA Programmable Acceleration Card N3000 Data Sheet", DS-1062, ID: 683260, version Jun. 30, 2021, Intel Corp., 31 pages (Jun. 30, 2021).
"Intel® QuickAssist Technology (Intel® QAT) and OpenSSL-1.1.0: Performance", White Paper, Doc No. 337003-001, rev. 001, Intel Corp., 24 pages (Jan. 2018).
"Unleash the Speed of 4G and 5G Virtualized Radio Access Networks (vRAN)", Intel® vRAN Dedicated Accelerator ACC100 Product Brief, 2 pages (Last Updated: Oct. 1, 2020), https://networkbuilders.intel.com/solutionslibrary/intel-vran-dedicated-accelerator-acc100-product-brief.
"How to build high-performance 5G networks with vRAN and O-RAN?", @QCOMResearch, Qualcomm Technologies, Inc., 25 pages (Feb. 17, 2021), https://www.qualcomm.com/content/dam/qcomm-martech/dm-assets/documents/how_to_build_high-performance_5g_networks_with_vran_pdf-2.pdf.
"Virtualized Radio Access Network: Architecture, Key technologies and Benefits", Technical Report, Samsung Electronics Co., Ltd., 16 pages (Nov. 8, 2019), https://images.samsung.com/is/content/samsung/assets/global/business/networks/insights/white-papers/virtualized-radio-access-network/white-paper_virtualized-radio-access-network_1.pdf.
"Virtualized RAN—vol. 2", Technical White Paper, Samsung Electronics Co., Ltd., 16 pages (Apr. 2021), https://images.samsung.com/is/content/samsung/assets/global/business/networks/insights/white-papers/0406_virtualized-ran-vol-2/Virtualized_RAN-Vol-2.pdf.
"3rd Generation Partnership Project; Technical Specification Group Radio Access Network; NG-RAN; Architecture description (Release 16)", 3GPP TS 38.401 V16.8.0, 79 pages (Dec. 2021).
"Common Public Radio Interface: eCPRI Interface Specification", eCPRI Specification V2.0, 109 pages (May 10, 2019).
"Common Public Radio Interface: Requirements for the eCPRI Transport Network", eCPRI Transport Network V1.2, 16 pages (Jun. 25, 2018).
"5G iMEC Networking Platform",gigabyte.com white paper version 1.0, 8 pages (May 2019), https://www.gigabyte.com/Solutions/5g-imec-networking-platform.
Markis et al., "Employing MEC in the Cloud-RAN: An Experimental Analysis", Proceedings of the 2018 on Technologies for the Wireless Edge Workshop, pp. 15-19 (available online: Oct. 2018).
Pham et al., "A Survey of Multi-Access Edge Computing in 5G and Beyond: Fundamentals, Technology Integration, and State-of-the-Art", arXiv:1906.08452v2 [cs.NI], 43 pages (Jan. 2, 2020).
"7 Principles of AT&T's Network Transformation Disaggregation, Cloud, and Intelligent SDN", Version 0.7.3 Q2 2020, AT&T Intellectual Property, 10 pages (Apr. 29, 2020).
Knopp et al., "Prototyping of Next Generation Fronthaul Interfaces (NGFI) using OpenAirInterface", EURECOM, France, OpenAirInterfaceTM, 6 pages (Aug. 2016), https://openairinterface.org/community/whitepapers/prototyping-of-next-generation-fronthaul-interfaces-ngfi-using-openairinterface/.
Maiden et al., "IEEE1914.3™ Standard for Radio over Ethernet Encapsulations and Mappings", IEEE Standards Association, NGNM Forum, Seattle, 27 pages (Oct. 25, 2017).
Nasrallah et al., "Ultra-Low Latency (ULL) Networks: A Comprehensive Survey Covering the IEEE Tsn Standard and Related ULL Research", arXiv:1803.07673v1 [cs.NI], 59 pages (Mar. 20, 2018).
Petr Lédl, "Open, Intelligent & Disaggregated RAN", TMobile Network Trials & Integration Lab, 10 pages (Sep. 2020).
"Telecom Infra Project Explainer 101", Telecom Infra Project, Inc., 2 pages (Dec. 16, 2021), https://brandfolder.com/s/w3t9p6mvwmm9hhjhb7cq8x6.
Seetharaman et al., "ONAP Network Slicing Joint Proposal for Frankfurt", Open Network Automation Platform (ONAP), 27 pages (Oct. 22, 2019).
Kyriakos Exadaktylos, "Building an Open RAN Ecosystem for Europe for Europe to lead in this essential innovation", Vodafone Spain, 29 pages (Nov. 17, 2021), https://www.vodafone.com/sites/default/files/2021-11/building-open-ran-ecosystem-europe.pdf.
Vimal Begwani, "ORAN Status Report", Open Network Automation Platform (ONAP), 15 pages (Oct. 28, 2019), https://wiki.onap.org/display/DW/October+28%2C+2019?preview=%2F71834738%2F71834802%2FORAN_Status_10282019.pdf.
Rodman Stuhlmuller, "O-RAN: Towards an Open and Smart Ran", O-Ran Alliance White Paper, O-RAN Alliance e.V., 19 pages (Oct. 17, 2018), https://assets-global.website-files.com/60b4ffd4ca081979751b5ed2/60e5afb502810a0947b3b9d0_O-RAN%2BWP%2BFInal%2B181017.pdf.
Israel et al., "OSM White Paper—OSM Release FIVE Technical Overview", ETSI, 1st edition, 19 pages (Jan. 2019).

* cited by examiner 302
301
306
1 RB
305
310
316
311
315
400
MAC Layer
RAN Function 410
401
RIC 202
EdgeCompute_Resources_scheduling_info
edge_compute_info; and
edge_data_info
data_extraction_info
402
403
RAN Function $f_x$ 411
(hosting Edge Compute Workload 236)
405
406
Edge Compute Workload 236

1350
1356
processor 1352
instructions 1381
acceleration circuitry 1364
edge devices 1362
1366
1366y
1366x
1366z
trusted execution environment 1390
edge cloud 1363
1360
network interface 1368
memory 1354
instructions 1382
sensors 1372
external interface 1370
actuators 1374
pos 1375
storage 1358
instructions 1383
battery 1326
battery monitor / charger 1328
power block 1380
output circuitry 1384
input circuitry 1386

EDGE COMPUTING OVER DISAGGREGATED RADIO ACCESS NETWORK FUNCTIONS

TECHNICAL FIELD

The present disclosure is generally related to edge computing technologies (ECTs), network disaggregation, and Radio Access Network (RAN) disaggregation, and in particular, to techniques and technologies for edge network disaggregation and/or edge computing over disaggregated network functions.

BACKGROUND

Traditional networking involves the use of various network devices, where each network device and all its components have a standardized hardware architecture with software in a standardized format, which may have been developed for a specific vendor and are usually purchased as a single package. However, the traditional network devices are not very customizable. Components and/or functions of network devices have begun to be made available separately from one another in order to provide versatility and customization. This separate of networking components and/or functionality is referred to as network disaggregation (sometimes referred to as "white box networking"). Network disaggregation allows network operators to customize their network devices by picking and choosing the specific networking components and network functions to fit specific use case(s), provide service level agreements (SLAs), and the like. Additionally, network disaggregation opens the possibility of optimizing network elements by combining hardware components with software elements to optimize the device's functionality.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

1. Disaggregated Edge Computing

1.1. System Architecture

Figure 1:
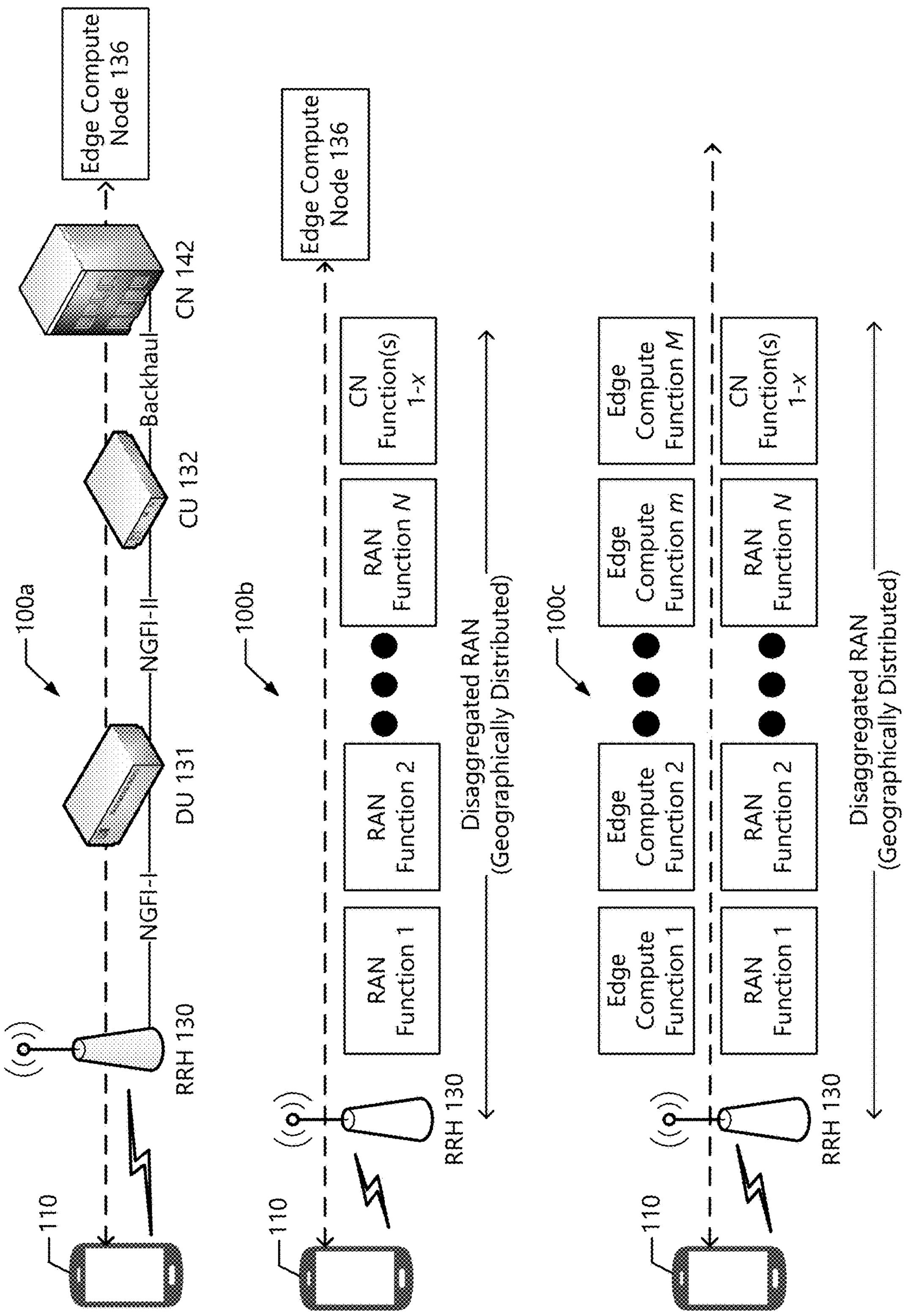
FIG. 1 depicts example edge computing capability at the intermediate RAN function nodes.

The present disclosure is related to edge disaggregation, which may also be referred to as edge network disaggregation, edge computing over disaggregated network functions, and/or the like. Existing and future wireless communication networks (e.g., 3GPP Fifth Generation (5G), 5G+, Sixth Generation (6G), and so forth) continue to attempt to increase the capacity of the wireless (air) interface, which often includes providing improved throughput and latency characteristics. One way applications can benefit from the high speed and seamless connectivity in the wireless access domain is through the use of edge computing technology (ECT). ECT allows user applications (apps) at endpoint devices to fully utilize the benefit of wireless networking services.

One goal of ECT is to provide user apps with the lowest possible latency. The ability of an ECT to provide the lowest possible latency depends in part on the relative position of individual edge compute nodes with respect to a user app (or a user device on which the user app operates). In other words, the latency experienced by a user device is lower the closer (e.g., in distance) the user device is to the edge compute node, assuming that channel conditions, edge node load and/or other conditions, and user device load and/or other conditions remain relatively stable and/or unchanged.

Currently, ECTs can be enabled only after traffic flows through an entirety of an access network before the edge compute node can decode and/or process the user data and interpret the app data. For example, when an access network is a 3GPP 5G/NR network, the traffic from the user device must flow through the NG-RAN (e.g., gNB and/or CU, DUs, and/or RUs in a CU/DU split architecture) and the 5G core network (5GC) (and the network functions (NFs) therein) before data traffic can be processed and/or interpreted by an edge compute node. This means that data traffic has to pass through several stages of Radio Access Network (RAN) node stack processing before reaching the edge compute node, which increases the overall delay of the data transmissions, especially when there are several nodes in a given RAN deployment. This delay may also be exacerbated when the data traffic has to propagate through various RAN elements/nodes that are geographically separated from one another, such as is the case with disaggregated RAN deployments.

The present disclosure provides various mechanisms for implementing edge computing over disaggregated RAN infrastructure through intermediate data extraction that enables low latency processing of apps. These mechanisms allow for the processing of data traffic much closer to the data source than existing approaches, which decreases the overall latency of the traffic. Additionally, the mechanisms discussed herein allow for dynamic data extraction at intermediate stages of RAN processing. Another benefit of the mechanisms discussed herein is that they require little to no changes to existing communication protocols, allowing the implementations herein to be readily applied and adopted. Furthermore, existing methods and technologies do not allow edge compute operations on a RAN function node as the context of user-data is not available at this processing stage. We propose a novel data extraction method, where the edge computing can be applied to disaggregated RAN achieving further low latencies as computing can be performed much closer to the user. Our proposed approach does not require any changes to 5G or other wireless standards or protocols, and would operate on the existing as well as future deployments.

FIG. 1 shows example network deployments including an example next generation fronthaul (NGF) deployment 100*a* where a user equipment (UE) 110 is connected to a remote radio head (RRH) 130 (also referred to as a "remote radio unit 130", "remote unit 130", or "RU 130") via an air interface, the RRH 130 is connected to a Digital Unit (DU) 131 via a NGF interface (NGFI)-I, the DU 131 is connected to a Central Unit (CU) 132 via an NGFI-II, and the CU 132 is connected to a core network (CN) 142 via a backhaul interface. In 3GPP NG-RAN implementations (see e.g., [TS38401]), the DU 131 may be a distributed unit (for purposes of the present disclosure, the term "DU" may refer to a digital unit and/or a distributed unit unless the context dictates otherwise). The UEs 110 may be the same or similar as the nodes 1020 and/or 1010 discussed infra with respect to FIG. 10, and the CN 142 may be the same or similar as CN 1042 discussed infra with respect to FIG. 10.

In some implementations, the NGF deployment 100*a* may be arranged in a distributed RAN (D-RAN) architecture where the CU 132, DU 131, and RRH 130 reside at a cell site and the CN 142 is located at a centralized site. Alternatively, the NGF deployment 100*a* may be arranged in a centralized RAN (C-RAN) architecture with centralized processing of one or more baseband units (BBUs) at the centralized site. In C-RAN architectures, the radio components are split into discrete components, which can be located in different locations. In one example C-RAN implementation, only the RRH 130 is disposed at the cell site, and the DU 131, the CU 132, and the CN 142 are centralized or disposed at a central location. In another example C-RAN implementation, the RRH 130 and the DU 131 are located at the cell site, and the CU 132 and the CN 142 are at the centralized site. In another example C-RAN implementation, only the RRH 130 is disposed at the cell site, the DU 131 and the CU 132 are located a RAN hub site, and the CN 142 is at the centralized site.

The CU 132 is a central controller that can serve or otherwise connect to one or multiple DUs 131 and/or multiple RUs 130. The CU 132 is network (logical) nodes hosting higher/upper layers of a network protocol functional split. For example, in the 3GPP NG-RAN and/or O-RAN architectures, a CU 132 hosts the radio resource control (RRC) (see e.g., 3GPP TS 36.331 v16.7.0 (2021 Dec. 23) and/or 3GPP TS 38.331 v16.7.0 (2021 Dec. 23) ("[TS38331]")), Service Data Adaptation Protocol (SDAP) (see e.g., 3GPP TS 37.324 v16.3.0 (2021 Jul. 6)), and Packet Data Convergence Protocol (PDCP) (see e.g., 3GPP TS 36.323 v16.5.0 (2020 Jul. 24) and/or 3GPP TS 38.323 v16.5.0 (2021 Aug. 28)) layers of a next generation NodeB (gNB), or hosts the RRC and PDCP protocol layers when included in or operating as an E-UTRA-NR gNB (en-gNB). The SDAP sublayer performs mapping between QoS flows and a data radio bearers (DRBs) and marking QoS flow IDs (QFI) in both DL and UL packets. The PDCP sublayer performs transfers user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery. In various implementations, a CU 132 terminates respective F1 interfaces connected with corresponding DUs 131 (see e.g., [TS38401]).

A CU 132 may include a CU-control plane (CP) entity (referred to herein as "CU-CP 132") and a CU-user plane (UP) entity (referred to herein as "CU-UP 132"). The CU-CP 132 is a logical node hosting the RRC layer and the control plane part of the PDCP protocol layer of the CU 132 (e.g., a gNB-CU for an en-gNB or a gNB). The CU-CP terminates an E1 interface connected with the CU-UP and the F1-C interface connected with a DU 131. The CU-UP 132 is a logical node hosting the user plane part of the PDCP protocol layer (e.g., for a gNB-CU 132 of an en-gNB), and the user plane part of the PDCP protocol layer and the SDAP protocol layer (e.g., for the gNB-CU 132 of a gNB). The CU-UP 132 terminates the E1 interface connected with the CU-CP 132 and the F1-U interface connected with a DU 131.

The DU 131 controls radio resources, such as time and frequency bands, locally in real time, and allocates resources to one or more UEs. The DUs 131 are network (logical) nodes hosting middle and/or lower layers of the network protocol functional split. For example, in the 3GPP NG-RAN and/or O-RAN architectures, a DU 131 hosts the radio link control (RLC) (see e.g., 3GPP TS 38.322 v16.2.0 (2021 Jan. 6) and 3GPP TS 36.322 v16.0.0 (2020 Jul. 24)), medium access control (MAC) (see e.g., 3GPP TS 38.321 v16.7.0 (2021 Dec. 23) and 3GPP TS 36.321 v16.6.0 (2021 Sep. 27) (collectively referred to as "[TSMAC]")), and high-physical (PHY) (see e.g., 3GPP TS 38.201 v16.0.0 (2020 Jan. 11) and 3GPP TS 36.201 v16.0.0 (2020 Jul. 14)) layers of the gNB or en-gNB, and its operation is at least partly controlled by the CU 132. The RLC sublayer operates in one or more of a Transparent Mode™, Unacknowledged Mode (UM), and Acknowledged Mode (AM). The RLC sublayer performs transfer of upper layer PDUs; sequence numbering independent of the one in PDCP (UM and AM); error Correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; and/or protocol error detection (AM only). The MAC sublayer performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding. In some implementations, a DU 131 can host a Backhaul Adaptation Protocol (BAP) layer (see e.g., 3GPP TS 38.340 v16.5.0 (2021 Jul. 7)) and/or a F1 application protocol (F1AP) (see e.g., 3GPP TS 38.470 v16.5.0 (2021 Jul. 1)), such as when the DU 131 is operating as an Integrated Access and Backhaul (IAB) node. One DU 131 supports one or multiple cells, and one cell is supported by only one DU 131. A DU 131 terminates the F1 interface connected with a CU 132. Additionally or alternatively, the DU 131 may be connected to one or more RRHs/RUs 130.

The RRH 130 is a transmission/reception point (TRP) or other physical node that handles radiofrequency (RF) processing functions. The RRH 130 is a network (logical) node hosting lower layers based on a lower layer functional split. For example, in 3GPP NG-RAN and/or O-RAN architectures, the RU/RRH 130 hosts low-PHY layer functions (e.g., fast Fourier transform (FFT), inverse FFT (iFFT), physical random access channel (PRACH) extraction, etc.) of the radio interface towards the UE 110.

Each of the CUs 132, DUs 131, and RUs 130 are connected through respective links, which may be any suitable wireless, wired (e.g., fiber, copper, etc.) links. In some implementations, various combinations of the CU 132, DU 131, and RU 130 may correspond to one or more of the NANs 1030 of FIG. 10. Additional aspects of CUs 132, DUs 131, and RUs 130 are discussed in [O-RAN], 3GPP TS 38.401 v16.8.0 (2021 Dec. 23) ("[TS38401]"), 3GPP TS 38.410 v 16.4.0 (2021 Oct. 1) ("[TS38410]"), and 3GPP TS 38.300 v 16.8.0 (2021 Dec. 23) ("[TS38300]"), the contents of each of which are hereby incorporated by reference in their entireties.

In some implementations, a fronthaul gateway function (FHGW) may be disposed between the DU 131 and the RU/RRU 130 (not shown by FIG. 1), where the interface between the DU 131 and the FHGW is an Open Fronthaul (e.g., Option 7-2x) interface, the interface between FHGW function and the RU/RRU 130 is an Open Fronthaul (e.g., Option 7-2x) interface or any other suitable interface (e.g., option 7, option 8, or the like) including those that do not support Open Fronthaul (e.g., Option 7-2x). The FHGW may be packaged with one or more other functions (e.g., Ethernet switching and/or the like) in a physical device or appliance. In some implementations, a RAN controller (e.g., RIC 202 of FIG. 2) may be communicatively coupled with the CU 132 and/or the DU 131.

NGFI (also referred to as "xHaul" or the like) is a two-level fronthaul architecture that separates the traditional RRU 130 to BBU connectivity in the C-RAN architecture into two levels, namely levels I and II. Level I connects the RRH 130 via the NGFI-I to the DU 131, and level II connects the DU 131 via the NGFI-II to the CU 132 as shown by deployment 100*a* in FIG. 1. The NGFI-I and NGFI-II connections may be wired connections or wireless connections, which may utilize any suitable RAT such as any of those discussed herein. The purpose of the two-level architecture is to distribute (split) the RAN node protocol functions between CU 132 and DU 131 such that latencies are relaxed, giving more deployment flexibilities. In general, the NGFI-I interfaces with the lower layers of the function split which have stringent delay and data rate requirements, whereas NGFI-II interfaces with higher layers of the function split relative to the layers of the NGFI-I, relaxing the requirements for the fronthaul link. Examples of the NGFI fronthaul interfaces and functional split architectures include O-RAN 7.2x fronthaul (see e.g., [ORAN-WG9.XPAAS] and [O-RAN.WG4.CUS]), Enhanced Common Radio Interface (CPRI) based C-RAN fronthaul (see e.g., *Common Public Radio Interface: eCPRI Interface Specification,* eCPRI Specification v2.0 (2019 May 10), *Common Public Radio Interface: Requirements for the eCPRI Transport Network,* eCPRI Transport Network v1.2 (2018-06-25), and [O-RAN.WG4.CUS]), Radio over Ethernet (RoE) based C-RAN fronthaul (see e.g., *IEEE Standard for Radio over Ethernet Encapsulations and Mappings*, IEEE Standards Association, IEEE 1914.3-2018 (5 Oct. 2018) ("[IEEE1914.3]")), and/or the like. Additional aspects of NGFI are also discussed in [ORAN-WG9.XPAAS], [O-RAN.WG4.CUS], *IEEE Standard for Packet-based Fronthaul Transport Networks*, IEEE Standards Association, IEEE 1914.1-2019 (21 Apr. 2020) ("[IEEE1914.1]"), [IEEE1914.3], and Nasrallah et al., *Ultra-Low Latency (ULL)Networks: A Comprehensive Survey Covering the IEEE TSN Standard and Related ULL Research,* arXiv: 1803.07673v1 [cs.NI] (20 Mar. 2018) ("[Nasrallah]"), the contents of each of which are hereby incorporated by reference in their entireties.

In one example, the deployment 100*a* may implement a low level split (LLS) (also referred to as a "Lower Layer Functional Split 7-2x" or "Split Option 7-2x") that runs between the RRH 130 (e.g., an O-RU in O-RAN architectures) and the DU 131 (e.g., an O-DU in O-RAN architectures) (see e.g., [O-RAN.WG7.IPC-HRD-Opt7]). In this example implementation, the NGFI-I is the Open Fronthaul interface described in the O-RAN Open Fronthaul Specification (see e.g., [O-RAN.WG4.CUS]). Other LLS options may be used such as the relevant interfaces described in other standards or specifications such as, for example, the 3GPP NG-RAN functional split (see e.g., [TS38401] and 3GPP TR 38.801 v14.0.0 (2017-04-03)), the Small Cell Forum for Split Option 6 (see e.g., 5*G small cell architecture and product definitions: Configurations and Specifications for companies deploying small cells* 2020-2025, Small Cell Forum, document 238.10.01 (5 Jul. 2020) ("[SCF238]"), 5*G NR FR*1 *Reference Design: The case for a common, modular architecture for 5G NR FR*1 *small cell distributed radio units*, Small Cell Forum, document 251.10.01 (15 Dec. 2021) ("[SCF251]"), and [O-RAN.WG7.IPC-HRD-Opt6], the contents of each of which are hereby incorporated by reference in their entireties), and/or in O-RAN white-box hardware Split Option 8 (e.g., [O-RAN.WG7.IPC-HRD-Opt8]).

Additionally or alternatively, the CUs 132, DUs 131, and/or RUs 130 may be IAB nodes. IAB enables wireless relaying in an NG-RAN where a relaying node (referred to as an "IAB-node") supports access and backhauling via 3GPP 5G/new radio (NR) links/interfaces. The terminating node of NR backhauling on the network side is referred to as an "IAB-donor", which represents a RAN node (e.g., a gNB) with additional functionality to support IAB. Backhauling can occur via a single or via multiple hops. All IAB-nodes that are connected to an IAB-donor via one or multiple hops form a directed acyclic graph (DAG) topology with the IAB-donor as its root. The IAB-donor performs centralized resource, topology and route management for the IAB topology. The IAB architecture is shown and described in [TS38300].

Although the NGF deployment 100*a* shows the CU 132, DU 131, RRH 130, and CN 142 as separate entities, in other implementations some or all of these network nodes can be bundled, combined, or otherwise integrated with one another into a single device or element, including collapsing some internal interfaces (e.g., F1-C, F1-U, E1, E2, and the like). At least the following implementations are possible: (i) integrating the CU 132 and the DU 131 (e.g., a CU-DU), which is connected to the RRH 130 via the NGFI-I; (ii) integrating the DU 131 and the RRH 130 integrated (e.g., CU-DU), which is connected to the CU 132 via NGFI-II; (iii) integrating a RAN controller (e.g., RIC 202 of FIG. 2) and the CU 132, which is connected to the DU 131 via NGFI-II; (iv) integrating the CU 132, the DU 131, and the RU 130, which is connected to the CN 142 via backhaul interface; and (v) integrating the network controller (or intelligent controller), the CU 132, the DU 131, and the RU 130. Any of the aforementioned example implementations involving the CU 132 may also include integrating the CU-CP 132 and CP-UP 132.

Deployment 100*a* has a relatively high latency (e.g., in comparison to network disaggregation deployment 100*b* and edge disaggregation deployment 100*c*) since the data has to propagate much deeper into the network, for example, by passing through several processing stages in the fronthaul (e.g., RRH 130 and DU 131), backhaul (e.g., DU 131 and/or CU 132), and CN 142, before reaching the edge compute node 136.

FIG. 1 also shows an example RAN disaggregation deployment 100*b* (also referred to as "disaggregated RAN 100*b*") where the UE 110 is connected to the RRH 130, and the RRH 130 is communicatively coupled with one or more of the RAN functions (RANFs) 1-N (where N is a number). The RANFs 1-N are disaggregated and distributed geographically across several component segments and network nodes. In some implementations, each RAN function 1-N is a software (SW) element operated by a physical compute node (e.g., computing node 1350 of FIG. 13) and the RRH 130 includes radiofrequency (RF) circuitry (e.g., an RF propagation module for a particular RAT and/or the like). In this example, the RANF 1 is operated on a physical compute node that is co-located with the RRH 130 and the other RANFs are disposed at locations further away from the RRH 130. Additionally in this example, the CN 142 is also disaggregated into CN functions 1-x (where x is a number) in a same or similar manner as the RANFs 1-N, although in other implementations the CN 142 is not disaggregated.

Network disaggregation (or disaggregated networking) involves the separation of networking equipment into functional components and allowing each component to be individually deployed. This may encompass separation of SW elements (e.g., NFs) from specific hardware (HW) elements and/or using application programming interfaces (APIs) to enable software defined network (SDN) and/or and NF Virtualization (NFV). RAN disaggregation involves network disaggregation and virtualization of various RANFs (e.g., RANFs 1-N in FIG. 1). The RANFs 1-N can be placed in different physical sites in various topologies in a RAN deployment based on the use case. This enables RAN function distribution and deployment over different geographic areas and allows a breakout of RANFs to support various use cases (e.g., low latency use cases and the like) as well as flexible RAN implementations. Disaggregation offers a common or uniform RAN platform capable of assuming a distinct profile depending on where it is deployed. This allows fewer fixed-function devices, and a lower total cost of ownership, in comparison with existing RAN architectures. Example RAN disaggregation frameworks are provided by Telecom Infra Project (TIP), Open Optical & Packet Transport (OOPT), O-RAN Alliance (see e.g., [O-RAN]), Reconfigurable Optical Add Drop Multiplexer (ROADM), and the like.

In a first example implementation, the RANFs 1-N disaggregate RAN HW and SW with commercial off-the-shelf (COTS) HW and open interfaces (e.g., NGFI-I and NGFI-II, and the like). In this example implementation, each RAN function 1-N may be a virtual BBU or virtual RAN (vRAN) controller operating on COTS compute infrastructure with HW acceleration for BBU/vRANFs.

In a second example implementation, the RANFs 1-N disaggregate layers of one or more RAT protocol stacks. As an example of this implementation, RANF 1 is a DU 131 operating on first COTS compute infrastructure with HW acceleration for BBU/vRANFs, and RANF 2 is a virtual CU 132 operating on second COTS compute infrastructure.

In a third example implementation, the RANFs 1-N disaggregate control plane and user plane functions. As an example of this implementation, the RANF 1 is a DU 131 operating on COTS compute infrastructure with HW acceleration for BBU/vRANFs, RANF 2 is a virtual CU-CP 132 operating on COTS compute infrastructure, and a third RANF (e.g., RANF 3 (not shown by FIG. 1)) is a virtual CU-UP 132 operating on the same or different COTS compute infrastructure as the virtual CU-CP 132. Additionally or alternatively, in this implementation, one or more CN functions 1-x may be CN-UP functions and one or more other CN functions 1-x may be CN-CP functions.

In a fourth example implementation, the RANFs 1-N disaggregate layers of an [IEEE802] RAT. As an example of this implementation, the RRH 130 implements a WiFi PHY layer, RANF 1 implements a WiFi MAC sublayer, RANF 1 implements a WiFi logical link control (LLC) sublayer, RANF 2 implements one or more WiFi upper layer protocols (e.g., network layer, transport layer, session layer, presentation layer, and/or application layer), and so forth.

In any of the implementations discussed herein, the lower layers of the RAN protocol stack can be characterized by real-time (RT) functions and relatively complex signal processing algorithms, and the higher layers of the RAN protocol stack can be characterized by non-RT functions. In these implementations, the RT functions and signal processing algorithms can be implemented in DUs 131 and/or RRHs 130 either using purpose-built network elements or in COTS hardware augmented with purpose-built HW accelerators (e.g., acceleration circuitry 1364 of FIG. 13 discussed infra).

In current disaggregated RAN deployments (e.g., disaggregated RAN 100*b*), the RAN computing HW is not being exploited for edge computing. This is because the user data context is only accessible to the edge compute node 136 after complete RAN processing (e.g., in 3GPP 5G networks, this takes place after CN functions processing). The latency of deployment 100*b* is higher (e.g., in comparison to edge disaggregation deployment 100*c*) since data has to propagate much deeper into the RAN network, for example, by passing through several processing stages in the fronthaul RANFs, backhaul RANFs, and CN functions 1-x, before reaching the edge compute node 136. The compute nodes of RANFs 1-N are geographically separated from one another due to the disaggregation-based network deployment, which also contributes to the latency. Note that data still has to travel through the RANFs 1-N and the CN functions 1-x even when the edge compute node 136 is co-located with a network access node (NAN). Currently, there are no existing techniques to perform edge compute workloads at the DU 131 stage (or RANF(s) that perform the same or similar functionality as the DU 131) of the disaggregated RAN deployment 100*b*.

FIG. 1 also shows an example edge disaggregation deployment 100*c* (also referred to as "disaggregated edge 100*c*"), which includes disaggregated functionality of the edge compute node 136 into 1-M edge compute functions (ECFs) (where M is a number, and m=M−1), which operate at, or on top of, one or more corresponding RANFs 1-N. Individual ECFs 1-M may be implemented as respective edge apps, respective edge services, and/or one or more edge slices (see e.g., edge slices 831 of FIG. 8), and/or combinations of one or more edge apps and/or edge services, and/or component elements of one or more edge apps and/or edge services. In some implementations, an ECF and an edge app can be part of the same element (e.g., as part of the same software element/component). As mentioned previously, each RANF 1-N can be a SW element operated by a respective physical compute node (e.g., computing node 1350 of FIG. 13), and in some implementations, individual ECFs 1-M are operated by respective edge compute nodes are co-located (e.g., disposed at a same or similar location) as a corresponding RAN compute node operating respective RANFs 1-N. Additionally or alternatively, some or all of the ECFs 1-M are operated by a same compute node that operates a corresponding RANFs 1-N (e.g., as separate virtual machines (VMs), virtualization containers and/or OS containers, virtualized NFs (VNFs), NFVs, and/or the like).

Additionally or alternatively, the ECFs 1-M may operate on the same infrastructure than that used for corresponding RANFs 1-N. For example, ECF 1 may operate on the same infrastructure node as RANF 1, ECF 2 may operate on the same infrastructure node as RANF 2, and so forth. Additionally or alternatively, the ECFs 1-M may operate on different infrastructure elements than those used for corresponding RANFs 1-N. For example, ECF 1 may operate on a separate infrastructure node than the device used to operate RANF 1, and so forth. In some implementations, the aforementioned examples may be combined, for example, where ECF 1 operates on a separate infrastructure node than the device used to operate RANF 1 and ECF 2 operates on the same infrastructure node as RANF 2. Additionally, the ECFs 1-M may be or include any suitable ECT or combination of ECTs including any of the ECTs discussed herein (see e.g., ECT(s) 1035 discussed infra with respect to FIG. 10). In various implementations, an ECF may be associated with RANFs 1-N in a one-to-one association or in a one-to-many association. In these implementations, the ECF may have an ID that allows the data extracted by one or more associated RANFs 1-N to extract and deliver edge data to the ECF, and the ECF may deliver the processed edge data to each of the associated RANFs 1-N.

The disaggregated edge 100*c* enables edge computing services to be offered closer to client apps at the UE 110. For example, disaggregated edge 100*c* includes some ECFs 1-M provided at the intermediate level of processing in the disaggregated RAN 100*b*, which achieves lower latency between the UE 110 and edge computing services at least in comparison to a disaggregated RAN 100*b* without disaggregated edge 100*c* functionality. The disaggregated edge 100*c* allows edge computing functions/services to be provided at the same intermediary node (e.g., a RANF 1-N) at or near the UE 110. Additionally or alternatively, user traffic can be forwarded to a specialized aggregation ECF 1-M to be performed in relatively close proximity to the UE 110.

In some implementations, only specific user data is decrypted upon policy and service agreements, while the rest of the RAN data is still in encrypted form and cannot be interpreted by ECFs 1-M, edge service(s), and/or any other intermediate nodes. Hence, the integrity and security of the user data is still preserved. An edge service is a service provided and consumed either by the edge platform (or ECF 1-M) or an edge app, and an edge app is an application that can be instantiated on or by an edge compute node (or ECF 1-M) within an edge framework and can potentially provide or consume edge services.

In an example use case, an ECF (e.g., ECF 1) provides video analytics services using one or more edge apps or services, and accepts video data from multiple subscribed users via corresponding user apps on respective UEs 110. In conventional disaggregated RAN deployments, video data captured by a UE 110 has be processed by all fronthaul, mid-haul, and backhaul nodes (e.g., disaggregated RANFs 1-N), along with CN functions 1-x before the video data can be interpreted and/or processed by the edge compute node 136. By contrast, in this example disaggregated edge use case, the video data can be extracted by the ECF 1 from the RANF 1 for processing right after the video data is obtained by the RRH 130.

The network controller (e.g., RIC 202 of FIG. 2) coordinates edge data extraction, forwarding treatment, and edge data insertion processes. In some implementations, the network controller coordinates services and/or traffic to specific ECFs 1-M with the disaggregated RAN nodes 1-N and the UE 110. The network controller provides various services such as, for example, decryption and encryption services, decoding and encoding services, and extraction and reinsertion services for sending back processed data to the UE 110. These services can be enabled dynamically on-demand from the UE 110 and/or edge service providers, which allows for monitoring, QoS enforcement, and policy enforcements by the network controller. Additionally or alternatively, the network controller can selectively provide edge computing services on-demand for the UE 110 (or subscribing users or the UEs 110). This can include dynamic data extraction at intermediate stages of RAN processing. In these implementations, relatively easy implementation of selective (e.g., UE-specific) packet inspection, duplication, and forwarding can be done by a suitable compute node such as SDN switches at the intermediate RAN stages. Furthermore, as discussed in more detail infra, the disaggregated edge 100*c* requires little to no changes to the existing protocols or implementations in the disaggregated RAN 100*b*.

In some implementations, the network controller can coordinate a predefined or configurable configuration that can be used by a MAC scheduler such as a 3GPP 5G/NR MAC scheduler (see e.g., *Intelligent 5G LSMAC Scheduler*, Intel Corp. and Capgemini Engineering (18 Jun. 2021), https://networkbuilders.intel.com/solutionslibrarv/intelligent-5g-l2-mac-scheduler-powered-by-capgemini-netanticipate-5g-on-intel-architecture, the contents of which is hereby incorporated by reference in its entirety), a MAC sublayer management entity (MLME) (see e.g., [IEEE80211]), a distributed coordination function (DCF) (see e.g., [IEEE80211]), and/or a hybrid coordination function (HCF) (see e.g., [IEEE80211]), and/or the like. The MAC scheduler uses the configuration to schedule the user data relevant to the edge computing workloads at predefined/selected locations in the time-frequency resources. The disaggregated edge 100*c* includes a new dataflow (or pipeline) and edge service session (e.g., IP session, or the like) in addition to a primary e2e connection. This edge dataflow includes additional user contexts for access network protocol stack processing, as well as RAN contexts to extract and insert the information before the edge compute processing in the uplink (UL) direction and after the edge compute processing in the downlink (DL) direction, which is shared by the network controller (e.g., RIC 202 of FIG. 2). In one example, where the total number of RANFs is N, and the processing level at any disaggregated node is n_RAN, then N−n_RAN processing is performed at a given node before the data is placed over anew edge service session that connects the UE 110 to the edge compute workload. In some implementations, the network controller extracts UL signal reception by RRH 130 from the existing disaggregated RAN dataflow, sends UE-specific data to an appropriate ECF 1-M, and (re-)inserts edge data to the RAN dataflow (or processing pipeline) for DL transmissions to the UE 110. In alternative implementations, the ECF 1-M performs some control functionality on the edge compute node, RANF node, and/or some other remote node rather than (re-)inserts edge data to the RAN dataflow. This process may be performed in reverse for data flowing in the opposite direction.

RANFs in existing disaggregated RAN deployments do not, and cannot, interpret the user data, and do not have the contexts to perform operations that can decode the user information and app data that is specific to a particular UE 110. The user information and/or app data that is specific to a particular UE 110, regardless of whether the data is generated by the UE 110 or intended to be delivered to the UE 110, is referred to as "UE-specific data" or the like. The RAN/edge split function within a disaggregated RAN 100*b* overcomes the aforementioned context issues and other challenges by coordinating with an intelligent RIC that provides instructions at the operating timescale to extract data from each intermediate RAN processing stage. During extraction, one or more of the disaggregated RANFs 1-N perform the pending RANF processing of the UE 110 data that is bound to an ECF 1-M. For example, in a 3GPP 5G or LTE RAN, if only the layer 1 (L1) processing has been completed, then the MAC, RLC, and PDCP layers of 3GPP 5G/LTE protocol stack has to be completed before the UE-specific data can be sent to the edge compute node.

Existing Deep Packet Inspection (DPI) techniques are employed only to identify and select information for extraction at disaggregated RANFs 1-N. Once data is identified and extracted, the data at a RAN node undergoes additional processing to extract UE-specific data through removal of tunnel headers, decryption, and any other decoding functions until the UE-specific data is recovered for data processing by the edge computing services. For instance, extracting UE-specific data from a fronthaul for edge computing uses some or all of the following information in addition to DPI: (1) fronthaul (e.g., Option 7-2× (or 7.2×), Option 6, Option 8, eCRPI, RoE, and/or the like) session and header information; (2) timing synchronization and duration information; and (3) access network control information (e.g., UL control information (UCI) and/or the like). The fronthaul session and header information is sent to the disaggregated RANF(s) 1-N by the network controller for the decryption of packets, where header decoding and Cyclic Redundancy Check (CRC) re-insertion is also performed so that the fronthaul session integrity is preserved. The timing synchronization and duration information is also sent to the disaggregated RANF(s) 1-N to extract the UE-specific information based on raw In-phase and Quadrature (I/Q) data inside a eCPRI payload. The location of I/Q data in the RF time-frequency resource grid (see e.g., FIG. 3) typically changes every timeslot (e.g., 1 millisecond (ms)). Hence, this information should be dynamically updated to the RANF for I/Q extraction. If the RAN scheduler is aware of edge service(s) at a disaggregated RANF 1-N, it can maintain the schedule locations of I/Q data in the time and frequency resource grid such that the frequent updates to the disaggregated RANF 1-N is not needed. Additionally, the local disaggregated RANF 1-N can use the control information (e.g., modulation and coding schemes (MCS), rank (transmission layers), channel estimation parameters, hybrid automatic repeat request (HARQ) process flow information, and other like information such as the configuration information discussed infra) to recover the UE-specific data to enable the edge computing functions 1-M. The fronthaul session and header information, the timing synchronization and duration information, and the control information may be included in the various configurations discussed infra with respect to FIG. 4.

Additionally or alternatively, an edge-specific dataflow can be implemented at a desired RANF, where the edge-specific dataflow is only used for processing edge data for consumption by a corresponding (co-located) ECF 1-M. As alluded to previously, in conventional RAN and disaggregated RAN approaches, edge data (and other user plane data) is required to flow through all protocol layers of the access network, which necessarily includes passing through all of the RANFs 1-N and all of the CN functions 1-x for the edge data to be assigned an IP address and then be routed to an edge compute node 136. Instead of this conventional technique, a lightweight version of the access network dataflow is implemented at individual RANFs 1-N so that edge data can be processed by the ECF closer to the end-user device (e.g., UE 110). In these implementations, the network controller (e.g., e.g., RIC 202 of FIG. 2) configures a desired RANF 1-N to identify edge data and/or users/UEs 110 transmitting/receiving edge data. The desired RANF 1-N identifies and extracts edge data, and implements the edge-specific dataflow to prepare the edge data for consumption by the corresponding ECF 1-m. The desired RANF 1-N can also be configured to implement the edge-specific dataflow to insert the edge data processed by the ECF 1-m into a network packet, which is then sent to or towards an intended recipient. Here, only edge data provided by specific (e.g., subscriber) users/UEs 110 and/or by specified user-side edge apps is/are processed at the desired RANF, and other users/UEs 110 served by the RANFs 1-N may be processed according to existing protocol dataflow processes and procedures.

As an example, RANF 1 may be co-located with RRH 130 and is configured to perform high-PHY layer functionality of the 3GPP 5G/NR protocol stack, and pass processed UL data to RANF 2, which is configured to perform some DU 131 functionality of the 3GPP 5G/NR protocol stack (e.g., MAC and RLC entities). In this example, RANF 1 can be configured by a network controller (or an intelligent controller) to identify edge data sent by the UE 110. When RANF 1 identifies edge data generated and sent by the UE 110, RANF 1 can implement an edge-specific dataflow to process the edge data for corresponding ECF 1. Here, the edge-specific dataflow may include lightweight versions of the 3GPP 5G/NR protocol (sub)layers (e.g., MAC, RLC, PDCP, and/or SDAP entities) as well as lightweight virtualized CN functions 1-x (e.g., Access and Mobility Management Function (AMF), Session Management Function (SMF), User Plane Function (UPF), and/or other NFs as discussed by relevant standards such as [TS23501] and/or the like).

In another example, the lightweight versions of the access network protocol layers may be a network slice including a RAN part and a CN part, where the network slice is configured to handle edge traffic of edge-specific PDU sessions. This network slice is uniquely identified by a Single Network Slice Selection Assistance Information (S-NSSAI), as defined in [TS23501] and [TS38300], where the S-NSSAI is a combination of mandatory Slice/Service Type (SST) field (8 bits with a range of values of 0-255) that identifies the slice type, and/or a Slice Differentiator (SD) field (24 bits) that differentiates among slices with same SST field. In this example, the S-NSSAI corresponds to an edge-specific PDU session, and as such, the signaling including edge data can be adapted to include PDU session resource information indicating the S-NSSAI corresponding to an edge-specific PDU session (e.g., indicated by the Additional aspects of PDU sessions are discussed in [TS38415] and [TS38413], and additional aspects of network slices and slice management are discussed in [TS23501], [TS38300], 3GPP TS 28.530 v17.2.0 (2021 Dec. 23), 3GPP TS 28.531 v17.2.0 (2021 Dec. 23), and

[O-RAN.WG1. Slicing-Architecture], the contents of each of which are hereby incorporated by reference in their entireties.

In these ways, the various implementations discussed herein enhance existing disaggregated RAN deployments, such as disaggregated RAN 100*b*, to enable edge computing services at disaggregated RAN processing nodes independent of the RANFs 1-N at the RAN processing nodes. At any given disaggregated RAN compute node 1-N, selective extraction of UE-specific data takes place, edge services are provided (e.g., edge computing functions 1-M process the UE-specific data), and the UE-specific data is inserted back into the data stream or flow, which are entering and existing the edge computing functions 1-M. Since this does not require modifications to existing network or communication protocols, the implementations can be run over existing and future network or communication protocols or standards, independent of RANF implementation.

The disaggregated edge framework 100*c* discussed herein may be implemented using various RAN platforms and/or using one or more suitable ECT 1035 such as the O-RAN network architecture (see e.g., [O-RAN]), 3GPP standards (see e.g., [SA6Edge]), ETSI standards (see e.g., [MEC]), O-RAN standards (e.g., [O-RAN]), Intel® Smart Edge Open (formerly OpenNESS) standards (e.g., [ISEO]), Multi-Access Management Services (MAMS) (see e.g., [RFC8743]), and/or [IEEE802] (WiFi) standards (see e.g., [IEEE80211], [WiMAX], [IEEE16090], and the like). Additionally or alternatively, the embodiments discussed herein may be implemented as SW elements that may be provisioned to any of the aforementioned platforms and/or any other suitable platform as discussed herein. Additionally or alternatively, the disaggregated edge framework 100*c* can leverage Data-plane Development Kit (DPDK) (see e.g., *Data Plane Development Kit* (*DPDK*)*Documentation*, dpdk.org, release 22.03.0-rc2 (March 2022), https://doc.dpdk.org/guides/; and *Enhanced Utilization Telemetry for Polling Workloads with collected Data Plane Development Kit* (*DPDK*), Intel® Corp. User Guide, 0820/DN/PTI/PDF, 627392-001US (19 Aug. 2020), https://builders.intel.com/docs/networkbuilders/enhanced-utilization-telemetry-for-polling-workloads-with-collectd-and-the-data-plane-development-kit-dpdk-user-guide.pdf, the contents of each of which are hereby incorporated by reference in their entireties), HW accelerators such as FPGAs and/or expansion cards implementing Intel® QuickAssist Technology (QAT), and/or the like. Additionally or alternatively, the disaggregated edge framework 100*c* may be implemented using specialized SW modules or engines that interact with HW components to enable user apps to interact with edge apps and/or edge service providers, wherein the SW modules or engines are transparent to the Operating Systems (OS), virtual machine (VM), and/or container on which the SW modules or engines operate. The specific implementations can also be tested based on the data processing capabilities for edge services.

Figure 2:
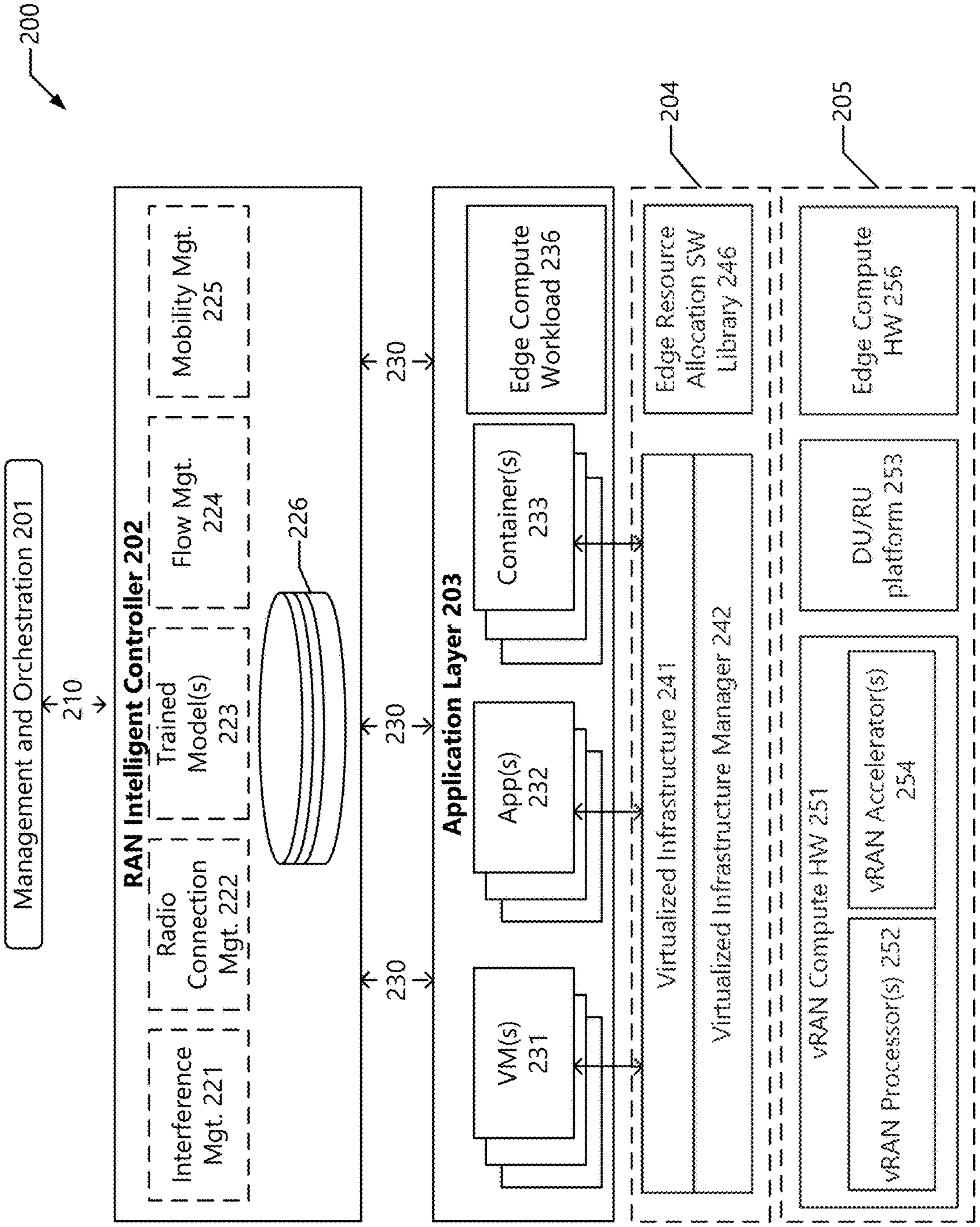
FIG. 2 depicts an example RAN Intelligent Controller (RIC) for edge computing over disaggregated RAN.

FIG. 2 shows an example RAN intelligent controller (RIC) architecture 200, which is capable of configuring the disaggregated RAN 100*b* and/or disaggregated edge 100*c*. The RIC architecture 200 includes Management and Orchestration layer (MO) 201 (also referred to as "Operations, Administration, and Maintenance 201" or "OAM 201"), which includes a group of support NFs that monitor and sustain RAN domain operations, maintenance, and administration operations for the RIC architecture 200 (including the and/or automation of tasks). The MO 201 may be an O-RAN Service Management and Orchestration (SMO) (see e.g., [O-RAN]), ETSI Management and Orchestration (MANO) function (see e.g., [ETSINFV]), Open Network Automation Platform (ONAP) (see e.g., [ONAP]), a 3GPP Service Based Management Architecture (SBMA) (see e.g., [TS28533]), a network management system (NMS), a [IEEE802] OAM entity, and/or the like. The MO 201 sends management commands and data to the RIC 202 via interface 210, and receives relevant data from the RIC 202 via interface 210.

In some implementations, the MO 201 is responsible for some or all of the following functions: maintaining an overall view of the edge system/platform based on deployed ECFs/workloads 236, available resources, available edge services, and/or network topology; on-boarding of app packages including integrity and authenticity checks, validating application rules and requirements and adjusting them to comply with operator policies (if necessary), keeping a record/log of on-boarded packages, and preparing the VIM 242 to handle the applications; selecting appropriate ECFs/workloads for app instantiation based on constraints (e.g., latency, data rate, bandwidth, and/or the like), available resources, and/or available services; and/or triggering app instantiation, relocation/migration, and termination. Additionally or alternatively, the MO 201 may also provide or perform failure detection, notification, location, and repairs that are intended to eliminate or reduce faults and keep a segment in an operational state and support activities required to provide the services of a subscriber access network to users/subscribers.

In O-RAN implementations, the MO 201 may include a non-real-time RAN intelligent controller (Non-RT RIC) (see e.g., [ORANWP]). The non-RT RIC provides non-RT control functionality (e.g., >1 second (s)) and near-Real-Time (near-RT) control functions (e.g., <1 s) are decoupled in the Non-RT RIC. Non-RT functions include service and policy management, RAN analytics and model-training for the near-RT RAN functionality (e.g., RIC 202). In some implementations, trained models 223 and real-time control functions produced in the non-RT RIC are distributed to the near-RT RIC for runtime execution via an A1 interface 210 between MO 201 containing non-RT RIC and the RIC 202 (e.g., near-RT RIC). Network management applications in the MO 201 (e.g., in the non-RT RIC) are able to receive and act on highly reliable data from modular CUs 132 and/or DUs 131 in a standardized format over the A1 interface 210. Messages generated from AI-enabled policies and ML-based training models in the non-RT RIC are conveyed to RIC 202 (e.g., as trained model(s) 223) via the A1 interface 210. Additionally, RAN behaviors can be modified by deployment of different models optimized to individual operator policies and/or optimization objectives.

The RIC architecture 200 also includes a RIC 202 (also referred to as "network controller 202", "intelligent controller 202", "intelligent coordinator 202", "RAN controller 202", or the like). In some implementations, the RIC 202 is a BBU, a cloud RAN controller, a C-RAN, an O-RAN RIC (e.g., a Non-RT RIC) and/or near-real-time RAN intelligent controller (Near-RT RIC)), an edge workload scheduler, and/or the like. The RIC 202 is responsible for RAN controller functionality, as well as provisioning the compute resources for RANFs 1-N and/or other applications. The RIC 202 also acts as the "brain" of the CU(s) 132 and may also control some of the aspects of the CN 142 (or individual NFs 1-x of the CN 142). The RIC 202 also provides application layer support to coordinate and control CU(s) 132 as well as provisioning compute resources for RANFs 1-N and/or other apps. For example, third party platforms (e.g., owners/operators of server(s) 1050 of FIG. 10 and/or cloud service provider 1044 of FIG. 10) may have various service level agreements (SLAs) with the owner/operator of RIC 202 that specify various resources to be provisioned with the third party platforms establish end-to-end (e2e) connections with the RIC 202. For this purpose, the third party platforms may utilize public and/or private (proprietary) APIs to establish the e2e connection with the RIC 202 and communicate with the RIC 202 over the e2e connection. Here, the third party platforms may request compute resources to be deployed at a particular location, and the RIC 202 will spin up those necessary resources according to the SLAs. In various implementations, the RIC 202 can instantiate compute resources in a same or similar manner as is done with cloud computing services and/or using a similar framework for such purposes. According to the embodiments discussed herein, the RIC 202 can reserve and provision compute resources at individual RAN node deployments, for example, at different RRH/RU 130 and/or DUs 131 locations. In these implementations, edge compute elements (e.g., edge compute nodes 1036 of FIG. 10) may be disposed at RRH/RU 130 and/or DU 131 cell sites to provide such resources.

The RIC 202 provides radio resource management (RRM) functionality including, for example, radio bearer control, radio admission control, connection and mobility control (e.g., radio connection manager 222 and mobility manager 225), and dynamic resource allocation for UEs 110 (e.g., scheduling). The RIC 202 also performs other functions such as, for example, routing user plane data and control plane data, generating and provisioning measurement configurations at individual UEs, session management, network slicing support operations, transport level packet marking, and the like.

The RIC 202 includes an interference manager 221 that performs interference detection and mitigation, and a mobility manager 225 that provides per-UE controlled load balancing, resource block (RB) management, mobility management, and/or other like RAN functionality. In addition, the RIC 202 provides RRM functions leveraging embedded intelligence, such as the flow manager 224 (also referred to as a "QoS manager 224") that provides flow management (e.g., QoS flow management, mapping to data radio bearers (DRBs), and the like), and a radio connection manager 222 that provides connectivity management and seamless handover control. The Near-RT RIC delivers a robust, secure, and scalable platform that allows for flexible on-boarding of third-party control applications. The RIC 202 also leverages a Radio-Network Information Base (R-NIB) 226, which captures the near real-time state of the underlying network (e.g., from CUs 132, DUs 131, and/or RUs 130) and commands from the MO 201 (e.g., the non-RT RIC in the MO 201). The RIC 202 also executes trained models 223 to change the functional behavior of the network and applications the network supports. As examples, the trained models 223 include traffic prediction, mobility track prediction, and policy decisions, and/or the like.

The RIC 202 communicates with the application layer 203 via interface 230, which may include one or more APIs, server-side web APIs, web services (WS), and/or some other interface or reference point. As examples, the interface 230 may be one or more of Representational State Transfer (REST) APIs, RESTful web services, Simple Object Access Protocol (SOAP) APIs, Hypertext Transfer Protocol (HTTP) and/or HTTP secure (HTTPs), Web Services Description Language (WSDL), Message Transmission Optimization Mechanism (MTOM), MQTT (previously "Message Queueing Telemetry Transport"), Open Data Protocol (OData), JSON-Remote Procedure Call (RPC), XML-RPC, Asynchronous JavaScript And XML (AJAX), and/or the like. Any other APIs and/or WS may be used including private and/or proprietary APIs/WS.

The application layer 203 includes one or more virtual machines (VMs) 231, one or more applications (apps) 232 (e.g., edge apps or the like), and/or one or more containers 233. In various embodiments, the application layer 203 also includes edge compute workload 236. As discussed in more detail infra, the edge compute workload 236 (or a specific RANF) selectively extracts edge data (e.g., UE-specific data) at the RAN, performs a particular workload or function of one or more edge computing services on the extracted data, and inserts the processed data back into a dataflow or stream. In some implementations, the VMs 231, apps 232, and/or containers 233 in the application layer 203 represent or otherwise correspond to a modular CU 132 and/or a disaggregated RANF 1-N of FIG. 1, and the edge compute workload 236 represents or corresponds to one of the ECFs 1-M of FIG. 1. Additionally or alternatively, multi-RAT protocol stacks (or higher layers of such protocol stacks) may operate as, or in, the VMs 231, apps 232, and/or containers 233. For example, the edge-specific dataflow discussed previously may be operated within individual VMs 231 and/or containers 233, where each VM 231 or container 233 corresponds to an individual user/UE 110 and/or an individual ECF 1-M/edge compute workload 236. Additionally or alternatively, each app 232 may correspond to the edge-specific network protocol stack or individual protocol stack entities/layers of the edge-specific network protocol stack.

In O-RAN implementations, the interface 230 is the E2 interface between the Near-RT RIC 202 and a Multi-RAT CU 132 protocol stack and the underlying RAN DU 131, which feeds data, including various RAN measurements, to the Near-RT RIC 202 to facilitate RRM, it is also the interface through which the Near-RT RIC 202 may initiate configuration commands directly to CU 131/DU 132 or the disaggregated RANF 1-N.

The application layer 203 operates on top of a system SW layer 204. The system SW layer 204 includes virtualized infrastructure 241 (also referred to as "virtual operating platform 241", "virtual infrastructure 241", "virtualized HW resources 241", or the like), which is an emulation of one or more HW platforms on which the VMs 231, apps 232, and/or containers 233 operate. The virtualized infrastructure 241 operates on top of virtualized infrastructure manager (VIM) 242 that provides HW-level virtualization and/or OS-level virtualization for the VMs 231, apps 232, and/or containers 233. The VIM 242 may be an operating system (OS), hypervisor, virtual machine monitor (VMM), and/or some other virtualization management service or application. The system SW layer 204 also includes an edge resource allocation SW library/API 246, which can be implemented for the RANF to integrate the data extraction and insertion processes discussed herein.

The system SW layer 204 operates on top of the HW platform layer 205, which includes virtual (virtualized) Radio Access Network (vRAN) compute HW 251 that operates one or more disaggregated RANFs 1-N using one or more vRAN processors 252 and vRAN accelerators 254. The vRAN processors 252 are processors that include (or are configured with) one or more optimizations for vRAN functionality. The vRAN processors 252 may be COTS HW or application-specific HW elements. As examples, the vRAN processors 252 may be Intel® Xeon® D processors, Intel® Xeon® Scalable processors, AMD® Epyc® 7000, AMD® "Rome" processors, and/or the like. The vRAN accelerators 254 are HW accelerators that are configured to accelerate 4G/LTE and 5G vRAN workloads. As examples, the vRAN accelerators 254 may be Forward Error Correction (FEC) accelerators (e.g., Intel® vRAN dedicated accelerator ACC100m Xolinx® T1 Telco Accelerator Card, and the like), low density parity check (LDPC) accelerators (e.g., AccelerComm® LE500 and LD500), networking accelerators (e.g., Intel® FPGA PAC N3000), and/or the like. Additionally or alternatively, the vRAN processors 252 may be the same or similar as processor(s) 1352 of FIG. 13, and the vRAN accelerators 254 may be the same or similar as the acceleration circuitry 1364 of FIG. 13. Interaction between the vRAN processors 252 and vRAN accelerators 254 may take place via an acceleration abstraction layer (AAL) for standardized interoperability, via an inline HW accelerator pipeline or functional chains, via virtual input/output (vI/O) interfaces, via single root I/O virtualization (SR-IOV) interfaces, and/or via some other interface or mechanism.

The HW platform layer 205 also includes edge compute HW 256, which includes compute, acceleration, memory, and storage resources that can be used for edge data (e.g., UE-specific data) processing. In various implementations, the compute, acceleration, memory, and storage resources of the edge compute HW 256 correspond to the processor circuitry 1352, acceleration circuitry 1364, memory circuitry 1354, and storage circuitry 1358 of FIG. 13, respectively.

In some implementations, the vRAN compute HW 251 may be included in one or more vRAN servers, which may be COTS server HW or special-purpose server HW, and the edge compute HW 256 is enclosed or housed in suitable server platform(s) that are communicatively coupled with the vRAN server(s) via a suitable wired or wireless connection. In some implementations, the vRAN compute HW 251 and the edge compute HW 256 are enclosed, housed, or otherwise included in a same server enclosure. In these implementations, the additional sockets for processor, memory, storage, as and accelerator elements can be used to scale up or otherwise connect for the vRAN compute HW 251 and the edge compute HW 256 for edge computing over disaggregated RAN. In either implementation, the server(s) may be housed, enclosed, or otherwise included in a small form factor and ruggedized server housing/enclosure.

Figure 3:
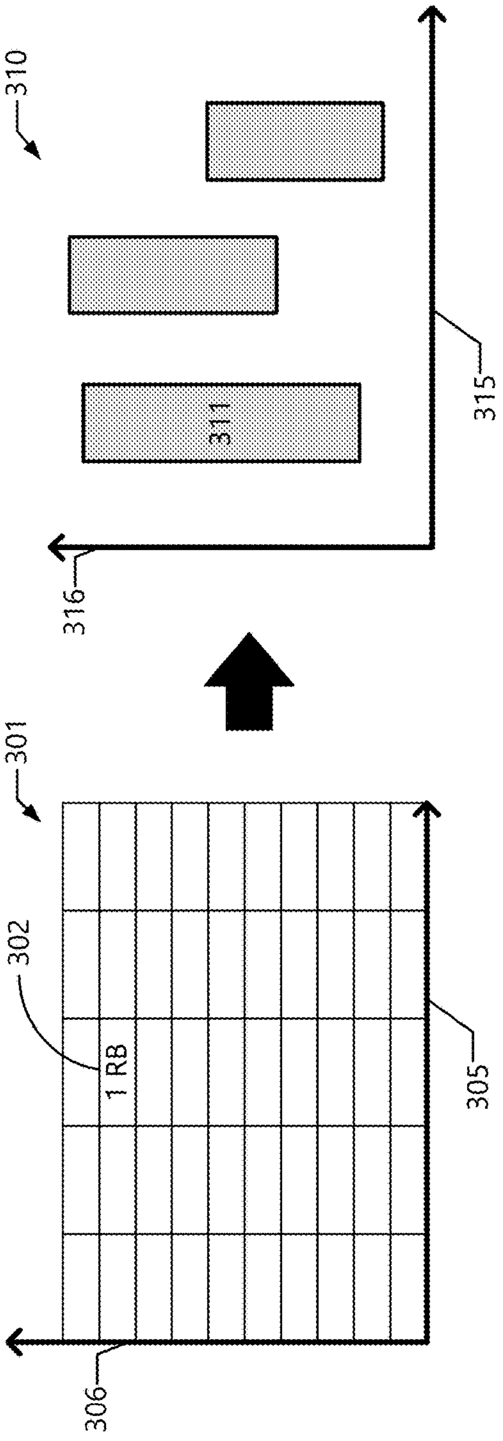
FIG. 3 depicts an example time-resource grid for data placement over time and relative to frequency.

FIG. 3 shows a logical overview of edge data placement relative to time and frequency domains. In particular, FIG. 3 shows a time-frequency resource grid 301, which includes a time domain (axis) 305 and a frequency domain (axis) 306. The individual cells/elements in the resource grid 301 represent individual resource blocks (RBs) 302 (note that not all RBs 302 are not labeled in FIG. 3 for the sake of clarity). One or more transmissions are scheduled in each RB 302.

As an example, the resource grid 301 is a 3GPP 5G/NR resource grid. In general, resource grids (including resource grid 301) can be used for DL communications using orthogonal frequency division multiple access (OFDMA) communication techniques, or used for UL or sidelink (SL) using Single Carrier Frequency Division Multiple Access (SC-FDMA) communication techniques. There is one resource grid 301 for each transmission direction (e.g., DL, UL, or SL). For DL, UL, and SL, transmissions are organized into frames with 10 millisecond (ms) duration. Each frame includes 10 subframes of 1 ms duration (see e.g., clause 4.3.1 in 3GPP TS 38.211 v17.0.0 (2022 Jan. 5) ("[TS38211]"). Each frame is divided into two equally-sized half-frames having five subframes each. Each subframe is also divided into a number of slots, where each subframe can have $2^{\mu}$ slots (where μ is a subcarrier spacing). Each slot usually includes 14 orthogonal frequency division multiplexing (OFDM) symbols, but the number of consecutive OFDM symbols in a slot is based on the cyclic prefix as given by tables 4.3.2-1 and 4.3.2-2 in [TS38211]. In this example, 1 slot includes 7 OFDM symbols such that each slot has a duration of 0.5 ms. In the frequency domain 306, individual subcarriers may be 15 kilohertz (KHz), 30 KHz, or the like. Each element in the resource grid 301 is called a resource element (RE) (not shown by FIG. 3). An RE represents the smallest time-frequency unit in a resource grid 301. Each RE is uniquely identified by an index in the frequency domain 306 and a symbol position in the time domain 305 relative to some reference point. Each resource grid 301 comprises a number of RBs 302, where each RB 302 comprises a collection of REs. An RB 302 describes the mapping of certain physical channels to REs. In this example, an RB 302 can include 12 consecutive subcarriers in the frequency domain 306 and 1 slot in the time domain 305, and an individual RE can be 1 subcarrier and/or 1 OFDM symbol. Additionally, the RBs 302 may be physical RBs (PRBs), virtual RBs (VRBs), or common RBs (CRBs). Furthermore, the RBs 302 can be part of a bandwidth part (BWP). A BWP is a subset of contiguous CRBs and/or PRBs on a given carrier.

In the example of FIG. 3, the resource grid 301 is used for scheduling UL transmissions for one or more UEs 110. In 3GPP 5G/NR networks, a MAC layer entity in the gNB (or a RANF 1-N configured to perform MAC layer operations) includes one or more dynamic resource schedulers that allocate PHY layer resources for DL and UL transmissions. The scheduler(s) assign resources between UEs 110 taking into account the UE's 110 buffer status and the QoS requirements of each UE 110 and associated radio bearers. The scheduler(s) may assign resources taking into account the radio conditions at the UE 110 identified through measurements made at the gNB (or RRH 130) and/or reported by the UE 110, where the resource assignment for a UE 110 includes radio resources (e.g., RBs 302). The scheduler decisions are signaled to the UE 110, and the UE 110 identify their assigned resources by receiving transmissions over a scheduling (resource assignment) channel. Measurements can be used to support scheduler operation. Examples of such measurements include uplink buffer status reports (e.g., measuring the data that is buffered in the logical channel queues in the UE 110) are used to provide support for QoS-aware packet scheduling; and power headroom reports (e.g., measuring the difference between the nominal UE maximum transmit power and the estimated power for UL transmission) are used to provide support for power aware packet scheduling. Other aspects of scheduler operating and scheduling mechanisms are discussed in [TS38300] § 10.

In the example, the MAC layer RANF can schedule UE-specific (edge) data to be transmitted at a predefined location in the resource grid 301 (e.g., in or at RB 302) such that the edge data can be selectively extracted, decoded, and decrypted for edge function processing by a RANF selected by the RIC 202, which may be the MAC layer RANF or another RANF. The scheduler of the MAC layer RANF can assign one or multiple RBs 302 in which the UE 110 is to send edge data. In some implementations, the RBs 302 assigned for edge data can be contiguous or consecutive RBs (e.g., next to one another in time and frequency), and/or the RBs 302 assigned for edge data can be interlaced, distributed throughout the resource grid 301, or an otherwise disperse and/or noncontiguous set of RBs 302.

By scheduling the edge data transmission at the predefined time-frequency resources, the selected the RANF is able to extract the UE-specific data using channel decoding information and/or other relevant information, which may be predefined or supplied to the selected RANF by the RIC 202. The specific time-resource position in which the edge data is to be transmitted may be implementation specific and/or configurable by the RANF(s) and/or the RIC 202. The same or similar processing can be done in the reverse order for data insertion, encoding, and encryption of the edge data so that subsequent RANFs can process the data and send the edge data to or towards a destination node (or multiple destination nodes). The processed edge data (or packet(s) including the processed edge data) can be inserted back into the resource grid 301 at the same or different predefined or configured resources (e.g., in the RB 302 at a later point in time than when the UE-specific data was extracted) so that subsequent RANFs can continue to process the edge data.

In particular, the MAC layer RANF generates UL scheduling grants for the UE 110 such that edge data (e.g., UE-specific data) generated by the UE 110 is/are sent using the configured time-frequency resources (e.g., RB 302 in this example). In general, the MAC layer RANF can dynamically allocate resources to the UE 110 via a Cell Radio Network Temporary Identifier (C-RNTI) on one or more Physical Downlink Control Channels (PDCCHs). The UE 110 monitors the PDCCH(s) in order to find possible UL grants for UL transmission when its DL reception is enabled. The MAC layer at the UE 110 schedules UL transmissions in the allocated resources according to the resource assignment. In addition, a higher layer configuration (e.g., RRC configuration, an edge app/framework configuration, or the like) can be sent to the UE 110 to configure the UE 110 and/or specific apps running on the UE 110 to send edge data to one or more specified sockets (e.g., as indicated by the RRC configuration, edge app/framework configuration, or other like configuration information), which can then be passed to the UE's 110 MAC layer for scheduling in the configured time-frequency resources.

The time-frequency resource grid 310 is a schedule of transmissions at the UE 110 that are to take place in a time domain 315 and a frequency domain 316, which may be the same or similar as time domain 305 and frequency domain 306 in resource grid 301. Here, a scheduled UL transmission 311 is to include edge data generated by a specific user edge app at the UE 110, which is destined or intended for a particular ECF 1-M The resource assignment for the UL transmission 311 includes information such as, for example, assigned slot number(s), number of OFDM symbols, number of assigned RBs 302, time-frequency location of the assigned RBs 302, C-RNTI, modulation and coding scheme (MCS), and/or other channel/network decoding information and/or UL scheduling grant information that may be defined by relevant standards/specifications (e.g., 3GPP, IEEE, ETSI, and/or the like). Additionally or alternatively, the resource assignment for the UL transmission 311 may include assigned time slot number(s) or ID(s), I/Q symbol mapping information, ID of a node for forwarding in the UL direction, an ID of a node for forwarding or data insertion in the DL direction, and/or other like information.

Although the examples of FIG. 3 (including resource grids 301 and 310) are based on time-frequency resource allocations used scheduling transmissions in 3GPP 5G/NR communication systems, the same or similar implementations discussed infra may also be used for any other resource allocation scheme, such as those used by 3GPP 4G/LTE communication systems, 3GPP 6G communication systems, WiFi communication systems, time-sensitive network (TSN) (see e.g., *IEEE Standard for a Precision Clock Synchronization Protocol for Networked Measurement and Control Systems*, IEEE Std 1588-2019, pp. 1-499 (16 Jun. 2020) ("[IEEE1588]") and/or *IEEE Standard for Local and Metropolitan Area Networks—Timing and Synchronization for Time-Sensitive Applications*, IEEE Std 802.1AS-2020, pp. 1-421 (19 Jun. 2020)), Ethernet networks (e.g., [IEEE8023]), and/or other like network and/or communication protocols.

1.2. End-to-End Interactions for Disaggregated Edge

Figure 4:
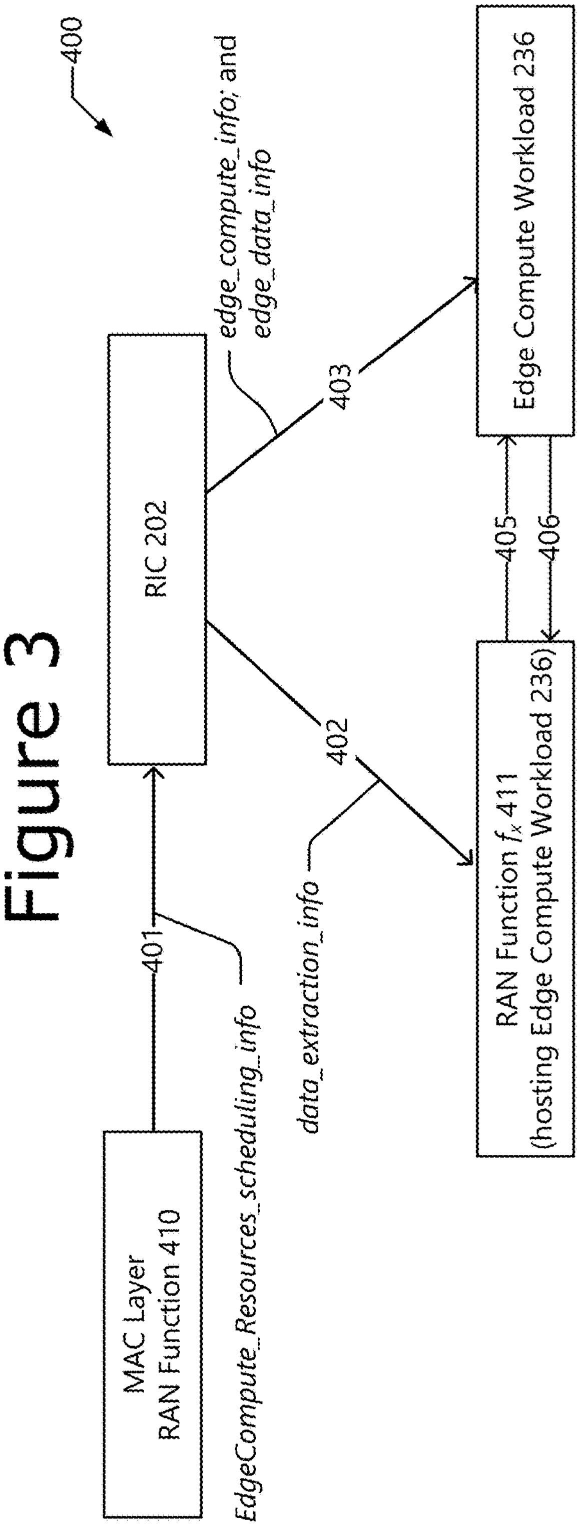
FIG. 4 depicts an example of RIC coordination for edge disaggregation.

FIG. 4 shows an example edge data extraction and insertion coordination procedure as performed by a RIC 202. First, at operation 401, the MAC layer RANF 410 generates and sends edge compute resource scheduling information to the RIC 202. The MAC layer RANF 410 sends this information to the RIC 202 since the RANF 410 can schedule transmissions for the UE 110 based on UE measurements of channel conditions and/or other like parameters or conditions. In other implementations, the RIC 202 can instruct, configure, or otherwise provide the MAC layer RANF 410 with the edge compute resource scheduling information for the edge data. The edge compute resource scheduling information is configuration information used to designate a particular location for edge data to be transmitted by the UE 110. In this example, the RANF 410 implements a MAC scheduler to assign resources for edge data, and generates and sends a suitable UL scheduling grant to the UE 110. The UE 110 uses the UL scheduling grant to transmit edge data at the designated time-frequency location. An example for the edge resource scheduling information configuration, which may be provided by the MAC layer RANF to the RIC, 202 (and/or the UE 110) is shown by the EdgeCompute_Resources_scheduling_info configuration information in Table 4-1.

TABLE 4-1

| Edge Data Scheduling Configuration Information |
|---|
| EdgeCompute__Resources__scheduling__info {<br>slotNumber;<br>nrofSymbols;<br>nrofRBs;<br>c-RNTI;<br>MCS;<br>...<br>} |

In the EdgeCompute_Resources_scheduling_info of Table 4-1, the slotNumber field includes or indicates the slots in which the packets including edge data will be sent or transmitted, the nrofSymbols field includes or indicates the number of OFDM symbols (or number of symbols per slot) of the transmission or packet(s) that includes the edge data, the nrofRBs field includes or indicates number of RBs 302 of the transmission or packet(s) that includes the edge data, the c-RNTI field includes or indicates the C-RNTI of a RRH 130 or other base station that is transmitting or receiving the transmission or packet(s) that includes the edge data, and the MCS field includes or indicates the MCS being used to transmit the packet including the edge data. Additionally or alternatively, the EdgeCompute_Resources_scheduling_info other configuration information such as, for example, a number of slots per frame (e.g., nrofSlotsPerFrame), slot number in the frame in which the edge data packet is to be transmitted or received, System Frame Number (SFN), parameters for SDAP, PDCP, and/or MAC entities for adding, modifying, and/or releasing signaling and/or data radio bearers (e.g., RadioBearerConfig information element (IE), SDAP-Parameters IE and/or sdap-Config IE; PDCP-Parameters IE; and/or MAC-Parameters IE in [TS38331]), PDU session information, UL grant information, UL control information (UCI), and/or other like configuration information.

In order for the edge data to be extracted over an intermediate processing state, the RANF node $f_x$ 411 needs to know the location (e.g., time-frequency position) of the edge data (e.g., UE-specific data) on the air-interface context, for example, the specific RBs 302, slot number(s), frame number(s), and/or other relevant configuration information for decoding the relevant data. At operation 402, this configuration information is generated and applied as a data extraction configuration information to a RANF node 411. The data extraction configuration allows the RANF 411 to extract the desired edge data from the protocol stack dataflow (processing pipeline), and forward the extracted edge data to the edge compute workload 236 in the UL direction. An example data extraction configuration is shown by the data_extraction_info in Table 4-2.

TABLE 4-2

| Edge Data Extraction Configuration Information |
|---|
| data_extraction_info {<br>time_slot;<br>IQsymbol_mapping;<br>data_forward_for_UL;<br>data_insertion_for_DL;<br>...<br>} |

In the data_extraction_info configuration information of Table 4-2, the time slot field includes or indicates one or more time slots during which packet(s) including edge data will be transmitted. The IQsymbol_mapping field includes modulation mapping information (e.g., modulation scheme used such as those discussed in [TS38211] § 5.1), and may include sequence generation information (see e.g., [TS38211] § 5.2) and/or baseband signal generation information (see e.g., [TS38211] § 5.3). The data_forward_for_UL field includes or indicates one or more IDs (e.g., network address, app ID, session ID, and/or the like) of a destination node (or multiple destination nodes) and/or next hop(s) for forwarding the packet(s) in the UL direction after the edge data is processed. The data_insertion_for_DL field includes or indicates one or more IDs (e.g., network address, app ID, session ID, and/or the like) of a RANF that is to insert the processed edge data back into RB(s) 302 of the time-frequency grid, if this data needs to be forwarded back to the user/UE 110. Additionally or alternatively, the insertion of this data could be coordinated with the resource scheduler at the MAC layer RANF 410.

Additionally or alternatively, a data_forward_for_DL field could be included in the data_extraction_info, which includes or indicates one or more IDs (e.g., network address, app ID, session ID, and/or the like) of a destination node (or multiple destination nodes) and/or next hop(s) for forwarding the packet(s) in the DL direction after the edge data is processed. Additionally or alternatively, a packet skip info field could be included in the data_extraction_info, which contains network address, tag, or other information used to determine to skip processing a particular packet. For example, if the packet includes data that matches the packet skip information, the RANF neither creates a copy of the packet nor applies the corresponding processing to the packet; otherwise, the RANF may copy the packet and applies the corresponding processing for sending the data to the edge compute workload 236.

The EdgeCompute_Resources_scheduling_info configuration information of Table 4-1 and the data_extraction_info configuration information of Table 4-2 are based on a 3GPP 5G/NR and/or LTE RATs. However, the EdgeCompute_Resources_scheduling_info configuration information and the data_extraction_info configuration information may have different data/information depending on the underlying RAT being used.

In a first example where the underlying RAT is a WiFi RAT, the EdgeCompute_Resources_scheduling_info configuration information may include traffic specification (TSPEC) data elements (DEs) for data frames/packets that should include edge data.

The TSPEC is used to reserve resources within the hybrid coordinator (HC), modify the HC's scheduling behavior, and specify TS parameters such as a traffic classifier and ACK policy. A TSPEC includes or describes QoS characteristics of a dataflow to and from a station (e.g., UE 110), and the TSPEC element contains a set of parameters that define the characteristics and QoS expectations of a traffic flow, in the context of a particular station. As examples, the TSPEC DEs may include one or more of element ID, length, traffic stream information (TSInfo), nominal MAC service data unit (MSDU) size, maximum MSDU size, minimum service interval, maximum service interval, inactivity interval, suspension interval, service start time, minimum data rate, mean data rate, peak data rate, minimum PHY rate, surplus bandwidth allowance, medium time, DMG attributes, delay bound, and/or the like. The TSInfo may include, for example, traffic type, traffic stream identifier (TSID), direction, access policy, automatic power save delivery (APSD), user priority TSInfo ACK policy, schedule, and/or the like (see e.g., [IEEE80211]). Additionally or alternatively, the data_extraction_info configuration information can include the same or similar information as EdgeCompute_Resources_scheduling_info as well as the IQsymbol_mapping, data_forward_for_UL and data_insertion_for_DL configuration information.

In a second example where the underlying RAT is a WiFi RAT, the EdgeCompute_Resources_scheduling_info IE may include Network Allocation Vector (NAV) information such as the MAC address to be included in a Receive Address (RA) field and/or transmitter address (TA) field of an [IEEE80211] control frame, and a duration value to be included in a duration field of the [IEEE80211] control frame. Examples of the [IEEE80211] control frame includes an acknowledgment (Ack) frame, a beamforming report poll frame, a BlockAck frame, a clear-to-send (CTS) frame, a CTS-to-AP frame, a CTS-to-self frame, contention free (CF)-End frame, CF-End+CF-Ack frame, a directional multi-gigabit (DMG) CTS frame, a DMG Denial to Send (DTS) frame, a grant frame, a grant ack frame, a poll frame, a request to send (RTS) frame, a service period request (SPR) frame, a sector sweep feedback (SSW-Feedback) frame, very high throughput (VHT) null data packet (NDP) announcement frame, and/or some other control frame. A node distributes NAV information to reserve the transmission medium for a transmission by first transmitting the [IEEE80211] control frame where a duration value in the frame protects the pending transmission, plus possibly an Ack frame. In this example, the NAV information is used to reserve the medium for transmitting data frames with edge data, and the EdgeCompute_Resources_scheduling_info configuration information includes the duration value and a time period during which the edge data frames will be transmitted.

At operation 403, the RIC 202 generates and sends an edge compute configuration to the edge compute workload 236. The edge compute configuration includes edge compute configuration information including or indicating, for example, user (edge) data context, processing information (e.g., how the edge data is to be processed, a specific edge service to be used, and/or the like), output forwarding information (e.g., indicating which RANF to provide the processed data to), and/or other like information. Additionally or alternatively, the edge compute configuration includes edge data configuration information including or indicating, for example, user (edge) context, information of RANFs from which the edge data is to be obtained (e.g., RANF IDs and/or the like) in the UL direction, information of RANFs to which the processed edge data is to be sent (e.g., RANF IDs and/or the like) in the DL direction, and/or other like information. Example data structures for the edge compute configuration information and the edge data configuration information are shown by Table 4-4 and Table 4-3, respectively.

TABLE 4-3

| Edge Data Configuration Information |
|---|
| edge_data_info {<br>UE_context;<br>data_forward_for_UL;<br>data_insertion_for_DL;<br>...<br>} |

In the edge_data_info configuration information of Table 4-3, the user_context field includes a user context. The user context is a block of data at the UE 110, a RANF, and/or or an ECF associated with an individual user/UE 110. Additionally or alternatively, the user context includes application-specific runtime data maintained by an edge app, which is associated with a user of the edge app (or a corresponding user app). This user context contains relevant information about the individual user/UE 110 such as, for example, UE network/communication capabilities, security information and/or authentication credentials, UE security capabilities, UE location information, subscription data and/or profile, and/or other like information. The data_forward_for_UL and data_insertion_for_DL in the edge_data_info configuration information of Table 4-3 may be the same or similar as the data_forward_for_UL and data_insertion_for_DL in the data_extraction_info configuration information of Table 4-2.

TABLE 4-4

| Edge Compute Configuration Information |
|---|
| edge_compute_info {<br>user_data_context;<br>processing_info;<br>output_forward_info;<br>...<br>} |

In the edge_compute_info configuration information of Table 4-4, the user_data_context field includes or indicates information about a user data context. The user data context is a block of data at a RANF or ECF associated with user data of an individual user/UE 110 (e.g., the edge data). This block of data contains the relevant information used to maintain edge services and/or an edge compute session towards the individual user/UE 110. Additionally or alternatively, the user data context is a set of reference data about an instance of user data and/or a user app instance that is used to identify the instance, enable lifecycle management operations, and associate the instance with its user application. The user data context may be established when a connection or session is established between the individual user/UE 110 and the edge compute workload 236, or when edge data is provided to the edge compute workload 236. The user data context may include, for example, user/edge app state information, edge function ID, edge app ID, security information and/or authentication information, and/or other like information. Additionally or alternatively, the user data context may include IDs of the logical-connection between the individual user/UE 110 and the edge compute workload 236. The processing_info field includes or indicates various parameters for handling the edge data including in a packet and/or processing procedures to be performed when extracting and/or inserting the edge data from/to the packet. The output_forward_info field includes or indicates an application or function that should receive the processed edge data when the ECF finishes processing the data.

When the UE 110 sends edge data in the UL direction (e.g., using the aforementioned UL scheduling grant to transmit edge data at the designated time-frequency location), the RANF node 411 extracts the edge data from the predetermined time-frequency location, and forwards the extracted edge data to the edge compute workload 236 at operation 405. The edge compute workload 236 processes the edge data, and sends the processed data to a RANF indicated by the edge compute configuration at operation 406, which in this example is the RANF 411. The RANF 411 inserts the processed data back into the protocol stack dataflow for conveyance to other protocol layers. For DL operations, the processes can be reversed, and data insertion logic is performed.

In some implementations, the edge_compute_info configuration information and the edge_data_info configuration information can be included in a same configuration and/or included in separate configurations. These configurations may, or may not, also include the EdgeCompute_Resources_scheduling_info configuration information and/or the data_extraction_info configuration information. In a first example, the RIC 202 generates a first configuration that includes the EdgeCompute_Resources_scheduling_info configuration information the data_extraction_info configuration information, and sends the first configuration to the RANF 411, and generates a second configuration that includes the edge_compute_info configuration information and the edge_data_info configuration information and sends the second configuration to edge compute workload 236 via a suitable edge API. In a second example, the RIC 202 generates a configuration that includes the EdgeCompute_Resources_scheduling_info configuration information, the data_extraction_info configuration information, the edge_compute_info configuration information, and the edge_data_info configuration information and sends the configuration to the RANF 411. Here, the RANF 411 may pass the configuration to the hosted edge compute workload 236. In some implementations, the aforementioned configurations may be included with other configurations such as those used to update or configure the RANFs for a particular RAN functionality (e.g., updating protocol sublayer functionality or the like). Additionally or alternatively, any of the configurations discussed herein may be information objects (e.g., electronic documents or files) having any suitable file format or data format, such as any of the formats discussed herein. Additionally or alternatively, the various configurations discussed herein can include a configuration payload that is the information to be analyzed (e.g., raw data), training data, or other like data to be analyzed by the ECF. Alternatively, configurations discussed herein can include mappings, pointers, or references to locations where the information is stored in the network or on the edge compute node or cluster.

1.3. Data Extraction and Insertion

Figure 5:
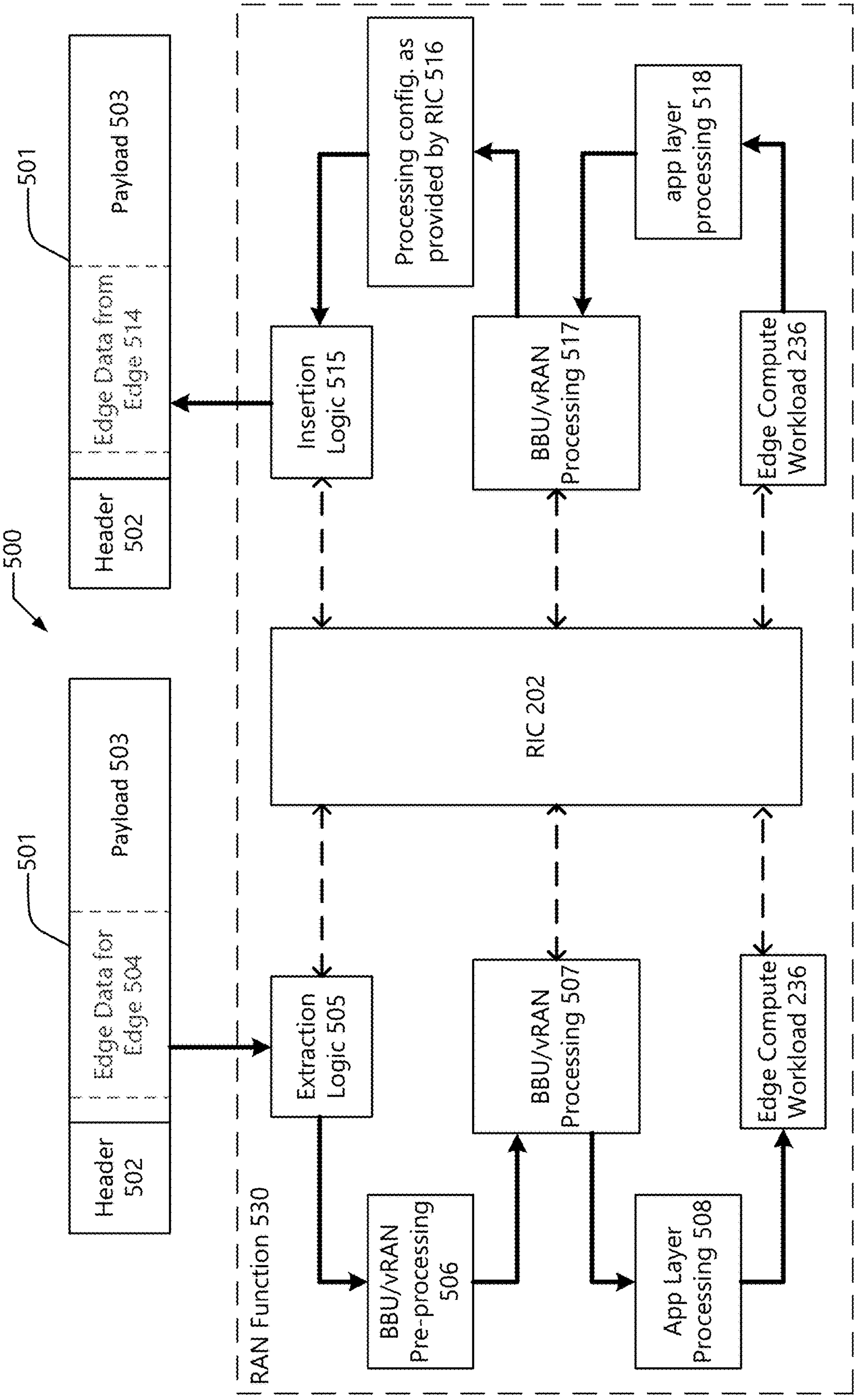
FIG. 5 depicts RIC extraction and insertion logic.

FIG. 5 shows example edge data capture and routing logic 500. Here, a network packet 501 arrives at a RANF 530 for processing in accordance with a network protocol. The RANF 530 is part of a protocol stack processing dataflow (or pipeline), wherein the RANF 530 performs or operates some aspect of the network protocol. In one example, the network protocol is the 3GPP 5G protocol stack, and the RANF 530 is configured to perform MAC layer operations/processes. In this example, the protocol stack processing dataflow may be the L2 data flow shown by FIGS. 6.6-1 in [TS38300]. In embodiments, the RIC 202 configures the RANF 530 with extraction logic 505 and insertion logic 515 for extracting/inserting user (edge) data 504 to/from the network packet 501, and with information for routing the user (edge) data 504 to the edge compute workload 236.

The packet 501 includes a header section 502 and a payload section 503. The payload section 503 contains the edge data 504 destined or intended for the edge compute workload 236. The edge data 504 may be included in any data fields (DFs) or data elements (DEs) of the packet 501, and the particular DFs/DEs used to carry the edge data 504 may vary depending on the particular protocol used and/or may be implementation-specific.

The edge data 504 is extracted from a protocol stack dataflow by the extraction logic 505, as provided by the RIC 202. As data streams flow across the RANF, the extraction logic 505 captures the packet 501 (and other packets that belong to the data streams/flows), decodes the packet's 501 raw data, showing the values of various fields in the packet 501 (including edge data 504), and analyzes the packet's 501 content according to the appropriate network protocol/specifications. The extraction logic 505 may be any suitable mechanism that performs a packet analysis and/or extraction process such as packet analysis, deep packet inspection, packet snooping, packet sniffing, protocol analysis, packet probing, and/or the like. In these implementations, the extraction logic 505 may be a packet analyzer, packet sniffer, protocol analyzer, packet performance monitor, network analyzer, and/or the like. In some implementations, the RIC 202 configures the extraction logic 505 with extraction configuration information such as, for example, specified start and end bytes within the payload section 503 and/or the DFs/DEs within the packet's 501 payload section 503 where the edge data 504 is located, packet SNs (e.g., specific SNs or a range of SNs) of packets 501 that include edge data 504, network addresses, flow identifiers (IDs), session IDs, and/or other IDs associated with subscriber UEs 110 and/or UE-specific data, ID(s) associated with the edge compute workload 236 to which the edge data 504 is to be forwarded (e.g., edge app/service ID, session ID, and/or the like), and/or other like configuration information such as the information discussed previously in Table 4-1, Table 4-2, Table 4-4, and Table 4-3.

Additionally or alternatively, the configuration used for extracting information may be a Packet Detection Rules (PDR), which includes Packet Detection Information (PDI). The PDI may include or indicate one or more data fields against which incoming packets are to be matched, and may be associated with rules providing the set of instructions to apply to packets matching the PDI such as, for example, one or more Forwarding Action Rules (FARs), which contain instructions related to the processing of the packet (e.g., whether to forward, duplicate, drop, and/or buffer the packet) and forwarding, buffering, and/or duplicating parameters to be used when the packet is to be forwarded, buffered, and/or duplicated respectively. As examples, the PDR can include one or more of a rule ID (e.g., unique ID of the PDR), precedence information (e.g., the order in which PDI should be applied), PDI, FAR ID (e.g., identifies a forwarding action that has to be applied), packet replication skip information (e.g., contains information about whether a packet should be processed or skipped), and/or the like. As examples, the PDI can include one or more of source information (e.g., a tag or keyword within one or more packet fields to search for), UE network address (e.g., IP address, MAC address, and/or the like), network instance information (e.g., identifies a network instance associated with the incoming packet), Packet Filter Set (see e.g., [TS23501], clause 5.7.6), app ID, QoS flow ID, Ethernet PDU session information (e.g., Refers to all the (DL) Ethernet packets matching an Ethernet PDU session, as further described in clause 5.6.10.2 of [TS23501] and in 3GPP TS 29.244 v17.3.0 (2021-12-16)), Framed Route Information (see e.g., [TS23501], clause 5.6.14), and/or other like information.

After the edge data 504 is extracted by the extraction logic 505, the edge data 504 is provided to a BBU/vRAN preprocessing stage 506. The RIC 202 configures the BBU/vRAN preprocessing stage 506 to perform various preprocessing processes. The pre-processing processes may include, for example, frame ordering, CRC and/or checksum verification, and/or other like processes. After the preprocessing stage 506, a BBU/vRAN processing 507 stage takes place. The RIC 202 configures the BBU/vRAN processing stage 507 to perform various processes. This configuration may be part of the same or different configuration as the preprocessing stage 506 configuration. The BBU/vRAN processing 507 stage includes, for example, decoding, demapping, de-encapsulation, decryption, translation, transformation, and/or other like processes. Additionally or alternatively, the BBU/vRAN processing 507 stage includes determining or identifying the appropriate edge compute workload 236 (e.g., including specific edge app(s) and/or edge service(s)) that is to receive the edge data 504, and sending, forwarding, or otherwise providing the edge data 504 to the edge compute workload 236.

After the edge data 504 is processed, the edge data 504 enters an app layer processing stage 508 before the edge data 504 is provided to the edge compute workload 236. The app layer processing 508 may include, for example, PDU session user plane protocol services (e.g., provision of control information elements associated with a PDU session, flow control, data forwarding handling, and the like), performing one or more operations or functions requested by the sending host or otherwise intended by the requesting device (e.g., request methods, domain name resolution and/or URL resolution, store data, access data, facilitate communication, and/or other operations/functions), and/or the like. Here, the sending host or the requesting device may be the UE 110 or user app running in the UE 110. After the app layer processing 508, the edge data 504 is provided to the edge compute workload 236, which performs appropriate operations using the edge data 504 and/or otherwise processes the edge data 504.

In some implementations, the processing stages 506, 507, and 508 are part of an edge-specific dataflow, which involves operating the protocol layer of the RANF as well as lightweight versions of other protocol sublayers. For example, if the RANF 530 is configured to operate a MAC sublayer of the 3GPP 5G protocol stack after a PHY sublayer of the RRH 130, the processing stages 506 and 507 may include performing lightweight versions of the RLC, PDCP, and SDAP sublayers (and/or BAP or F1AP sublayers, in IAB implementations) of the 3GPP 5G protocol stack (see e.g., [TS38300]), as well as aspects of lightweight versions of network layer and transport layer protocols. These lightweight versions of the protocol (sub)layers may be specifically tailored for processing edge data, where certain functions or operations can be altered or omitted depending on the ECT and/or network implementation. Additionally or alternatively, some or all aspects of network layer and transport layer functions can be performed by the app layer processing stage 508. As examples, the network layer protocol may include internet protocol (IP), IP security (IPsec), Internet Control Message Protocol (ICMP), Internet Group Management Protocol (IGMP), Subnetwork Access Protocol (SNAP), and/or some other internet or network protocol layer. As examples, the transport layer protocol may include transmission control protocol (TCP), Multipath TCP (MPTCP), user datagram protocol (UDP), Multipath UDP (MPUDP), Quick UDP Internet Connections (QUIC), MultiPath QUIC (MPQUIC), Generic Routing Encapsulation (GRE), Stream Control Transmission Protocol (SCTP), Datagram Congestion Control Protocol (DCCP), GPRS Tunneling (GTP), and/or the like. As examples, the transport layer protocol may include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Transport Layer Security (TLS), Extensible Messaging and Presence Protocol (XMPP), and/or the like. In various implementations, the lightweight versions of the protocol (sub)layers and/or the edge-specific dataflow are configuration information that is included in a suitable configuration such as those discussed previously with respect to FIG. 4.

After the edge compute workload 236 processes the edge data 504, the processed edge data 514 undergoes app layer processing 518. The app layer processing 518 may include formatting the edge data 514 so that an appropriate transport layer protocol can handle the edge data 514 (or the packet 501) and/or other like operations/functions. The app layer processing stage 518 may include performing, in reverse, the same or similar operations as the app layer processing stage 508. After the app layer processing 518, BBU/vRAN processing 517 takes place, which may include, for example, encoding, encapsulation, mapping, encryption, translation, and/or other like processes. Then, a RIC processing stage 516 processes the edge data 514 according to a processing configuration provided by RIC 202. In some implementations, the BBU/vRAN processing 517 and RIC processing stage 516 may include performing, in reverse, the same or similar operations as the processing stages 507 and 506, respectively.

After the processing stage(s) 517 and 516, the edge data 514 is provided to the insertion logic 515, which inserts the edge data 514 back into the protocol stack processing data flow as indicated by configuration information provided by the RIC 202. The insertion logic 515 may be any suitable mechanism that performs packet editing, editing updating, packet injection, and/or packet insertion processes, and/or the like. In these implementations, the insertion logic 515 may be a packet injection function, packet editor, and/or the like. In some implementations, the RIC 202 configures the insertion logic 515 with packet insertion configuration information such as, for example, specified start and end bytes within the payload section 503 and/or the DFs/DEs within the packet's 501 payload section 503 where the edge data 514 is to be added or inserted, header information to be includes in the packet's 501 header section 502 (e.g., SNs, network addresses, flow IDs, session IDs, app IDs, and/or other IDs associated with subscriber UEs 110 and/or UE-specific data), flow classification, zero padding replacement, and/or other like configuration information such as the information discussed previously with respect to the extraction logic 505 and/or discussed in Table 4-1, Table 4-2, Table 4-3, and Table 4-4. In some implementations, the insertion logic 515 reformats or rebuilds the packet 501 instead of, or in addition to inserting the edge data 514 into the packet 501. When the packet 501 is rebuilt, the packet 501 includes the header section 502 and the payload section 503, which contains the processed edge data 514 from the edge compute workload 236. In some implementations, the configuration information (e.g., those discussed in Table 4-1, Table 4-2, Table 4-3, and Table 4-4) can be used for heterogeneous networking scenarios. For example, the configuration information can designate a first communication network/protocol used for conveying the packet 501 in the UL direction (e.g., from a UE 110 to RANF 411 using 3GPP 5G/NR RAT or the like), and can designate a second communication network/protocol used for conveying the packet 501 (e.g., from the RANF 411 to a destination node using a WiFi RAT or the like).

1.4. Example Procedures and Processes

Figure 6:
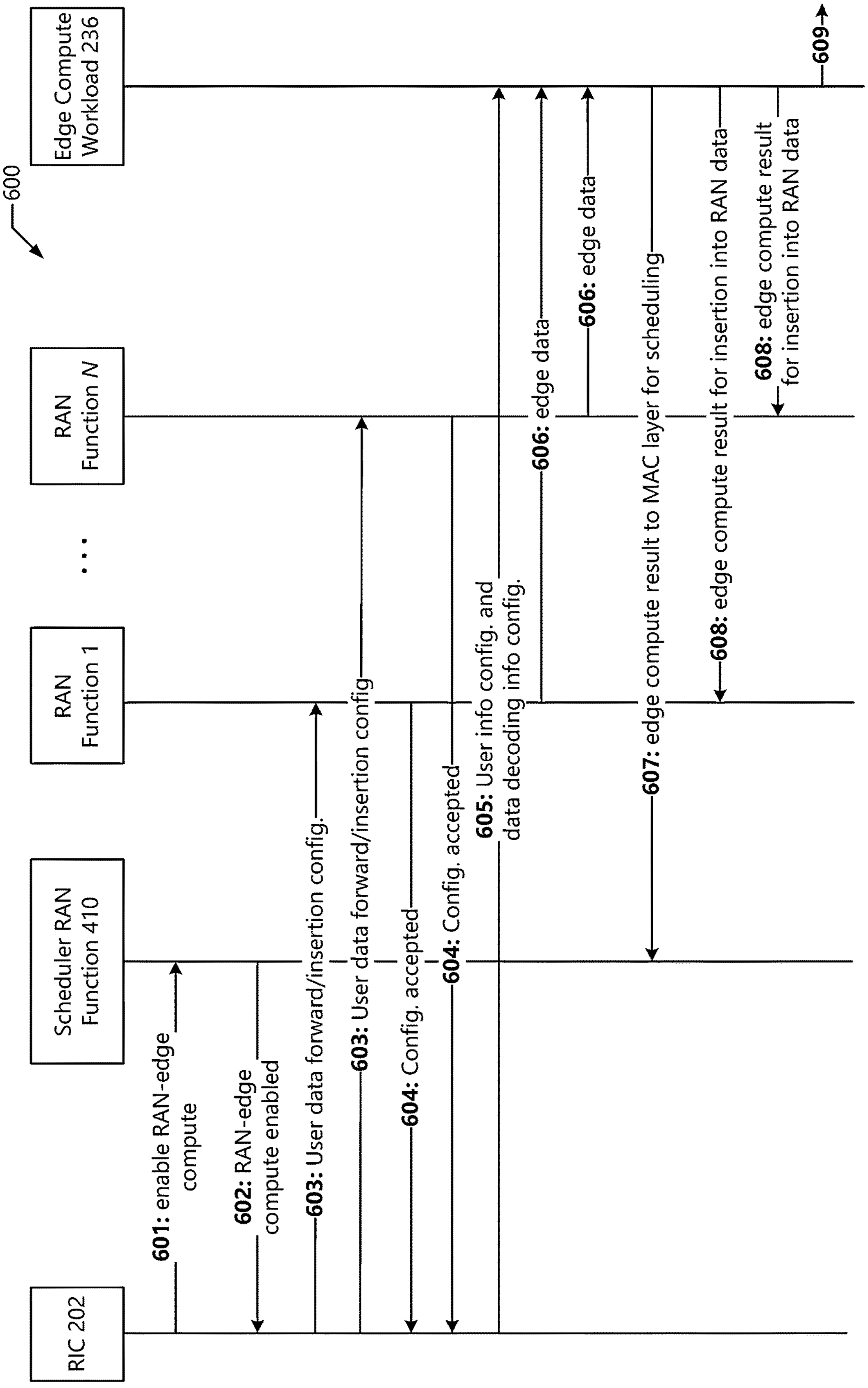
FIG. 6 depicts a procedure for providing edge computing over disaggregated RAN.

FIG. 6 shows an example disaggregated edge procedure 600 involving interactions between RIC 202 and disaggregated RANFs 1-N (including RANF 410) that host respective ECFs 1-M (including edge compute workload 236), as the edge computing framework. Procedure 600 begins at operation 601 where the RIC 202 enables RAN-edge compute resource scheduling at a RANF 410 that implements RAN scheduler function(s) (e.g., a MAC scheduler, MLME, and/or the like). At operation 602, RANF 410 sends a confirmation or acknowledgement (ACK) message indicating that RAN-edge compute resource scheduling has been enabled. In one example, the RIC 202 enables RAN-edge compute resource scheduling by provisioning or otherwise providing the RANF 410 with a RAN-edge compute resource scheduling configuration at operation 601. In another example, the RIC 202 enables RAN-edge compute resource scheduling by sending a request to the RANF 410 requesting the edge compute resource scheduling configuration from the RANF 410, and the RANF 410 sends the edge compute resource scheduling configuration in the confirmation/ACK message at operation 602. In either example, the RAN-edge compute resource scheduling configuration may be the same or similar as the EdgeCompute_Resources_scheduling_info configuration information of Table 4-1.

At operation 603, the RIC 202 provisions or otherwise provides a user data forward/insertion configuration to relevant or desired RANFs 1-N that are hosting respective ECFs 1-M. In some implementations, the user data forward/insertion configuration may include the same or similar information as the data_extraction_info configuration information of Table 4-2. At operation 604, the RANFs 1-N that received the user data forward/insertion configuration send a ACK or other like message indicating that the configuration was accepted (or rejected if applicable).

At operation 605, the RIC 202 provisions or otherwise provides a user information configuration and a data decoding info/configuration to the relevant/desired edge compute workload 236. In some implementations, the user information configuration and the data decoding info/configuration may be the same or similar as the edge_compute_info configuration information of Table 4-4 and/or the edge_data_info configuration information of Table 4-3.

At operation 606, individual RANFs 1-N receive packets from one or more UEs 110, extract the edge data from the packets, and provide the edge data (e.g., UE-specific data or "User data for Edge Compute") to the edge compute workload 236. The edge compute workload 236 uses the edge data to provide edge services to the UEs 110. After the edge compute workload 236 finished processing the edge data (e.g., computes or generates an "edge compute result"), the edge compute workload 236 may perform one or more of operations 607 to 609.

At operation 607 (option 1), the edge compute workload 236 sends the edge compute result to the RANF 410 (e.g., implementing the MAC layer) for scheduling transmission of the edge compute result to or towards an intended destination (or multiple intended destinations). At operation 608 (option 2), the edge compute workload 236 provides the edge compute result to the individual RANFs 1-N for insertion into RAN data, which is then processed and conveyed to or towards its intended destination (or multiple intended destinations). At operation 609 (option 3), the edge compute workload 236 forwards, sends, or otherwise provides the edge compute result to an entity outside of the RAN. As examples, the entity outside of the RAN can include the UE 110 or another UE 110, a NAN 1030 (e.g., implementing a different RAT or the like), one or more other ECFs (or edge compute nodes 1036), a cloud computing service 1044, one or more app servers 1050, a database or a particular database record, and/or any other like device or element.

In some implementations, a user application that requests edge computing services currently depends on complete access network processing before edge compute operations can be performed on the user (edge) data. To overcome this, the RIC 202 coordinates with the edge app deployment (e.g., edge platform or the like) to determine which edge compute node/function (e.g., edge compute workload 236) needs to be enabled.

The selection of a particular edge compute node/function may be based on the proximity to the user/UE 110 requesting the edge services, a predicted location of the user/UE 110 requesting the edge services (e.g., when the UE 110 is traveling or the like), the network connectivity (e.g., channel conditions and the like), subscription data, availability of computing resources, and/or other like parameters or conditions. Once selected, the extraction logic is applied to the selected RANF 1-N. For instance, if the data needs to be extracted at the low-PHY layer, then the location of I/Q parts of OFDM symbols (e.g., digitized format of the I/Q components of modulated signals) is provided to the selected RANF 1-N, along with the decoding parameters/logic for the decoding the data. In 5G implementations, examples of the parameters include the C-RNTI of the user/UE 110 (which is unique to each user and radio node), modulation scheme, channel coding and/or network coding information, and/or other like parameters. Once the extraction logic is provided to the selected RANF 1-N, edge data can be selectively extracted and forwarded to the edge computing workload 236, such that the edge app processing can be performed.

If the edge data needs to be forwarded back to the user/UE 110, the processed edge data is sent to the RANF block such that the data can be inserted back to the RBs 302 of the time-frequency grid 301, 310. Additionally or alternatively, the insertion of the data can be coordinated with the resource scheduler at RANF implementing the MAC layer of the protocol stack.

Figure 9:
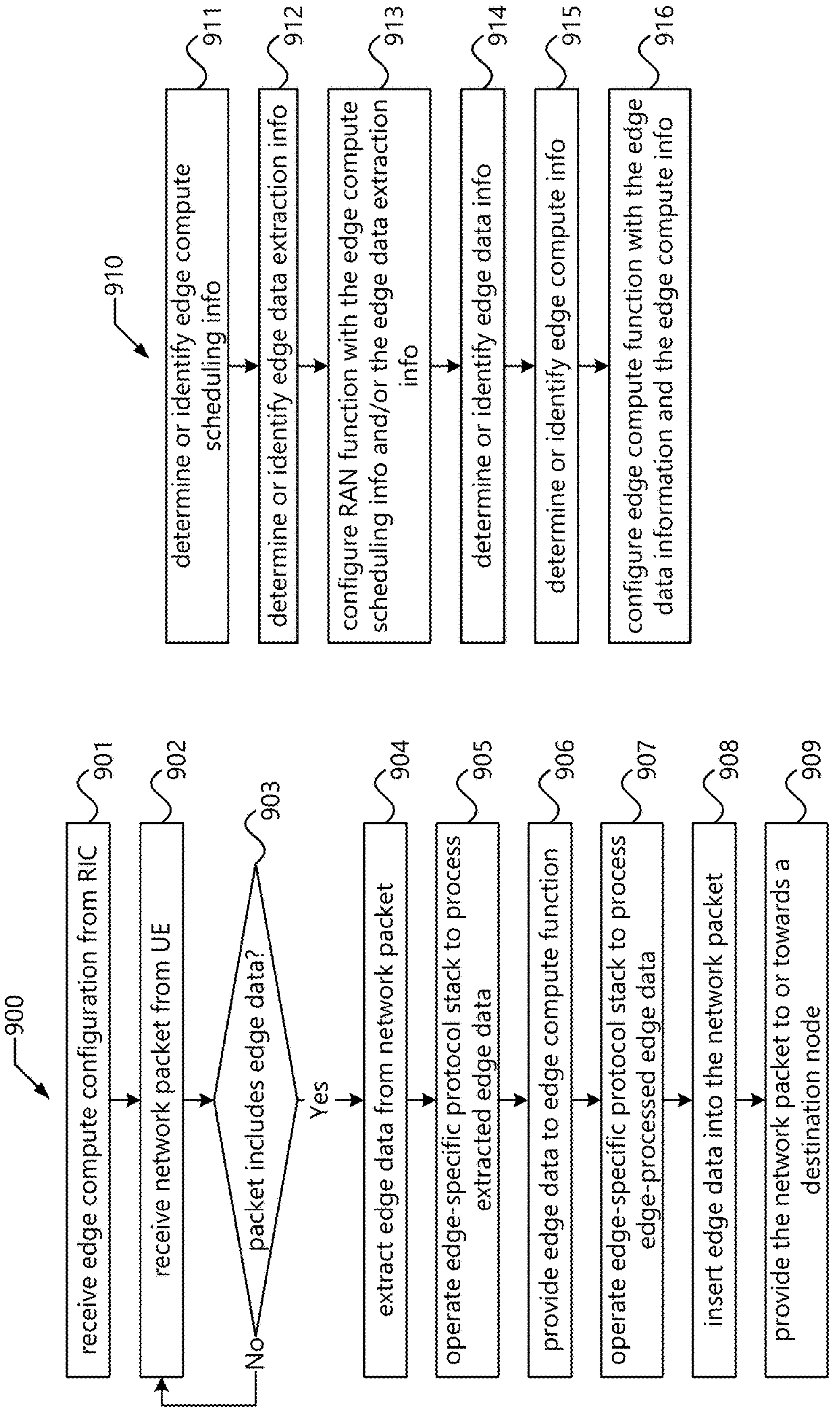
FIG. 9 depicts example processes for practicing the embodiments discussed herein.

FIG. 9 shows an example process 900*a* for operating a compute node configured to operate RANF. Process 900*a* begins at operation 901 where the RANF receives, from the RIC 202, a configuration including information for routing edge data to an ECF. In some implementations, the ECF is co-located with the RANF. In some implementations, the ECF being "co-located" with the RANF means that the ECF is deployed or disposed at a same cell site or location as the RANF (e.g., within some predefined distance or the like). Additionally or alternatively, the ECF being "co-located" with the RANF means that the ECF is operated on the same compute platform as the RANF. Additionally or alternatively, the ECF being "co-located" with the RANF means that the ECF and the RANF are software elements operated by the same compute node or circuitry. In some implementations, the ECF and the RANF are part of a multi-site network service, wherein the RANF and the ECF are deployed at more than one site or location.

At operation 902, the RANF receives a network packet 501 from a UE 110. At operation 903, the RANF determines whether the network packet 501 includes edge data 504 intended for delivery to an edge computing application (app) (e.g., the edge computing workload 236) based on scheduling information included in the configuration. If the network packet 501 does not include edge data 504, the RANF proceeds back to operation 902 to receive another network packet 501. If the network packet 501 does include edge data 504, the RANF proceeds to operation 904 where the RANF extracts the edge data 504 from the network packet 501 using data extraction information in the configuration. At operation 905, the RANF operates an edge-specific protocol stack to process the extracted edge data 504. The edge-specific protocol stack includes versions of protocol layers of other RANFs of the plurality of RANFs. At operation 906, the RANF provides the extracted edge data 504 to an ECF (e.g., edge compute workload 236) indicated by the network packet 501 or indicated by the configuration. In some implementations, providing the extracted edge data 504 to an ECF can include sending the edge data 504 to the ECF over a wired or wireless link (e.g., when deployed as a separate compute node), over an interconnect (IX) (e.g., when the ECF and RANF are deployed as individual hardware elements in the same platform), and/or via an API/WS (e.g., when the ECF and RANF are deployed as individual software elements in the same or different platforms). At operation 907, the RANF obtains processed edge data 514 from the ECF (e.g., edge compute workload 236) and operates the edge-specific protocol stack to process the processed edge data 514 for inclusion in the same or different network packet 501. At operation 908, the RANF inserts the edge data 514 into the same or different network packet 501, and at operation 909, the RANF provides the network packet 501 to or towards a destination node (or multiple destination nodes). In some implementations, providing the network packet to or toward the destination node can include sending the network packet over a wired or wireless link, over an IX, and/or via an API or WS. In some implementations, providing or sending the network packet to or toward the destination node can include sending the network packet (or respective copies of the network packet) to or towards multiple destination nodes via multicast or broadcast transmission or the like. After operation 909, process 900 may end or repeat as necessary. FIG. 9 also shows an example process 910 for operating a RIC 202. Process 910 begins at operation 911 where the RIC 202 determines or identifies edge compute scheduling information (see e.g., Table 4-1). At operation 912, the RIC 202 determines or identifies edge data_extraction_information (see e.g., Table 4-2). At operation 913, the RIC 202 configures a RANF 410, 411 with the edge compute scheduling information and/or the edge data_extraction_information. At operation 914, the RIC 202 determines or identifies edge_data_information, and at operation 915, the RIC 202 determines or identifies edge_compute_information. At operation 916, the RIC 202 configures an ECF with the edge_data_information and the edge_compute_information. In some implementations, the first RANF is different than the second RANF. After operation 916, process 910 may end or repeat as necessary.

1.5. 3GPP Functional Split Options

Figure 7:
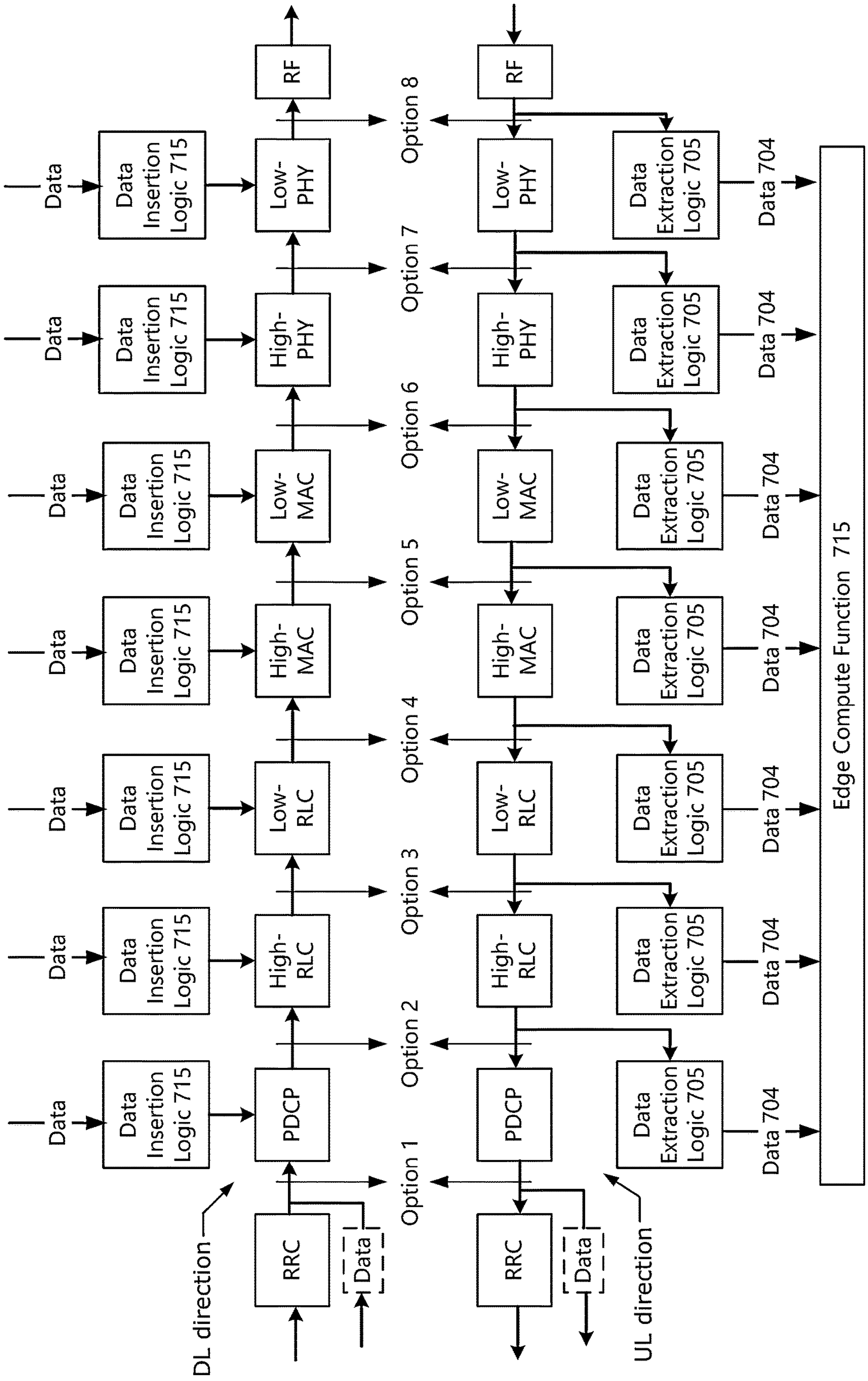
FIG. 7 depicts functional split options including edge computing over disaggregated RAN.

FIG. 7 shows an various functional split options, for both DL and UL directions, in the disaggregated RAN. Our proposed method is to be able to extract the user data regardless of the functional split option. The traditional RAN is an integrated network architecture based on a distributed RAN (D-RAN) model, where D-RAN integrates all RANFs into a few network elements. As alluded to previously, the disaggregated RAN architecture provides flexible function split options to overcome various drawbacks of the D-RAN model. The disaggregated RAN breaks up the integrated network system into several function components that can then be individually re-located as needed without hindering their ability to work together to provide a holistic network services.

The split options in FIG. 7 are mostly split between the CU 132 and the DU 131, but can include a split between the CU 132, DU 131, and RU 130. For each option in FIG. 7, protocol entities on the left side of the figure are included in the RANF implementing the CU 132 and the protocol entities on the right side of the figure are included in the RANF implementing the DU 131. For example, the Option 2 function split includes splitting non-RT processing (e.g., RRC and PDCP layers) from RT processing (e.g., RLC, MAC, and PHY layers), where the RANF implementing the CU 132 performs network functions of the RRC and PDCP layers, and the RANF implementing the DU 131 performs the baseband processing functions of the RLC (including high-RLC and low-RLC), MAC (including high-MAC and low-MAC), and PHY layers. In some implementations, the PHY layer is further split between the DU 131 and the RU 130, where the RANF implementing the DU 131 performs the high-PHY layer functions and the RU 130 handles the low-PHY layer functions. In some implementations, the Low-PHY entity may be operated by the RU 130 regardless of the selected functional split option. Under the Option 2 split, the RANF implementing the CU 132 can connect to multiple DU 131 (e.g., the CU 132 is centralized), which allows RRC and PDCP anchor change to be eliminated during a handover across DUs 131 and allows the centralized CU 132 to pool resources across several DUs 131. In these ways, the option 2 function split can improve resource efficiencies. The particular function split option used may vary depending on the service requirements and network deployment scenarios, and may be implementation specific. It should also be noted that in some implementations, all of the function split options can be selected where each protocol stack entity is operated by a respective RANF (e.g., a first RANF operates the RRC layer, a second RANF operates the PDCP layer, a third RANF operates the high-RLC layer, and so forth until an eighth RANF operates the low-PHY layer).

Regardless of the selected functional split option, according to various embodiments, edge data insertion logic 715 and edge data extraction logic 705 are added to the selected functional split. In this example, the edge data insertion logic 715 and the edge data extraction logic 705 are added to the RANF where the functional split takes place. For example, the Option 2 function split may include the logic 715 and 705 at the RANF implementing the CU 132 and/or at the RANF implementing the DU 131. In various embodiments, the RIC 202 provides configurations to the RANF(s) to perform the extraction logic 705 and the insertion logic 715. In some implementations, the extraction logic 705 corresponds to the extraction logic 505 of FIG. 5, and the insertion logic 715 corresponds to the insertion logic 515 of FIG. 5.

1.6. Example Use Case

Figure 8:
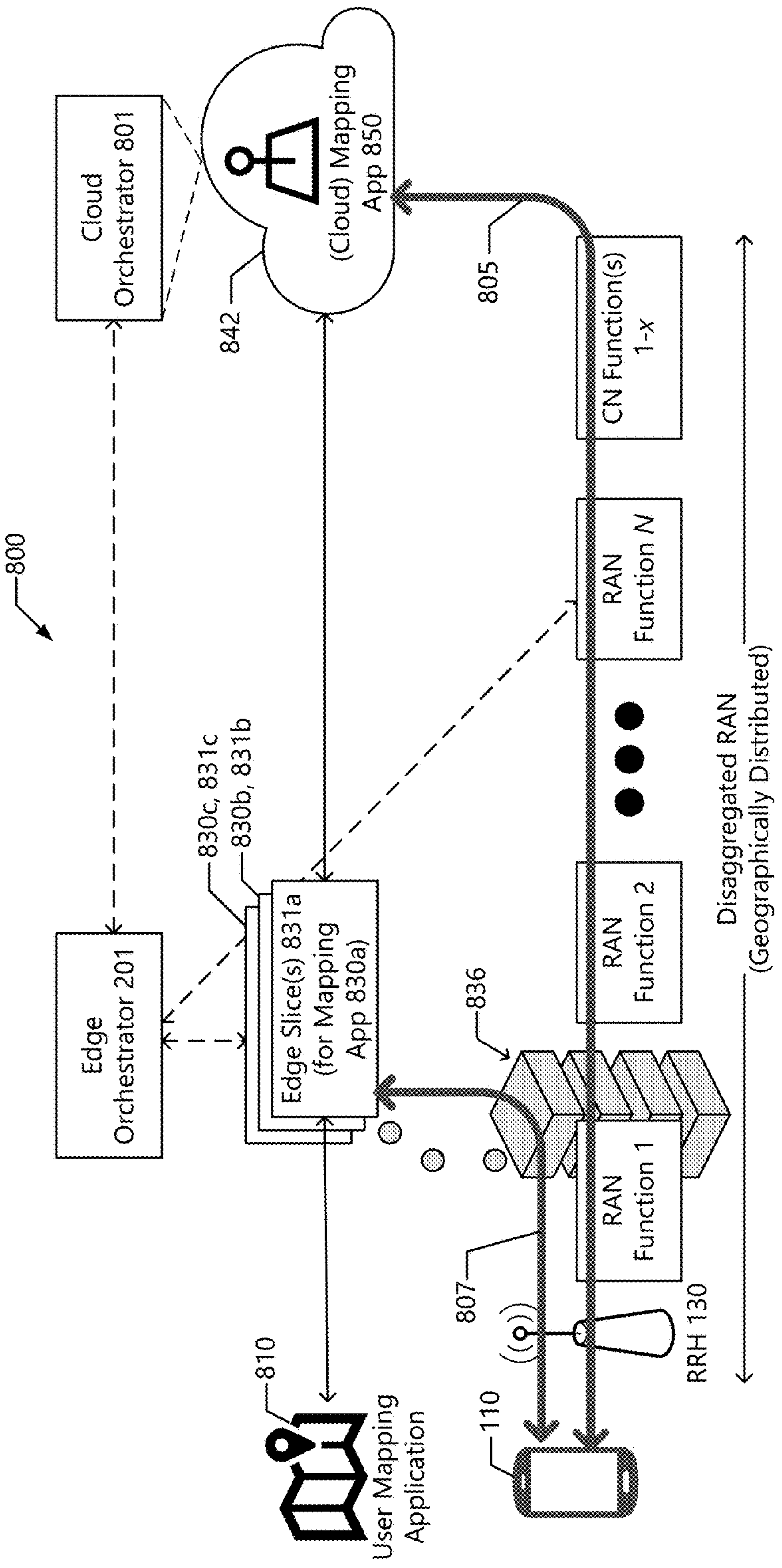
FIG. 8 depicts an example scenario showing edge compute resource provisioning and management as a service to cloud service providers.

FIG. 8 shows an example use case scenario 800 involving a cloud platform 842 that provides mapping services to end-users (e.g., UE 110). The mapping services may include, for example, satellite imagery, aerial photography, street view maps and/or other images, 360° interactive panoramic views of streets, real-time traffic condition reporting, route planning and turn-by-turn navigation services. The mapping service includes a user mapping app 810 operating on the UE 110 that sends and receives data from a counterpart In a traditional cloud architecture, the cloud mapping app 850 resides in the cloud platform 842. In order for the user/UE 110 to obtain mapping services, the user mapping app 810 sends requests and/or various mapping related data (e.g., location information, video data, sensor data, and/or the like) to the cloud platform 842 through the access network (including all of the RANFs 1-N and all of the CN functions 1-x) along path 805 in FIG. 8. The cloud mapping app 850 residing in the cloud platform 842 processes requests and mapping-related data, and serves mapping service content to the user/UE 110 by sending data back to the user/UE 110 through the access network (including all of the RANFs 1-N and all of the CN functions 1-x) along path 805 in FIG. 8. The cloud orchestrator 801 performs various tasks to manage connections and operations of workloads in the cloud platform 842 such as spinning up VMs, provisioning and initializing servers to operate the cloud mapping app 850, acquiring and assigning storage capacity; manage network connections, and/or the like.

In contrast to the traditional model, the disaggregated edge architecture in scenario 800 allows the mapping app 830 to be spun up at edge compute node 836, which co-located with RANF 1 and is geographically closer to the end-user/UE 110 than the cloud platform 842. In this example, RANF 1 may be a DU 132 that implements MAC layer and high-PHY layer functions. The cloud orchestrator 801 communicates with the edge orchestrator 201 to request services at or near RANF 1, and the edge orchestrator 201 allocates edge compute resources 836 for operating the mapping app 830. In this example, the edge orchestrator 201 can provision or spin-up an edge slice 831*a* in which the mapping app 830*a* is to operate. In some example, an ECF 1-M may correspond to an edge slice 831*a* and at least some of the edge compute resources 836, one or more of the edge slices 831 and/or a combination of some or all of the edge compute resources 836 and one or more edge slices 831. In some implementations, edge compute resources 836 can be configured to be shared among multiple ECFs. The edge slice 831 is a logical edge compute node that provides specific edge processing capabilities and characteristics, supporting one or more edge services properties for subscribing users/UEs 110. In some implementations, the edge slice 831 can be respective VMs 231 and/or respective containers 233. Here, the owner/operator of the edge platform (including edge compute resources 836) can provide physical compute resource scaling to provide edge services to customer/subscriber platforms (e.g., cloud platform 842). In this way, edge platform owners/operators can scale the edge compute resources 836 to extend their infrastructure as a service to service providers (e.g., cloud platform 842).

1.7. Security Aspects

Security mechanisms can be employed at ECFs 1-M and RANFs 1-N to prevent security layers from being bypassed. In various implementations, integrity and confidentiality protected data can have their own data formats that would become part of the lexicon of data types that the RIC 202, RANFs 1-N, ECFs 1-M, and/or edge compute workloads 236. As examples, non-protected data may be represented using a serializable format such as ASN.1, JavaScript Object Notation (JSON), MessagePack, Concise Binary Object Representation (CBOR), and/or the like, and the format of the protected data may include CBOR Object Signing and Encryption (COSE) (see e.g., Schaad et al., *CBOR Object Signing and Encryption*, IETF RFC 8152 (July 2017)), CBOR Web Token (CWT) (see e.g., Jones et al., *CBOR Web Token* (*CWT*), IETF RFC 8392 (May 2018)), JSON Web Token (see e.g., Jones et al., *JSON Web Token* (*JWT*), IETF RFC 7519 (May 2015)), Kerberos (see e.g., Neuman et al., The Kerberos Network Authentication Service (V5), IETF RFC 4120 (July 2005), and Johansson, *An Information Model for Kerberos Version* 5, IETF RFC 6880 (March 2013)), and/or the like. In some implementations, an additional dependency for encode/decode upon a key management service that ensures the security wrappers can be opened at the permitted time and at the permitted processing node (e.g., RANF nodes and the like).

In various implementations, the security functions of the access network protocol stack are also included in the edge processing dataflow or pipeline, and security functions means RAN and edge nodes have the necessary capabilities to locally process security wrappers. In these implementations, the extraction logic (e.g., extraction logic 505 and 705) is configured by the RIC 202 to identify a secured payload (e.g., edge data 504 in payload section 503 of a packet 501) using information in the header section 502 of a packet 501. The packet 501 is then cracked open by the appropriate security algorithms/methods of the edge processing dataflow adding to the cascade of possible NFs. Additionally or alternatively, the ECT used for the ECFs 1-M ensures the data caches include securely caching security credentials, and keying material as needed to achieve the expected efficiency gains.

Additionally or alternatively, e2e security can be established using existing mechanisms (e.g., HTTPs) where the user app communicates with the service provider platform (e.g., cloud platform 842), the service provider platform authenticates the user/UE 110, and the service provider platform (e.g., cloud platform 842) passes the authentication information to the RIC 202. Additionally or alternatively, the service provider platform (e.g., cloud platform 842) may send an indicator or some other message indicating that the user/UE 110 has been authenticated.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific HW, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), NFV, distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 10:
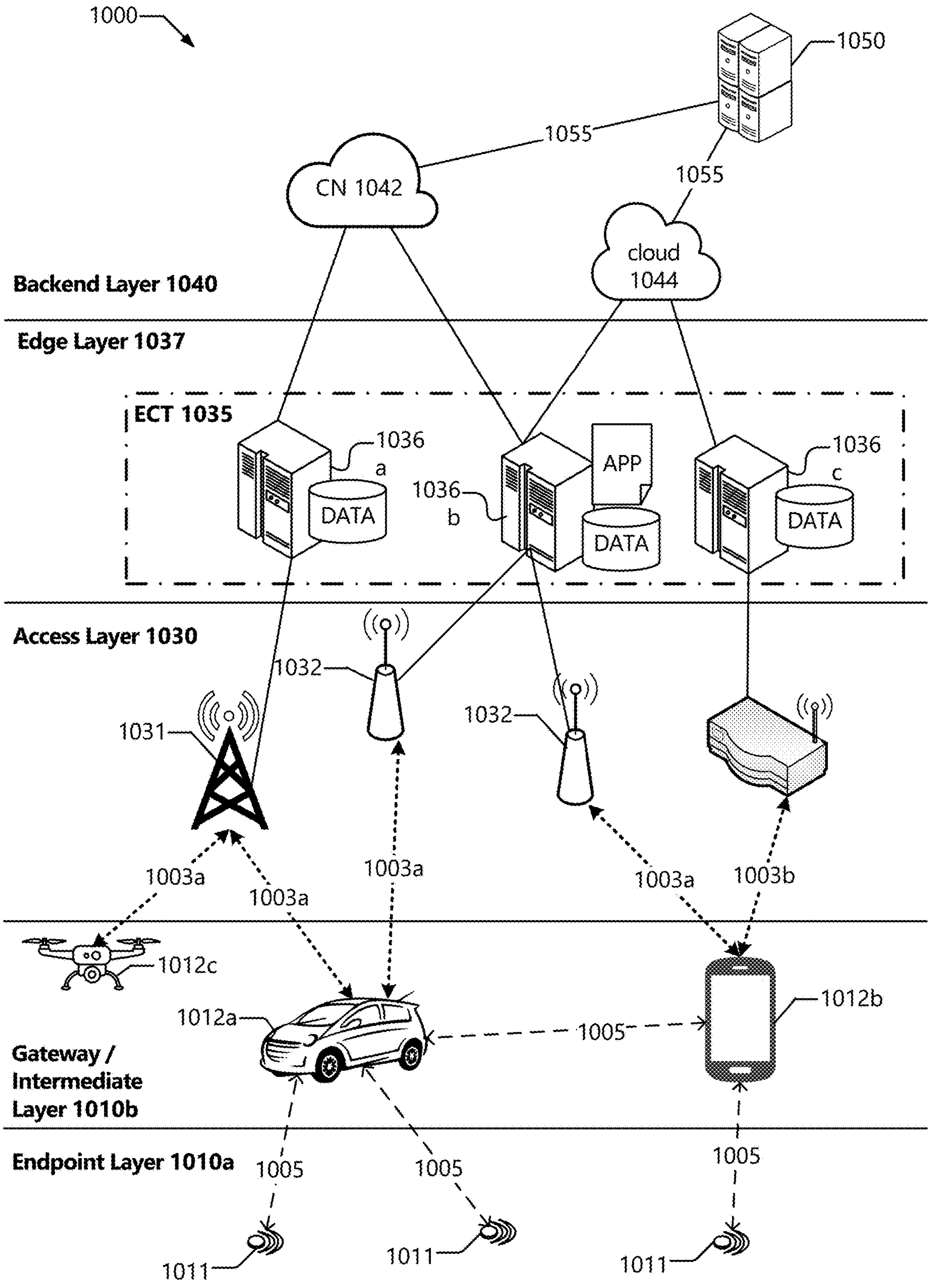
FIG. 10 illustrates an example edge computing environment.

FIG. 10 illustrates an example edge computing environment 1000 including different layers of communication, starting from an endpoint layer 1010*a* (also referred to as "sensor layer 1010*a*", "things layer 1010*a*", or the like) including one or more IoT devices 1011 (also referred to as "endpoints 1010*a*" or the like) (e.g., in an Internet of Things (IoT) network, wireless sensor network (WSN), fog, and/or mesh network topology); increasing in sophistication to intermediate layer 1010*b* (also referred to as "client layer 1010*b*", "gateway layer 1010*b*", or the like) including various user equipment (UEs) 1012*a*, 1012*b*, and 1012*c* (also referred to as "intermediate nodes 1010*b*" or the like), which may facilitate the collection and processing of data from endpoints 1010*a*; increasing in processing and connectivity sophistication to access layer 1030 including a set of network access nodes (NANs) 1031, 1032, and 1033 (collectively referred to as "NANs 1030" or the like); increasing in processing and connectivity sophistication to edge layer 1037 including a set of edge compute nodes 1036*a-c* (collectively referred to as "edge compute nodes 1036" or the like) within an edge computing framework 1035 (also referred to as "ECT 1035" or the like); and increasing in connectivity and processing sophistication to a backend layer 1040 including core network (CN) 1042, cloud 1044, and server(s) 1050. The processing at the backend layer 1040 may be enhanced by network services as performed by one or more remote servers 1050, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 1000 is shown to include end-user devices such as intermediate nodes 1010*b* and endpoint nodes 1010*a* (collectively referred to as "nodes 1010", "UEs 1010", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 1030, which are arranged to provide network connectivity to the UEs 1010 via respective links 1003*a* and/or 1003*b* (collectively referred to as "channels 1003", "links 1003", "connections 1003", and/or the like) between individual NANs 1030 and respective UEs 1010.

As examples, the communication networks and/or access technologies may include cellular technology such as LTE, MuLTEfire, and/or NR/5G (e.g., as provided by Radio Access Network (RAN) node 1031 and/or RAN nodes 1032), WiFi or wireless local area network (WLAN) technologies (e.g., as provided by access point (AP) 1033 and/or RAN nodes 1032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1010*b* include UE 1012*a*, UE 1012*b*, and UE 1012*c* (collectively referred to as "UE 1012" or "UEs 1012"). In this example, the UE 1012*a* is illustrated as a vehicle system (also referred to as a vehicle UE or vehicle station), UE 1012*b* is illustrated as a smartphone (e.g., handheld touchscreen mobile computing device connectable to one or more cellular networks), and UE 1012*c* is illustrated as a flying drone or unmanned aerial vehicle (UAV). However, the UEs 1012 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, etc.), plug computers, and/or any type of computing device such as any of those discussed herein.

The endpoints 1010 include UEs 1011, which may be IoT devices (also referred to as "IoT devices 1011"), which are uniquely identifiable embedded computing devices (e.g., within the Internet infrastructure) that comprise a network access layer designed for low-power IoT applications utilizing short-lived UE connections. The IoT devices 1011 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 1011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1011 can utilize technologies such as M2M or MTC for exchanging data with an MTC server (e.g., a server 1050), an edge server 1036 and/or ECT 1035, or device via a PLMN, ProSe or D2D communication, sensor networks, or IoT networks. The M2M or MTC exchange of data may be a machine-initiated exchange of data.

The IoT devices 1011 may execute background applications (e.g., keep-alive messages, status updates, etc.) to facilitate the connections of the IoT network. Where the IoT devices 1011 are, or are embedded in, sensor devices, the IoT network may be a WSN. An IoT network describes an interconnecting IoT UEs, such as the IoT devices 1011 being connected to one another over respective direct links 1005. The IoT devices may include any number of different types of devices, grouped in various combinations (referred to as an "IoT group") that may include IoT devices that provide one or more services for a particular user, customer, organizations, etc. A service provider (e.g., an owner/operator of server(s) 1050, CN 1042, and/or cloud 1044) may deploy the IoT devices in the IoT group to a particular area (e.g., a geolocation, building, etc.) in order to provide the one or more services. In some implementations, the IoT network may be a mesh network of IoT devices 1011, which may be termed a fog device, fog system, or fog, operating at the edge of the cloud 1044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1044 to Things (e.g., IoT devices 1011). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1030) and/or a central cloud computing service (e.g., cloud 1044) for performing heavy computations or computationally burdensome tasks. On the other hand, edge cloud computing consolidates human-operated, voluntary resources, as a cloud. These voluntary resource may include, inter-alia, intermediate nodes 1020 and/or endpoints 1010, desktop PCs, tablets, smartphones, nano data centers, and the like. In various implementations, resources in the edge cloud may be in one to two-hop proximity to the IoT devices 1011, which may result in reducing overhead related to processing data and may reduce network delay.

Additionally or alternatively, the fog may be a consolidation of IoT devices 1011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1044. The fog operating at the edge of the cloud 1044 may overlap or be subsumed into an edge network 1030 of the cloud 1044. The edge network of the cloud 1044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1036 or edge devices). The Fog layer resides on top of the edge layer and is a consolidation of networking devices such as the intermediate nodes 1020 and/or endpoints 1010 of FIG. 10.

Data may be captured, stored/recorded, and communicated among the IoT devices 1011 or, for example, among the intermediate nodes 1020 and/or endpoints 1010 that have direct links 1005 with one another as shown by FIG. 10. Analysis of the traffic flow and control schemes may be implemented by aggregators that are in communication with the IoT devices 1011 and each other through a mesh network. The aggregators may be a type of IoT device 1011 and/or network appliance. In the example of FIG. 10, the aggregators may be edge nodes 1030, or one or more designated intermediate nodes 1020 and/or endpoints 1010. Data may be uploaded to the cloud 1044 via the aggregator, and commands can be received from the cloud 1044 through gateway devices that are in communication with the IoT devices 1011 and the aggregators through the mesh network. Unlike the traditional cloud computing model, in some implementations, the cloud 1044 may have little or no computational capabilities and only serves as a repository for archiving data recorded and processed by the fog. In these implementations, the cloud 1044 centralized data storage system and provides reliability and access to data by the computing resources in the fog and/or edge devices. Being at the core of the architecture, the Data Store of the cloud 1044 is accessible by both Edge and Fog layers of the aforementioned edge-fog network.

As mentioned previously, the access networks provide network connectivity to the end-user devices 1020, 1010 via respective NANs 1030. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RANF split, wherein one or more communication protocol layers are operated by the CRAN/CR/vBBUP and other communication protocol entities are operated by individual RAN nodes 1031, 1032. This virtualized framework allows the freed-up processor cores of the NANs 1031, 1032 to perform other virtualized applications, such as virtualized applications for various elements discussed herein. Furthermore, the NANs 1030 may each be, or may include, disaggregated RANFs such as those discussed herein (see e.g., FIG. 1).

The UEs 1010 may utilize respective connections (or channels) 1003*a*, each of which comprises a physical communications interface or layer. The connections 1003*a* are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1010 and the NANs 1030 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1010 and NANs 1030 may operate using LAA, enhanced LAA (eLAA), and/or further eLAA (fe-LAA) mechanisms. The UEs 1010 may further directly exchange communication data via respective direct links 1005, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1010 provide radio information to one or more NANs 1030 and/or one or more edge compute nodes 1036 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1010 current location). As examples, the measurements collected by the UEs 1010 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), *IEEE Standard for Information Technology—Telecommunications and Information Exchange between Systems—Local and Metropolitan Area Networks—Specific Requirements—Part 11: Wireless LAN Medium Access Control (MAC)and Physical Layer (PHY)Specifications*, IEEE Std 802.11-2020, pp. 1-4379 (26 Feb. 2021) ("[IEEE80211]"), and/or the like. Additionally or alternatively, any of the aforementioned measurements (or combination of measurements) may be collected by one or more NANs 1030 and provided to the edge compute node(s) 1036.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1010, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to network service(s) and/or NF service (NFS); measurements related to Packet Flow Description (PFD); measurements related to Random Access Channel (RACH); measurements related to Measurement Report (MR); measurements related to Layer 1 Measurement (LIM); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TS28552]"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 1010 report radio information either at a low periodicity or a high periodicity depending on a data transfer that is to take place, and/or other information about the data transfer. Additionally or alternatively, the edge compute node(s) 1036 may request the measurements from the NANs 1030 at low or high periodicity, or the NANs 1030 may provide the measurements to the edge compute node(s) 1036 at low or high periodicity. Additionally or alternatively, the edge compute node(s) 1036 may obtain other relevant data from other edge compute node(s) 1036, core network functions (NFs), application functions (AFs), and/or other UEs 1010 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IEEE16090], etc.), and/or any other like standards such as those discussed herein.

The UE **1012*b* is shown as being capable of accessing access point (AP) 1033 via a connection 1003*b*. In this example, the AP 1033 is shown to be connected to the Internet without connecting to the CN 1042 of the wireless system. The connection 1003*b* can comprise a local wireless connection, such as a connection consistent with any [IEEE802] protocol (e.g., [IEEE80211] and variants thereof), wherein the AP 1033 would comprise a WiFi router. Additionally or alternatively, the UEs 1010 can be configured to communicate using suitable communication signals with each other or with any of the AP 1033** over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCCC); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1031 and 1032 that enable the connections **1003*a* may be referred to as "RAN nodes" or the like. The RAN nodes 1031, 1032 may comprise ground stations (e.g., terrestrial access points) or satellite stations providing coverage within a geographic area (e.g., a cell). The RAN nodes 1031, 1032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1031 is embodied as a NodeB, evolved NodeB (eNB), or a next generation NodeB (gNB), and the RAN nodes 1032** are embodied as relay nodes, distributed units, or Road Side Unites (RSUs). Any other type of NANs can be used.

Any of the RAN nodes 1031, 1032 can terminate the air interface protocol and can be the first point of contact for the UEs 1012 and IoT devices 1011. Additionally or alternatively, any of the RAN nodes 1031, 1032 can fulfill various logical functions for the RAN including, but not limited to, RANF(s) (e.g., radio network controller (RNC) functions and/or NG-RANFs) for radio resource management, admission control, UL and DL dynamic resource allocation, radio bearer management, data packet scheduling, etc. Additionally or alternatively, the UEs 1010 can be configured to communicate using OFDM communication signals with each other or with any of the NANs 1031, 1032 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RANF(s) (e.g., RANFs 1-N of FIG. 1) operated by the RAN or individual NANs 1031-1032 organize DL transmissions (e.g., from any of the RAN nodes 1031, 1032 to the UEs 1010) and UL transmissions (e.g., from the UEs 1010 to RAN nodes 1031, 1032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1010 at each transmission time interval (TTI). A TTI is the duration of a transmission on a radio link 1003*a*, 1005, and is related to the size of the data blocks passed to the radio link layer from higher network layers.

The NANs 1031, 1032 may be configured to communicate with one another via respective interfaces or links (not shown), such as an X2 interface for LTE implementations (e.g., when CN 1042 is an Evolved Packet Core (EPC)), an Xn interface for 5G or NR implementations (e.g., when CN 1042 is an Fifth Generation Core (5GC)), or the like. The NANs 1031 and 1032 are also communicatively coupled to CN 1042. Additionally or alternatively, the CN 1042 may be an evolved packet core (EPC) network, a NextGen Packet Core (NPC) network, a 5G core (5GC), or some other type of CN. The CN 1042 is a network of network elements and/or network functions (NFs) relating to a part of a communications network that is independent of the connection technology used by a terminal or user device. The CN 1042 comprises a plurality of network elements/NFs configured to offer various data and telecommunications services to customers/subscribers (e.g., users of UEs 1012 and IoT devices 1011) who are connected to the CN 1042 via a RAN. The components of the CN 1042 may be implemented in one physical node or separate physical nodes including components to read and execute instructions from a machine-readable or computer-readable medium (e.g., a non-transitory machine-readable storage medium). Additionally or alternatively, NFV may be utilized to virtualize any or all of the above-described network node functions via executable instructions stored in one or more computer-readable storage mediums (described in further detail infra). A logical instantiation of the CN 1042 may be referred to as a network slice, and a logical instantiation of a portion of the CN 1042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1042 components/functions.

The CN 1042 is shown to be communicatively coupled to an application server 1050 and a network 1050 via an IP communications interface 1055. the one or more server(s) 1050 comprise one or more physical and/or virtualized systems for providing functionality (or services) to one or more clients (e.g., UEs 1012 and IoT devices 1011) over a network. The server(s) 1050 may include various computer devices with rack computing architecture component(s), tower computing architecture component(s), blade computing architecture component(s), and/or the like. The server(s) 1050 may represent a cluster of servers, a server farm, a cloud computing service, or other grouping or pool of servers, which may be located in one or more datacenters. The server(s) 1050 may also be connected to, or otherwise associated with one or more data storage devices (not shown). Moreover, the server(s) 1050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1050 offer applications or services that use IP/network resources. As examples, the server(s) 1050 may provide traffic management services, cloud analytics, content streaming services, immersive gaming experiences, social networking and/or microblogging services, and/or other like services. In addition, the various services provided by the server(s) 1050 may include initiating and controlling software and/or firmware updates for applications or individual components implemented by the UEs 1012 and IoT devices 1011. The server(s) 1050 can also be configured to support one or more communication services (e.g., Voice-over-Internet Protocol (VoIP) sessions, PTT sessions, group communication sessions, social networking services, etc.) for the UEs 1012 and IoT devices 1011 via the CN 1042.

The Radio Access Technologies (RATs) employed by the NANs 1030, the UEs 1010, and the other elements in FIG. 10 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1030), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, *IEEE Guide for Wireless Access in Vehicular Environments (WAVE) Architecture*, IEEE 1609.0-2019 (10 Apr. 2019) ("[IEEE16090]"), *V2X Communications Message Set Dictionary*, SAE Int'l (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or *IEEE Standard for Air Interface for Broadband Wireless Access Systems*, IEEE Std 802.16-2017, pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1044 include application capabilities type, infrastructure capabilities type, and platform capabilities type. A cloud capabilities type is a classification of the functionality provided by a cloud service to a cloud service customer (e.g., a user of cloud 1044), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1044 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1044 may represent one or more cloud servers, application servers, web servers, and/or some other remote infrastructure. The remote/cloud servers may include any one of a number of services and capabilities such as, for example, any of those discussed herein. Additionally or alternatively, the cloud 1044 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1044 may be a network that comprises computers, network connections among the computers, and software routines to enable communication between the computers over network connections. In this regard, the cloud 1044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1044 may be via a wired or a wireless connection using the various communication protocols discussed infra. More than one network may be involved in a communication session between the illustrated devices. Connection to the cloud 1044 may require that the computers execute software routines which enable, for example, the seven layers of the OSI model of computer networking or equivalent in a wireless (cellular) phone network. Cloud 1044 may be used to enable relatively long-range communication such as, for example, between the one or more server(s) 1050 and one or more UEs 1010. Additionally or alternatively, the cloud 1044 may represent the Internet, one or more cellular networks, local area networks, or wide area networks including proprietary and/or enterprise networks, TCP/Internet Protocol (IP)-based network, or combinations thereof. In these implementations, the cloud 1044 may be associated with network operator who owns or controls equipment and other elements necessary to provide network-related services, such as one or more base stations or access points, one or more servers for routing digital data or telephone calls (e.g., a core network or backbone network), etc. The backbone links 1055 may include any number of wired or wireless technologies, and may be part of a LAN, a WAN, or the Internet. In one example, the backbone links 1055 are fiber backbone links that couple lower levels of service providers to the Internet, such as the CN 1012 and cloud 1044.

As shown by FIG. 10, each of the NANs 1031, 1032, and 1033 are co-located with edge compute nodes (or "edge servers") 1036*a*, 1036*b*, and 1036*c*, respectively. These implementations may be small-cell clouds (SCCs) where an edge compute node 1036 is co-located with a small cell (e.g., pico-cell, femto-cell, etc.), or may be mobile micro clouds (MCCs) where an edge compute node 1036 is co-located with a macro-cell (e.g., an eNB, gNB, etc.). The edge compute node 1036 may be deployed in a multitude of arrangements other than as shown by FIG. 10. In a first example, multiple NANs 1030 are co-located or otherwise communicatively coupled with one edge compute node 1036. In a second example, the edge servers 1036 may be co-located or operated by RNCs, which may be the case for legacy network deployments, such as 3G networks. In a third example, the edge servers 1036 may be deployed at cell aggregation sites or at multi-RAT aggregation points that can be located either within an enterprise or used in public coverage areas. In a fourth example, the edge servers 1036 may be deployed at the edge of CN 1042. These implementations may be used in follow-me clouds (FMC), where cloud services running at distributed data centers follow the UEs 1010 as they roam throughout the network.

In any of the implementations discussed herein, the edge servers 1036 provide a distributed computing environment for application and service hosting, and also provide storage and processing resources so that data and/or content can be processed in close proximity to subscribers (e.g., users of UEs 1010) for faster response times The edge servers 1036 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1036 from the UEs 1010, CN 1042, cloud 1044, and/or server(s) 1050, or vice versa. For example, a device application or client application operating in a UE 1010 may offload application tasks or workloads to one or more edge servers 1036. In another example, an edge server 1036 may offload application tasks or workloads to one or more UE 1010 (e.g., for distributed ML computation or the like).

The edge compute nodes 1036 may include or be part of an edge system 1035 that employs one or more ECTs 1035. The edge compute nodes 1036 may also be referred to as "edge hosts 1036" or "edge servers 1036." The edge system 1035 includes a collection of edge servers 1036 and edge management systems (not shown by FIG. 10) necessary to run edge computing applications within an operator network or a subset of an operator network. The edge servers 1036 are physical computer systems that may include an edge platform and/or virtualization infrastructure, and provide compute, storage, and network resources to edge computing applications. Each of the edge servers 1036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1010. The VI of the edge servers 1036 provide virtualized environments and virtualized resources for the edge hosts, and the edge computing applications may run as VMs and/or application containers on top of the VI.

In one example implementation, the ECT 1035 is and/or operates according to the MEC framework, as discussed in ETSI GR MEC 001 v3.1.1 (2022 January), ETSI GS MEC 003 v3.1.1 (2022 March), ETSI GS MEC 009 v3.1.1 (2021 June), ETSI GS MEC 010-1 v1.1.1 (2017 October), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 V2.2.1 (2022 January), ETSI GS MEC 014 v2.1.1 (2021 March), ETSI GS MEC 015 v2.1.1 (2020 June), ETSI GS MEC 016 v2.2.1 (2020 April), ETSI GS MEC 021 v2.2.1 (2022 February), ETSI GR MEC 024 v2.1.1 (2019 November), ETSI GS MEC 028 V2.2.1 (2021 July), ETSI GS MEC 029 v2.2.1 (2022 January), ETSI MEC GS 030 v2.1.1 (2020 April), ETSI GR MEC 031 v2.1.1 (2020 October), U.S. Provisional App. No. 63/003,834 filed Apr. 1, 2020 ("[US'834]"), and Int'l App. No. PCT/US2020/066969 filed on Dec. 23, 2020 ("[PCT'696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021 March), ETSI GS NFV 002 V1.2.1 (2014 December), ETSI GR NFV 003 V1.6.1 (2021 March), ETSI GS NFV 006 V2.1.1 (2021 January), ETSI GS NFV-INF 001 V1.1.1 (2015 January), ETSI GS NFV-INF 003 V1.1.1 (2014 December), ETSI GS NFV-INF 004 V1.1.1 (2015 January), ETSI GS NFV-MAN 001 v1.1.1 (2014 December), and/or Israel et al., *OSM Release FIVE Technical Overview*, ETSI Open Source MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, *Open Network Automation Platform* (*ONAP*)*documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021 Dec. 23) ("[TS28533]"), the contents of each of which are hereby incorporated by reference in their entireties.

In another example implementation, the ECT 1035 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN Alliance WG1 (July 2021); *O-RAN Operations and Maintenance Architecture Specification* v04.00, O-RAN Alliance WG1 (November 2020); *O-RAN Operations and Maintenance Interface Specification* v04.00, O-RAN Alliance WG1 (November 2020); *O-RAN Information Model and Data Models Specification* v01.00, O-RAN Alliance WG1 (November 2020); *O-RAN Working Group* 1 *Slicing Architecture* v05.00, O-RAN Alliance WG1 (July 2021) ("[O-RAN.WG1.Slicing-Architecture]"); *O-RAN Working Group* 2 (*Non-RT RIC and A*1 *interface WG*) *A*1 *interface: Application Protocol* v03.01, O-RAN Alliance WG2 (March 2021); *O-RAN Working Group* 2 (*Non-RT RIC and A*1 *interface WG*) *A*1 *interface: Type Definitions* v02.00, O-RAN Alliance WG2 (July 2021); *O-RAN Working Group* 2 (*Non-RT RIC and A*1 *interface WG*) *A*1 *interface: Transport Protocol* v01.01, O-RAN Alliance WG2 (March 2021); *O-RAN Working Group* 2 *AI/ML workflow description and*

*requirements* v01.03 O-RAN Alliance WG2 (July 2021); *O-RAN Working Group* 2 *Non-RT RIC: Functional Architecture* v01.03 O-RAN Alliance WG2 (July 2021); *O-RAN Working Group* 3, *Near-Real-time Intelligent Controller, E*2 *Application Protocol* (E2AP) v02.00, O-RAN Alliance WG3 (July 2021); *O-RAN Working Group* 3 *Near-Real-time Intelligent Controller Architecture & E*2 *General Aspects and Principles* v02.00, O-RAN Alliance WG3 (July 2021); *O-RAN Working Group* 3 *Near-Real-time Intelligent Controller E*2 *Service Model* (*E2SM*) v02.00, O-RAN Alliance WG3 (July 2021); *O-RAN Working Group* 3 *Near-Real-time Intelligent Controller E*2 *Service Model* (E2SM) *KPM* v02.00, O-RAN Alliance WG3 (July 2021); *O-RAN Working Group* 3 Near-Real-time Intelligent Controller E2 *Service Model* (*E2SM*) *RAN Function Network Interface* (*NI*) v01.00, O-RAN Alliance WG3 (February 2020); *O-RAN Working Group* 3 *Near-Real-time Intelligent Controller E*2 *Service Model* (*E2SM*) *RAN Control* v01.00, O-RAN Alliance WG3 (July 2021); *O-RAN Working Group* 3 *Near-Real-time Intelligent Controller Near-RT RIC Architecture* v02.00, O-RAN Alliance WG3 (March 2021); *O-RAN Fronthaul Working Group* 4 *Cooperative Transport Interface Transport Control Plane Specification* v02.00, O-RAN Alliance WG4 (March 2021); *O-RAN Fronthaul Working Group* 4 *Cooperative Transport Interface Transport Management Plane Specification* v02.00, O-RAN Alliance WG4 (March 2021); *O-RAN Fronthaul Working Group* 4 *Control, User, and Synchronization Plane Specification* v07.00, O-RAN Alliance WG4 (July 2021) ("[O-RAN.WG4.CUS]"); *O-RAN Fronthaul Working Group* 4 *Management Plane Specification* v07.00, O-RAN Alliance WG4 (July 2021); *O-RAN Open F*1/*W*1/*E*1/*X*2/*Xn Interfaces Working Group Transport Specification* v01.00, O-RAN Alliance WG5 (April 2020); *O-RAN Alliance Working Group* 5 *O*1 *Interface specification for O-DU* v02.00, O-RAN Alliance WGX (July 2021); *Cloud Architecture and Deployment Scenarios for O-RAN Virtualized RAN* v02.02, O-RAN Alliance WG6 (July 2021); *O-RAN Acceleration Abstraction Layer General Aspects and Principles* v01.01, O-RAN Alliance WG6 (July 2021); *Cloud Platform Reference Designs* v02.00, O-RAN Alliance WG6 (November 2020); *O-RAN O*2 *Interface General Aspects and Principles* v01.01, O-RAN Alliance WG6 (July 2021); *O-RAN White Box Hardware Working Group Hardware Reference Design Specification for Indoor Pico Cell with Fronthaul Split Option* 6 v02.00, O-RAN Alliance WG7 (July 2021) ("[O-RAN.WG7.IPC-HRD-Opt6]"); *O-RAN WG*7 *Hardware Reference Design Specification for Indoor Picocell* (*FR*1) *with Split Option* 7-2 v03.00, O-RAN Alliance WG7 (July 2021) ("[O-RAN.WG7.IPC-HRD-Opt7]"); *O-RAN WG*7 *Hardware Reference Design Specification for Indoor Picocell* (*FR*1) *with Split Option* 8 v03.00, O-RAN Alliance WG7 (July 2021) ("[O-RAN.WG7.IPC-HRD-Opt8]"); *O-RAN Open Transport Working Group* 9 *Xhaul Packet Switched Architectures and Solutions* v02.00, O-RAN Alliance WG9 (July 2021) ("[ORAN-WG9.XPAAS]"); *O-RAN Open X-haul Transport Working Group Management interfaces for Transport Network Elements* v02.00, O-RAN Alliance WG9 (July 2021) ("[ORAN-WG9.XTRP-MGT]"); *O-RAN Open X-haul Transport WG9 WDM-based Fronthaul Transport* v01.00, O-RAN Alliance WG9 (November 2020) ("[ORAN-WG9.WDM]"); *O-RAN Open X-haul Transport Working Group Synchronization Architecture and Solution Specification* v01.00, O-RAN Alliance WG9 (March 2021) ("[ORAN-WG9.XTRP-SYN]"); *O-RAN Operations and Maintenance Interface Specification* v05.00, O-RAN Alliance WG10 (July 2021); *O-RAN Operations and Maintenance Architecture* v05.00, O-RAN Alliance WG10 (July 2021); *O-RAN: Towards an Open and Smart RAN*, O-RAN Alliance, White Paper (October 2018), https://static1.square space.com/static/5ad774cce74940d7-115044b0/t/5bc79b3- 71905f4197055e8c 6/1539808057-078/O-RAN+WP+FInal+181017.pdf ("[ORANWP]"), and U.S. application Ser. No. 17/484,743 filed on 24 Sep. 2021 ("[US'743]") (collectively referred to as "[O-RAN]"); the contents of each of which are hereby incorporated by reference in their entireties.

In another example implementation, the ECT 1035 is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.2.0 (2021 Dec. 31), 3GPP TS 23.501 v17.3.0 (2021 Dec. 31) ("[TS23501]"), 3GPP TS 28.538 v0.4.0 (2021 Dec. 8), and U.S. application Ser. No. 17/484,719 filed on 24 Sep. 2021 ("[US'719]") (collectively referred to as "[SA6Edge]"), the contents of each of which are hereby incorporated by reference in their entireties.

In another example implementation, the ECT 1035 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety.

In another example implementation, the edge system 1035 operates according to the Multi-Access Management Services (MAMS) framework as discussed in Kanugovi et al., *Multi-Access Management Services* (*MAMS*), Internet Engineering Task Force (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC* (*MP-QUIC*), IETF draft-deconinck-quic-multipath-07, IETA, QUIC Working Group (3 May 2021), Zhu et al., *User-Plane Protocols for Multiple Access Management Service*, IETF draft-zhu-intarea-mams-user-protocol-09, IETA, INTAREA (4 Mar. 2020), and Zhu et al., *Generic Multi-Access* (*GMA*) *Convergence Encapsulation Protocols*, IETF draft-zhu-intarea-gma-14, IETA, INTAREA/Network Working Group (24 Nov. 2021) (collectively referred to as "[MAMS]"), the contents of each of which are hereby incorporated by reference in their entireties. In these implementations, an edge compute node 1035 and/or one or more cloud computing nodes/clusters may be one or more MAMS servers that includes or operates a Network Connection Manager (NCM) for downstream/DL traffic, and the individual UEs 1010 include or operate a Client Connection Manager (CCM) for upstream/UL traffic. An NCM is a functional entity that handles MAMS control messages from clients (e.g., individual UEs 1010 configures the distribution of data packets over available access paths and (core) network paths, and manages user-plane treatment (e.g., tunneling, encryption, and/or the like) of the traffic flows (see e.g., [RFC8743], [MAMS]). The CCM is the peer functional element in a client (e.g., individual UEs 1010 that handles MAMS control-plane procedures, exchanges MAMS signaling messages with the NCM, and configures the network paths at the client for the transport of user data (e.g., network packets, and/or the like) (see e.g., [RFC8743], [MAMS]).

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

Figure 11:
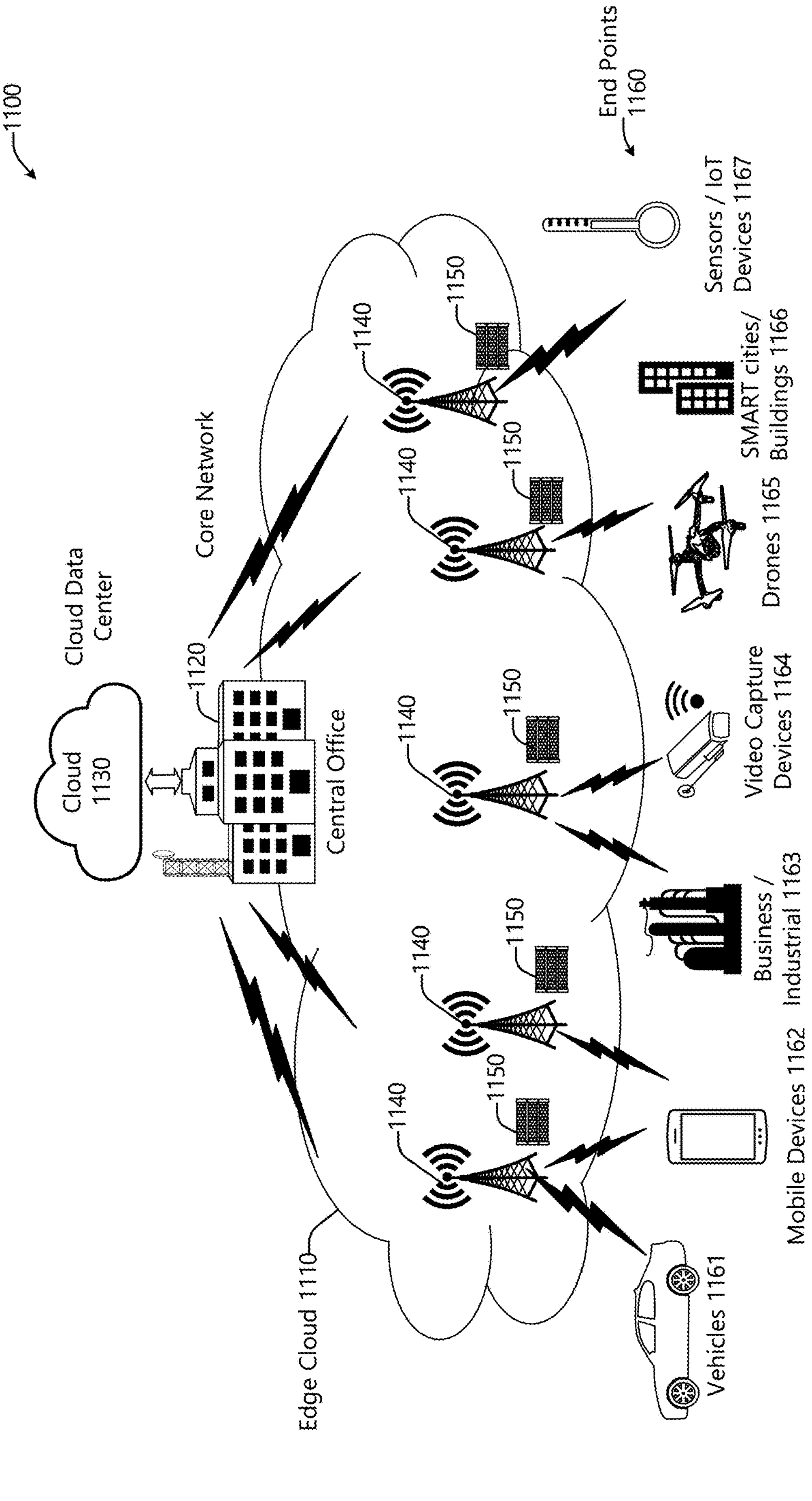
FIG. 11 illustrates an overview of an edge cloud configuration for edge computing.

FIG. 11 is a block diagram 1100 showing an overview of a configuration for edge computing, which includes a layer of processing referred to in many of the following examples as an "edge cloud". As shown, the edge cloud 1110 is co-located at an edge location, such as a NAN 1140 (e.g., access point, base station, or the like), a local processing hub 1150, or a central office 1120, and thus may include multiple entities, devices, and equipment instances. The edge cloud 1110 is located much closer to the endpoint (consumer and producer) data sources 1160 (e.g., autonomous vehicles 1161, user equipment 1162, business and industrial equipment 1163, video capture devices 1164, drones 1165, smart cities and building devices 1166, sensors and IoT devices 1167, etc.) than the cloud data center 1130. Compute, memory, and storage resources which are offered at the edges in the edge cloud 1110 are critical to providing ultra-low latency response times for services and functions used by the endpoint data sources 1160 as well as reduce network backhaul traffic from the edge cloud 1110 toward cloud data center 1130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office 1120). However, the closer that the edge location is to the endpoint 1160, the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The edge cloud 1110 architecture that covers multiple potential deployments and addresses restrictions that some network operators or service providers may have in their own infrastructures. These include, variation of configurations based on the edge location because edges at a NAN level, for instance, may have more constrained performance and capabilities in a multi-tenant scenario; configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a paradigm where computing is performed at or closer to the "edge" of a network, typically through the use of an appropriately arranged compute platform (e.g., x86, ARM, Nvidia, and/or other CPU/GPU based compute hardware architecture) implemented at NANs 1140, gateways, network routers, and/or other devices which are much closer to endpoint devices 1160 producing and consuming the data. For example, edge gateway servers (e.g., local processing hub 1150) may be equipped with pools of memory and storage resources to perform computation in real-time for low latency use-cases (e.g., autonomous driving or video surveillance) for connected client devices 1160. In another example, NANs 1140 may be augmented with compute and acceleration resources to directly process service workloads (e.g., edge compute workloads 236) for connected UEs 1160, without further communicating data via backhaul networks (see e.g., FIGS. 1-8). In another example, central office network management hardware 1120 may be replaced with standardized compute HW (e.g., COTS HW) that performs virtualized network functions and offers compute resources for the execution of services and consumer functions for connected devices 1160. Additionally or alternatively, an arrangement with HW combined with virtualized functions, commonly referred to as a hybrid arrangement, may also be implemented. Within edge computing networks, there may be scenarios in services which the compute resource will be "moved" to the data, as well as scenarios in which the data will be "moved" to the compute resource. In an example, NAN 1140 compute, acceleration, and network resources can provide services in order to scale to workload demands on an as-needed basis by activating dormant capacity (e.g., subscription, capacity on-demand, and so forth) in order to manage corner cases, emergencies, and/or to provide longevity for deployed resources over a significantly longer implemented lifecycle.

3. Hardware Components, Configurations, and Arrangements

Figure 13:
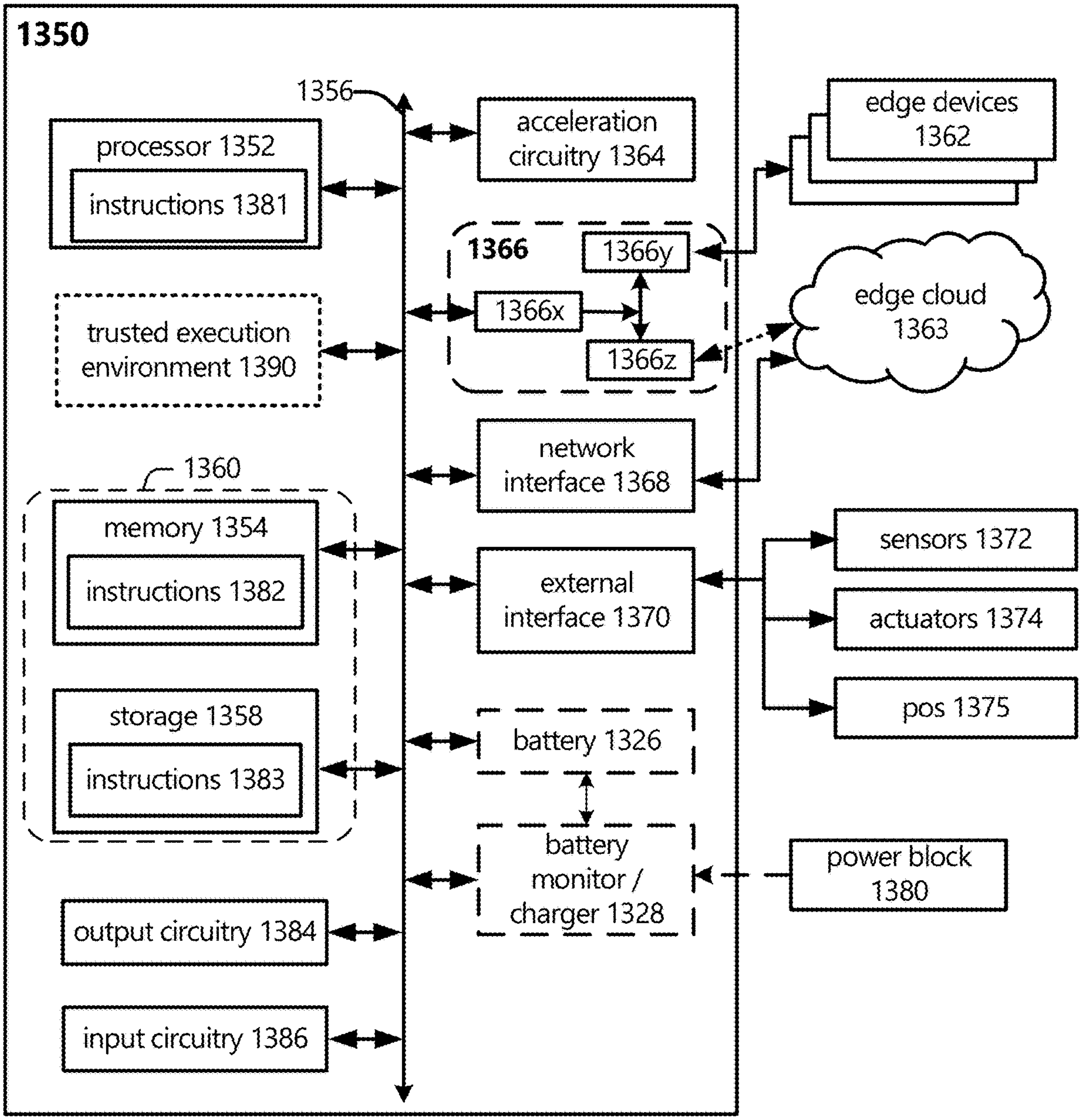
FIG. 13 depict example components of a compute node, which may be deployed in an edge computing system(s).

FIG. 13 illustrates an example of components that may be present in a computing node 1350 for implementing the techniques (e.g., operations, processes, methods, and methodologies) described herein. The compute node 1350 provides a closer view of the respective components of node 1300 when implemented as or as part of a computing device (e.g., as a mobile device, a base station, server, gateway, etc.). The compute node 1350 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1350, or as components otherwise incorporated within a chassis of a larger system.

In some embodiments, the compute node 1350 may correspond to the UE 110, RRH 130, DU 131, CU 131, edge compute node 136, RANFs 1-N, and/or ECFs 1-M of FIG. 1; MO 201, RIC 202, app layer 203, SW layer 204, and/or HW platform layer 205 of FIG. 2; UEs 1010, NANs 1030, edge compute node(s) 1036, CN 1042 (or compute node(s) therein), cloud 1044 (or compute node(s) therein), and/or server(s) 1050 of FIG. 10; end point devices 1160, a local processing hub 1150, NAN 1140, and/or edge cloud 1110 of FIG. 11; software distribution platform 1205 and/or processor platform(s) 1200 of FIG. 12; and/or any other component, device, and/or system discussed herein. The compute node 1350 may be embodied as a type of device, appliance, computer, or other "thing" capable of communicating with other edge, networking, or endpoint components. For example, compute node 1350 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1350 includes processing circuitry in the form of one or more processors 1352. The processor circuitry 1352 includes circuitry such as, but not limited to one or more processor cores and one or more of cache memory, low drop-out voltage regulators (LDOs), interrupt controllers, serial interfaces such as SPI, $I^2C$ or universal programmable serial interface circuit, real-time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1352 may include one or more hardware accelerators (e.g., same or similar to acceleration circuitry 1364), which may be microprocessors, programmable processing devices (e.g., FPGA, ASIC, etc.), or the like. The one or more accelerators may include, for example, computer vision and/or deep learning accelerators. In some implementations, the processor circuitry 1352 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1352 may be, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, a specialized x-processing unit (xPU) or a data processing unit (DPU) (e.g., Infrastructure Processing Unit (IPU), network processing unit (NPU), and the like), and/or any other known processing elements, or any suitable combination thereof. An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1352 may work in coordination with each other to execute many types of operations and instructions within and on behalf of the compute node 1350.

The processors (or cores) 1352 may be coupled with or may include memory/storage and may be configured to execute instructions stored in the memory/storage to enable various applications or operating systems to run on the platform 1350. The processors (or cores) 1352 is configured to operate application software to provide a specific service to a user of the platform 1350. Additionally or alternatively, the processor(s) 1352 may be a special-purpose processor(s)/controller(s) configured (or configurable) to operate according to the elements, features, and implementations discussed herein.

As examples, the processor(s) 1352 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1352 may be a part of a system on a chip (SoC), System-in-Package (SiP), a multi-chip package (MCP), and/or the like, in which the processor(s) 1352 and other components are formed into a single integrated circuit, or a single package, such as the Edison™ or Galileo™ SoC boards from Intel® Corporation. Other examples of the processor(s) 1352 are mentioned elsewhere in the present disclosure.

The processor(s) 1352 may communicate with system memory 1354 over an interconnect (IX) 1356. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the IX 1356.

In an example, the storage 1358 may be implemented via a solid-state disk drive (SSDD) and/or high-speed electrically erasable memory (commonly referred to as "flash memory"). Other devices that may be used for the storage 1358 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1354 and/or storage circuitry 1358 may also incorporate three-dimensional (3D) cross-point (XPOINT) memories from Intel® and Micron®.

In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components of edge computing device 1350 may communicate over an interconnect (IX) 1356. The IX 1356 may represent any suitable type of connection or interface such as, for example, metal or metal alloys (e.g., copper, aluminum, etc.), fiber, and/or the like. The IX 1356 may include any number of IX, fabric, and/or interface technologies, including instruction set architecture (ISA), extended ISA (eISA), Inter-Integrated Circuit ($I^2C$), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, HyperTransport IXs, NVLink provided by NVIDIA®, a Time-Trigger Protocol (TTP) system, a FlexRay system, PROFIBUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1356 may be a proprietary bus, for example, used in a SoC based system.

The IX 1356 couples the processor 1352 to communication circuitry 1366 for communications with other devices, such as a remote server (not shown) and/or the connected edge devices 1362. The communication circuitry 1366 is a hardware element, or collection of hardware elements, used to communicate over one or more networks (e.g., cloud 1363) and/or with other devices (e.g., edge devices 1362).

The transceiver 1366 may use any number of frequencies and protocols, such as 2.4 Gigahertz (GHz) transmissions under [IEEE802154], using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement WiFi® communications in accordance with [IEEE80211]. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the compute node 1350 may communicate with close devices, e.g., within about 10 meters, using a local transceiver based on BLE, or another low power radio, to save power. More distant connected edge devices 1362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in the edge cloud 1363 via local or wide area network protocols. The wireless network transceiver 1366 may be an LPWA transceiver that follows [IEEE802154] (or variants thereof), among others. The compute node 1363 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in [IEEE802154] may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP specifications, such as LTE and 5G/NR communication systems, discussed in further detail at the end of the present disclosure.

A network interface controller (NIC) 1368 may be included to provide a wired communication to nodes of the edge cloud 1363 or to other devices, such as the connected edge devices 1362 (e.g., operating in a mesh, fog, and/or the like). The wired communication may provide an Ethernet connection (see e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, a SmartNIC, Intelligent Fabric Processor(s) (IFP(s)), among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The compute node 1350 may include or be coupled to acceleration circuitry 1364, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. Additionally or alternatively, the acceleration circuitry 1364 may include xPUs and/or DPUs, IPUs, NPUs, and/or the like. These tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 1364 may comprise logic blocks or logic fabric and other interconnected resources that may be programmed (configured) to perform various functions, such as the procedures, methods, functions, etc. discussed herein. In such implementations, the acceleration circuitry 1364 may also include memory cells (e.g., EPROM, EEPROM, flash memory, static memory (e.g., SRAM, anti-fuses, etc.) used to store logic blocks, logic fabric, data, etc. in LUTs and the like.

The IX 1356 also couples the processor 1352 to a sensor hub or external interface 1370 that is used to connect additional devices or subsystems. The additional/external devices may include sensors 1372, actuators 1374, and positioning circuitry 1375. The sensor circuitry 1372 includes devices, modules, or subsystems whose purpose is to detect events or changes in its environment and send the information (sensor data) about the detected events to some other a device, module, subsystem, etc. Examples of such sensors 1372 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1350); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and/or the like.

The actuators 1374, allow platform 1350 to change its state, position, and/or orientation, or move or control a mechanism or system. The actuators 1374 comprise electrical and/or mechanical devices for moving or controlling a mechanism or system, and converts energy (e.g., electric current or moving air and/or liquid) into some kind of motion. The actuators 1374 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1374 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1350 may be configured to operate one or more actuators 1374 based on one or more captured events and/or instructions or control signals received from a service provider and/or various client systems.

The positioning circuitry 1375 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1375 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1375 may include a Micro-Technology for Positioning, Navigation, and Timing (Micro-PNT) IC that uses a master timing clock to perform position tracking/estimation without GNSS assistance. The positioning circuitry 1375 may also be part of, or interact with, the communication circuitry 1366 to communicate with the nodes and components of the positioning network. The positioning circuitry 1375 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1375 is, or includes an INS, which is a system or device that uses sensor circuitry 1372 (e.g., motion sensors such as accelerometers, rotation sensors such as gyroscopes, and altimeter, magnetic sensors, and/or the like to continuously calculate (e.g., using dead by dead reckoning, triangulation, or the like) a position, orientation, and/or velocity (including direction and speed of movement) of the platform 1350 without the need for external references.

In some optional examples, various input/output (I/O) devices may be present within or connected to, the compute node 1350, which are referred to as input circuitry 1386 and output circuitry 1384 in FIG. 13. The input circuitry 1386 and output circuitry 1384 include one or more user interfaces designed to enable user interaction with the platform 1350 and/or peripheral component interfaces designed to enable peripheral component interaction with the platform 1350. Input circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1384 may be included to show information or otherwise convey information, such as sensor readings, actuator position(s), or other like information. Data and/or graphics may be displayed on one or more user interface components of the output circuitry 1384. Output circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1350. The output circuitry 1384 may also include speakers or other audio emitting devices, printer(s), and/or the like. Additionally or alternatively, the sensor circuitry 1372 may be used as the input circuitry 1384 (e.g., an image capture device, motion capture device, or the like) and one or more actuators 1374 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the compute node 1350, although, in examples in which the compute node 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the compute node 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, Texas. The battery monitor/charger 1378 may communicate the information on the battery 1376 to the processor 1352 over the IX 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the compute node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the compute node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1383 in the form of software, firmware, or hardware commands to implement the techniques described herein. Although such instructions 1382, 1383 are shown as code blocks included in the memory 1354 and the storage 1358, any of the code blocks 1382, 1383 may be replaced with hardwired circuits, for example, built into an application specific integrated circuit (ASIC) or programmed into an FPGA, or the like.

In an example, the instructions 1381, 1382, 1383 provided via the memory 1354, the storage 1358, or the processor 1352 may be embodied as a non-transitory machine-readable medium (NTMRM) 1360 including code to direct the processor 1352 to perform electronic operations in the compute node 1350. The processor 1352 may access the NTMRM 1360 over the IX 1356. For instance, the NTMRM 1360 may be embodied by devices described for the storage 1358 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1360 may include instructions to direct the processor 1352 to perform a specific sequence or flow of actions, for example, as described with respect to the flowchart(s) and block diagram(s) of operations and functionality depicted above. As used herein, the terms “machine-readable medium” and “computer-readable medium” are interchangeable. As used herein, the term “non-transitory computer-readable medium” is expressly defined to include any type of computer readable storage device and/or storage disk and to exclude propagating signals and to exclude transmission media.

Computer program code for carrying out operations of the present disclosure (e.g., computational logic and/or instructions 1381, 1382, 1383) may be written in any combination of one or more programming languages, including an object oriented programming language such as Python, Ruby, Scala, Smalltalk, Java™, C++, C#, or the like; a procedural programming languages, such as the “C” programming language, the Go (or “Golang”) programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1381, 1382, 1383 for carrying out operations of the present disclosure may also be written in any combination of the programming languages discussed herein. The program code may execute entirely on the system 1350, partly on the system 1350, as a stand-alone software package, partly on the system 1350 and partly on a remote computer or entirely on the remote computer or server. In the latter scenario, the remote computer may be connected to the system 1350 through any type of network, including a LAN or WAN, or the connection may be made to an external computer (e.g., through the Internet using an Internet Service Provider (ISP)).

In an example, the instructions 1381, 1382, 1383 on the processor circuitry 1352 (separately, or in combination with the instructions 1381, 1382, 1383) may configure execution or operation of a trusted execution environment (TEE) 1390. The TEE 1390 operates as a protected area accessible to the processor circuitry 1302 to enable secure access to data and secure execution of instructions. In some embodiments, the TEE 1390 may be a physical hardware device that is separate from other components of the system 1350 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1390 may be implemented as secure enclaves, which are isolated regions of code and/or data within the processor and/or memory/storage circuitry of the system 1350. Only code executed within a secure enclave may access data within the same secure enclave, and the secure enclave may only be accessible using the secure application (which may be implemented by an application processor or a tamper-resistant microcontroller). Various implementations of the TEE 1390, and an accompanying secure area in the processor circuitry 1352 or the memory circuitry 1354 and/or storage circuitry 1358 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1300 through the TEE 1390 and the processor circuitry 1352. Additionally or alternatively, the memory circuitry 1354 and/or storage circuitry 1358 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1304 and/or storage circuitry 1308 may be divided into one or more trusted memory regions for storing applications or software modules of the TEE 1390.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 13 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The components of the device 1350 and/or any of the devices and/or systems discussed herein may be servers, appliances, network infrastructure, machines, robots, drones, and/or any other type of computing devices. For example, an edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., electromagnetic interference (EMI), and/or radio-frequency interference (RFI), electromagnetic radiation, vibration, relatively extreme temperatures, and the like), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 13. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 12:
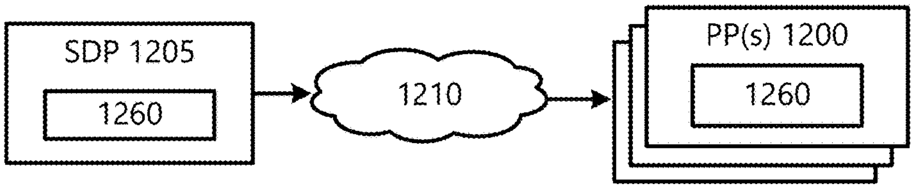
FIG. 12 illustrates an example software distribution platform.

FIG. 12 illustrates an example software (SW) distribution platform (SDP) 1205 to distribute software 1260, such as the example computer readable instructions 1381, 1382, 1383 of FIG. 13, to one or more devices, such as example processor platform(s) (pp) 1200, connected edge devices 1362 (see e.g., FIG. 13), and/or any of the other computing systems/devices discussed herein. The SDP 1205 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1362 of FIG. 13). The SDP 1205 (or components thereof) may be located in a cloud (e.g., data center, etc.), a local area network, an edge network, a wide area network, on the Internet, and/or any other location communicatively coupled with the pp 1200.

The pp 1200 and/or connected edge devices 1362 connected edge devices 1362 may include customers, clients, managing devices (e.g., servers), third parties (e.g., customers of an entity owning and/or operating the SDP 1205), IoT devices, and the like. The pp 1200/connected edge devices 1362 may operate in commercial and/or home automation environments. In some examples, a third party is a developer, a seller, and/or a licensor of software such as the example computer readable media 1381, 1382, 1383 of FIG. 13. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1200/connected edge devices 1362 can be physically located in different geographic locations, legal jurisdictions, etc.

In FIG. 12, the SDP 1205 includes one or more servers (referred to as "servers 1205") and one or more storage devices (referred to as "storage 1205"). The storage 1205 store the computer readable instructions 1260, which may correspond to the instructions 1381, 1382, 1383 of FIG. 13. The servers 1205 are in communication with a network 1210, which may correspond to any one or more of the Internet and/or any of the example networks as described herein. The servers 1205 are responsive to requests to transmit the software to a requesting party as part of a commercial transaction. Payment for the delivery, sale and/or license of the software may be handled by the servers 1205 and/or via a third-party payment entity. The servers 1205 enable purchasers and/or licensors to download the computer readable instructions 1260 from the SDP 1205.

The servers 1205 are communicatively connected to one or more security domains and/or security devices through which requests and transmissions of the example computer readable instructions 1260 must pass. Additionally or alternatively, the servers 1205 periodically offer, transmit, and/or force updates to the software 1260 to ensure improvements, patches, updates, etc. are distributed and applied to the software at the end user devices. The computer readable instructions 1260 are stored on storage 1205 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1260 stored in the SDP 1205 are in a first format when transmitted to the pp 1200. Additionally or alternatively, the first format is an executable binary in which particular types of the pp 1200 can execute. Additionally or alternatively, the first format is uncompiled code that requires one or more preparation tasks to transform the first format to a second format to enable execution on the pp 1200. For example, the receiving pp 1200 may need to compile the computer readable instructions 1260 in the first format to generate executable code in a second format that is capable of being executed on the pp 1200. Additionally or alternatively, the first format is interpreted code that, upon reaching the pp 1200, is interpreted by an interpreter to facilitate execution of instructions. Additionally or alternatively, different components of the computer readable instructions 1382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

4. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1a includes a method of operating a compute node configured as a Radio Access Network function (RANF) in a disaggregated RAN architecture that includes a plurality of RANFs, the method comprising: receiving, by the RANF from a RAN intelligent controller (RIC), a configuration including information for routing edge data to an edge compute function (ECF) co-located with the RANF; receiving, by the RANF from a user equipment (UE), a network packet including edge data intended for delivery to an edge computing application (app) based on scheduling information included in the configuration; extracting, by the RANF, the edge data from the network packet using data extraction information in the configuration; sending, by the RANF, the extracted edge data to an ECF; obtaining, by the RANF, processed edge data from the ECF; inserting, by the RANF, the processed edge data into the network packet; and sending the network packet towards a destination node.

Example 1b includes a method of operating a compute node configured as a Radio Access Network function (RANF) in a disaggregated RAN architecture that includes a plurality of RANFs, the method comprising: receiving, by the RANF, from a RAN intelligent controller (RIC), a configuration including information for routing edge data to an edge compute function (ECF) co-located with the RANF; receiving, by the RANF, from a user equipment (UE), a network packet including edge data intended for delivery to an edge computing application that is part of the ECF based on scheduling information included in the configuration; extracting, by the RANF, the edge data from the network packet using data extraction information in the configuration; sending, by the RANF, the extracted edge data to the ECF for processing of the extracted edge data by the edge computing application; obtaining, by the RANF, processed edge data from the ECF; inserting, by the RANF, the processed edge data into the network packet; and sending, by the RANF, the network packet towards a destination node.

Example 2 includes the method of example 1a, 1b, and/or some other example(s) herein, wherein the method includes: operating, by the RANF, an edge-specific dataflow of a network protocol stack to process the extracted edge data.

Example 3 includes the method of example 2 and/or some other example(s) herein, wherein the inserting includes: operating, by the RANF, the edge-specific dataflow of the network protocol stack to rebuild the network packet to include the processed edge data.

Example 4 the method of examples 2-3 and/or some other example(s) herein, wherein: the RANF is configured to perform one or more sublayers of a network protocol stack, other RANFs of the plurality of RANFs are configured to perform other sublayers of the network protocol stack, and the edge-specific dataflow includes performing operations of the one or more sublayers and performing operations of lightweight versions of the other sublayers of the network protocol stack.

Example 5 includes the method of example 4 and/or some other example(s) herein, wherein the network protocol stack is a Third Generation Partnership Project (3GPP) Fifth Generation (5G) New Radio (NR) protocol stack including a low physical (PHY) sublayer, a high-PHY sublayer, a Medium Access Control (MAC) sublayer, a Radio Link Control (RLC) sublayer, a Packet Data Convergence Protocol (PDCP) sublayer, and a Service Data Protocol (SDAP) sublayer.

Example 6 includes the method of example 5 and/or some other example(s) herein, wherein the network protocol stack includes a Backhaul Adaptation Protocol (BAP) sublayer or an F1 application protocol (F1AP) sublayer.

Example 7 includes the method of example 6 and/or some other example(s) herein, wherein the one or more sublayers of the RANF include a one of: a combination of the high-PHY sublayer, the MAC sublayer, the RLC sublayer, the PDCP sublayer, and the SDAP sublayer; a combination of the high-PHY sublayer, the MAC sublayer, the RLC sublayer, and the BAP sublayer; or a combination of the high-PHY sublayer, the MAC sublayer, the RLC sublayer, and the F1AP sublayer.

Example 8 includes the method of examples 5-6 and/or some other example(s) herein, wherein the one or more sublayers of the RANF include the MAC sublayer and the high-PHY sublayer.

Example 9 includes the method of examples 4-8 and/or some other example(s) herein, wherein the edge-specific dataflow includes performing operations of one or more core network functions.

Example 10 includes the method of example 9, wherein the edge-specific dataflow includes performing operations of a transport layer protocol and performing operations of a network layer protocol.

Example 11 includes the method of example 10 and/or some other example(s) herein, wherein the edge-specific dataflow includes performing operations of an application layer protocol.

Example 12a includes the method of examples 5-11 and/or some other example(s) herein, wherein the scheduling information is included in the configuration as configuration information.

Example 12b includes the method of examples 5-12a and/or some other example(s) herein, wherein the scheduling information is configuration information in the configuration.

Example 12c includes the method of examples 5-12b and/or some other example(s) herein, wherein the scheduling information included in the configuration includes time-frequency resources that are to carry the network packet.

Example 13 includes the method of examples 12a-12c and/or some other example(s) herein, wherein the time-frequency resources include one or more resource blocks (RBs), and the scheduling information includes a slot number in which the network packet is to be carried, a number of orthogonal frequency division multiplexing (OFDM) symbols used to carry the network packet, a cell radio network temporary identifier (C-RNTI), and a modulation and coding scheme (MCS).

Example 14a includes the method of examples 12a-13 and/or some other example(s) herein, wherein the data extraction information is included in the configuration as configuration information.

Example 14b includes the method of examples 12a-14a and/or some other example(s) herein, wherein the data extraction information is configuration information in the configuration.

Example 14c includes the method of examples 12a-14b and/or some other example(s) herein, wherein the data extraction information included in the configuration includes a time slot in which the network packet is to be carried, In-phase and Quadrature (I/Q) symbol mapping information, a network address for forwarding data in an uplink (UL) direction, and a network address for data insertion in a downlink (DL) direction.

Example 15 includes the method of example 4 and/or some other example(s) herein, wherein the network protocol stack is a Institute of Electrical and Electronics Engineers 802 (WiFi) protocol stack including a low-PHY sublayer, a high-PHY, a MAC sublayer, and a logical link control (LLC) sublayer, and the one or more sublayers of the RANF include the MAC sublayer and the high-PHY sublayer.

Example 16 includes the method of example 15 and/or some other example(s) herein, wherein the scheduling information includes traffic specification (TSPEC) data or network allocation vector (NAV) setting information.

Example 17 includes the method of examples 1a-16 and/or some other example(s) herein, wherein the configuration includes edge compute information and edge data information, and the method includes: send the edge compute information and the edge data information to the ECF.

Example 18 includes the method of example 17 and/or some other example(s) herein, wherein the edge compute information included in the configuration includes user data context information, edge data processing information, and output forwarding information including an ID of an element to which the processed edge data is to be output.

Example 19 includes the method of examples 1a-19 and/or some other example(s) herein, wherein the edge data information included in the configuration includes UE context information of the UE, a network address for forwarding data in a UL direction, and a network address for data insertion in a DL direction.

Example 20 includes the method of examples 1a-19 and/or some other example(s) herein, wherein the extracting the edge data from the network packet includes extracting, by the RANF, the edge data from a data field of the network packet indicated by the data extraction information.

Example 21 includes the method of examples 1a-20 and/or some other example(s) herein, wherein the method includes: performing one or more preprocessing operations and one or more processing operations on the extracted edge data before sending the extracted edge data to the ECF.

Example 22 includes the method of example 21 and/or some other example(s) herein, wherein: the one or more preprocessing operations on the extracted edge data includes frame ordering operations and cyclic redundancy check (CRC) operations; and the one or more processing operations on the extracted edge data includes one or more of decoding operations, de-mapping operations, de-encapsulation operations, decryption operations, translation operations, and transformation operations.

Example 23 includes the method of examples 21-22 and/or some other example(s) herein, wherein the method includes: performing one or more application layer processing operations on the extracted edge data before sending the extracted edge data to the ECF and after performing the one or more preprocessing operations and the one or more processing operations.

Example 24 includes the method of example 23 and/or some other example(s) herein, wherein the one or more application layer processing operations include one or more of provisioning control information elements, flow control, data forwarding handling, performing one or more request methods, resolving a domain name or uniform resource locator (URL), storing data, and accessing data.

Example 25 includes the method of examples 1a-24 and/or some other example(s) herein, wherein the method includes: performing one or more application layer processing operations on the processed edge data.

Example 26 includes the method of example 25 and/or some other example(s) herein, wherein the one or more application layer processing operations include one or more of provisioning control information elements, flow control, data forwarding handling, performing one or more request methods, resolving a domain name or URL, storing data, accessing data, and formatting the edge data for consumption by a transport layer protocol.

Example 27 includes the method of examples 25-26 and/or some other example(s) herein, wherein the method includes: performing one or more preprocessing operations and one or more processing operations on the processed edge data before inserting the extracted edge data into the network packet and after performing the one or more application layer processing operations.

Example 28 includes the method of example 27 and/or some other example(s) herein, wherein: the one or more preprocessing operations on the processed edge data includes frame ordering operations and CRC operations; and the one or more processing operations on the processed edge data includes one or more of encoding operations, mapping operations, encapsulation operations, encryption operations, translation operations, and transformation operations.

Example 29 includes the method of examples 1a-28 and/or some other example(s) herein, wherein the destination node is the UE, another UE, a RAN node, a RANF, an edge compute node, a cloud computing service, a web platform, or an application server.

Example 30 includes the method of examples 1a-29 and/or some other example(s) herein, wherein the plurality of RANFs are geographically distributed between at least one remote radio head (RRH) and one or more core network functions.

Example 31 includes the method of examples 1a-30 and/or some other example(s) herein, wherein the plurality of RANFs include one or more RRHs, one or more distributed units (DUs), and one or more centralized units (CUs).

Example 32 includes the method of example 31 and/or some other example(s) herein, wherein the plurality of RANFs and the RIC are part of an Open RAN Alliance (O-RAN) framework wherein the one or more RRHs are O-RAN remote units (RUs), the one or more DUs are O-RAN distributed units (DUs), and the one or more CUs are O-RAN CUs.

Example 33 includes the method of examples 31-32 and/or some other example(s) herein, wherein the one or more RRHs are connected to the one or more DUs via respective next generation fronthaul interface (NGFI)-I links, the one or more DUs are connected to the one or more CUs via respective NGFI-II links, and the one or more CUs are connected to one or more core network functions via respective backhaul links.

Example 34 includes a method of operating a Radio Access Network (RAN) Intelligent Controller (RIC) in a disaggregated RAN architecture, the disaggregated RAN architecture including a plurality of RANFs that are geographically distributed from one another, the method comprising: identifying, by the RIC, scheduling information including a resource assignment for communicating network packets containing edge data; determining, by the RIC, data extraction information based on the scheduling information, the data extraction information including extraction information for extracting the edge data from the network packets and forwarding information for forwarding the edge data once extracted; sending, by the RIC, the data extraction information to one or more RANFs of the plurality of RANFs; determining, by the RIC, edge compute information and edge data information based on one or more edge applications (apps) or one or more edge services for which the edge data is intended; and sending, by the RIC, the edge compute information and the edge data information to one or more edge compute nodes that host the one or more edge apps or the one or more edge services.

Example 35 includes the method of example 34 and/or some other example(s) herein, wherein the method includes: receiving the scheduling information from a scheduler RANF of the plurality of RANFs.

Example 36 includes the method of example 35 and/or some other example(s) herein, wherein the method includes: sending a message to the scheduler RANF requesting or instructing the scheduler RANF to enable edge data forwarding; and receiving the scheduling information from the scheduler RANF in response to the message.

Example 37 includes the method of example 34 and/or some other example(s) herein, wherein the method includes: sending the scheduling information to a scheduler RANF of the plurality of RANFs to enable edge data forwarding at the scheduler RANF, wherein the scheduler RANF implements a MAC scheduler function.

Example 38 includes the method of examples 35-37 and/or some other example(s) herein, wherein the scheduler RANF implements a Medium Access Control (MAC) scheduler function.

Example 39 includes the method of examples 35-38 and/or some other example(s) herein, wherein the method includes: receiving respective acknowledgement messages from the one or more RANFs based on the data extraction information.

Example 40 includes a method of operating an edge compute function (ECF) co-located with a Radio Access Network (RAN) function in a disaggregated RAN architecture, the disaggregated RAN architecture including a plurality of RANFs that are geographically distributed from one another, the method comprising: receiving, by the ECF from a RAN intelligent controller (RIC), edge compute information and edge data information based on one or more edge services provided by the ECF; receiving, by the ECF, edge data extracted from a network packet by at least one RANF of the plurality of RANFs; processing the extracted edge data by operating the one or more edge apps to provide the one or more edge services involving the extracted edge data; and providing the processed edge data to a destination node indicated by the edge compute information or the edge data information.

Example 41 includes the method of example 40 and/or some other example(s) herein, wherein the method includes: receiving the edge compute information and the edge data information directly from the RIC or via the RANF co-located with the ECF.

Example 42 includes the method of examples 40-41 and/or some other example(s) herein, wherein the at least one RANF is the RANF co-located with the ECF or another RANF not co-located with the ECF.

Example 43 includes the method of example 42 and/or some other example(s) herein, wherein the at least one RANF implements a Medium Access Control (MAC) scheduler.

Example 44 includes the method of example 40-43 and/or some other example(s) herein, wherein the destination node is the at least one RANF, another RANF, a user equipment (UE) that generated the edge data, another UE, another ECF, a cloud computing service, one or more app servers, or a remote database.

Example 45 includes the method of examples 40-44 and/or some other example(s) herein, wherein the edge compute information includes user data context information, edge data processing information, and output forwarding information including an identifier of an element to which the processed edge data is to be output.

Example 46 includes the method of examples 40-45 and/or some other example(s) herein, wherein the edge data information includes UE context information of the UE, a network address for forwarding data in a UL direction, and a network address for data insertion in a DL direction.

Example 47 includes the method of examples 1a-46, wherein the destination node is the at least one RANF, another RANF, a UE that generated the edge data, another UE, another ECF, a cloud computing service, one or more app servers, or a remote database.

Example 48 includes the method of examples 1a-47, wherein the destination node is among a plurality of destination nodes, and the providing or the sending the network packet towards the destination node includes sending or providing the network packet towards each of the destination nodes in the plurality of destination nodes.

Example 49 includes the method of examples 1a-48, wherein the providing or sending the extracted edge data to the ECF includes sending the edge data to the ECF over a wired link between the RANF and the ECF, sending the edge data to the ECF over a wireless link between the RANF and the ECF, sending the edge data to the ECF over an interconnect between the RANF and the ECF, and/or providing or sending the edge data to the ECF via an application programming interface or web service.

Example 50 includes the method of examples 1a-49, wherein the ECF being co-located with the RANF includes: the ECF is disposed at a same cell site as the RANF; the ECF is operated on the same compute platform as the RANF; the ECF and the RANF are software elements operated by the same compute node; and/or the ECF and the RANF are part of a multi-site network service, wherein the RANF and the ECF are deployed at more than one site or location.

Example 51 includes one or more computer readable media comprising instructions, wherein execution of the instructions by processor circuitry is to cause the processor circuitry to perform the method of any of examples 1a-50 and/or any other aspect discussed herein.

Example 52 includes a computer program comprising the instructions of example 51 and/or some other example(s) herein.

Example 53 includes an Application Programming Interface defining functions, methods, variables, data structures, and/or protocols for the computer program of example 52 and/or some other example(s) herein.

Example 54 includes an apparatus comprising circuitry loaded with the instructions of example 51 and/or some other example(s) herein.

Example 55 includes an apparatus comprising circuitry operable to run the instructions of example 51 and/or some other example(s) herein.

Example 56 includes an integrated circuit comprising one or more of the processor circuitry of example 51 and the one or more computer readable media of example 51 and/or some other example(s) herein.

Example 57 includes a computing system comprising the one or more computer readable media and the processor circuitry of example 51 and/or some other example(s) herein.

Example 58 includes an apparatus comprising means for executing the instructions of example 51 and/or some other example(s) herein.

Example 59 includes a signal generated as a result of executing the instructions of example 51.

Example 60 includes a data unit generated as a result of executing the instructions of example 51.

Example 61 includes the data unit of example 60 and/or some other example(s) herein, the data unit is a datagram, network packet, data frame, data segment, a Protocol Data Unit (PDU), a Service Data Unit (SDU), a message, or a database object.

Example 62 includes a signal encoded with the data unit of examples 60-61 and/or some other example(s) herein.

Example 63 includes an electromagnetic signal carrying the instructions of example 47 and/or some other example(s) herein Example 64 includes an apparatus comprising means for performing the method of any of examples 1a-50 and/or any other aspect discussed herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" at least in some embodiments refers to two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "colocated" or "co-located" at least in some embodiments refers to two or more elements being in the same place or location, or relatively close to one another (e.g., within some predetermined distance from one another). Additionally or alternatively, the term "colocated" or "co-located" at least in some embodiments refers to the placement or deployment of two or more compute elements or compute nodes together in a secure dedicated storage facility, or within a same enclosure or housing.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, and the like, being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon. Additionally or alternatively, the term "measurement" at least in some embodiments refers to a set of operations having the object of determining a measured value or measurement result, and/or the actual instance or execution of operations leading to a measured value.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "lightweight" or "lite" at least in some embodiments refers to an application or computer program designed to use a relatively small amount of resources such as having a relatively small memory footprint, low processor usage, and/or overall low usage of system resources. The term "lightweight protocol" at least in some embodiments refers to a communication protocol that is characterized by a relatively small overhead. Additionally or alternatively, the term "lightweight protocol" at least in some embodiments refers to a protocol that provides the same or enhanced services as a standard protocol, but performs faster than standard protocols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "identifier" at least in some embodiments refers to a value, or a set of values, that uniquely identify an identity in a certain scope. Additionally or alternatively, the term "identifier" at least in some embodiments refers to a sequence of characters that identifies or otherwise indicates the identity of a unique object, element, or entity, or a unique class of objects, elements, or entities. Additionally or alternatively, the term "identifier" at least in some embodiments refers to a sequence of characters used to identify or refer to an application, program, session, object, element, entity, variable, set of data, and/or the like. The "sequence of characters" mentioned previously at least in some embodiments refers to one or more names, labels, words, numbers, letters, symbols, and/or any combination thereof. Additionally or alternatively, the term "identifier" at least in some embodiments refers to a name, address, label, distinguishing index, and/or attribute. Additionally or alternatively, the term "identifier" at least in some embodiments refers to an instance of identification. The term "persistent identifier" at least in some embodiments refers to an identifier that is reused by a device or by another device associated with the same person or group of persons for an indefinite period.

The term "identification" at least in some embodiments refers to a process of recognizing an identity as distinct from other identities in a particular scope or context, which may involve processing identifiers to reference an identity in an identity database.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "network path" or "path" at least in some embodiments refers to a data communications feature of a communication system describing the sequence and identity of system components visited by one or more packets, where the components of the path may be either logical or physical. The term "network forwarding path" at least in some embodiments refers to an ordered list of connection points forming a chain of NFs and/or nodes, along with policies associated to the list.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "memory footprint" at least in some embodiments refers to the amount of memory that a program, application, or other unit of software or program code uses or references while running.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. The term "computer architecture" at least in some embodiments refers to a physical and logical design or arrangement of software and/or hardware elements in a computing system or platform including technology standards for interacts therebetween. The term "network architecture" at least in some embodiments refers to a physical and logical design or arrangement of software and/or hardware elements in a network including communication protocols, interfaces, and media transmission.

The term "platform" at least in some embodiments refers to an environment in which software, applications, program code, and the like can be executed or otherwise operate. The term "platform" at least in some embodiments can include one or more of hardware, virtualized hardware, an embedded system (e.g., IoT device, or the like), an operating system (OS), a virtual machine, a container, a client application (e.g., web browser, mobile app, or the like), a distributed application, a web platform, cloud computing service, APIs, an integrated development environment, a sandbox, and/or other elements that program code is executed in or with.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network controller" at least in some embodiments refers to a functional block that centralizes some or all of the control and management functionality of a network domain and may provide an abstract view of the network domain to other functional blocks via an interface.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "SmartNIC" at least in some embodiments refers to a network interface controller (NIC), network adapter, or a programmable network adapter card with programmable hardware accelerators and network connectivity (e.g., Ethernet or the like) that can offload various tasks or workloads from other compute nodes or compute platforms such as servers, application processors, and/or the like and accelerate those tasks or workloads. A SmartNIC has similar networking and offload capabilities as an IPU, but remains under the control of the host as a peripheral device.

The term "infrastructure processing unit" or "IPU" at least in some embodiments refers to an advanced networking device with hardened accelerators and network connectivity (e.g., Ethernet or the like) that accelerates and manages infrastructure functions using tightly coupled, dedicated, programmable cores. In some implementations, an IPU offers full infrastructure offload and provides an extra layer of security by serving as a control point of a host for running infrastructure applications. An IPU is capable of offloading the entire infrastructure stack from the host and can control how the host attaches to this infrastructure. This gives service providers an extra layer of security and control, enforced in hardware by the IPU.

The term "network access node" or "NAN" at least in some embodiments refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "network access controller" at least in some embodiments refers to a functional block that centralizes some or all of the control and management functionality of a network domain and optionally provides an abstract view of its domain to other functional blocks via well-defined interfaces.

The term "cell" at least in some embodiments refers to a radio network object that can be uniquely identified by a UE from an identifier (e.g., cell ID) that is broadcasted over a geographical area from a network access node (NAN). Additionally or alternatively, the term "cell" at least in some embodiments refers to a geographic area covered by a NAN.

The term "serving cell" at least in some embodiments refers to a primary cell (PCell) for a UE in a connected mode or state (e.g., RRC_CONNECTED) and not configured with carrier aggregation (CA) and/or dual connectivity (DC). Additionally or alternatively, the term "serving cell" at least in some embodiments refers to a set of cells comprising zero or more special cells and one or more secondary cells for a UE in a connected mode or state (e.g., RRC_CONNECTED) and configured with CA.

The term "primary cell" or "PCell" at least in some embodiments refers to a Master Cell Group (MCG) cell, operating on a primary frequency, in which a UE either performs an initial connection establishment procedure or initiates a connection re-establishment procedure. The term "Secondary Cell" or "SCell" at least in some embodiments refers to a cell providing additional radio resources on top of a special cell (SpCell) for a UE configured with CA. The term "special cell" or "SpCell" at least in some embodiments refers to a PCell for non-DC operation or refers to a PCell of an MCG or a PSCell of an SCG for DC operation.

The term "Master Cell Group" or "MCG" at least in some embodiments refers to a group of serving cells associated with a "Master Node" comprising a SpCell (PCell) and optionally one or more SCells. The term "Secondary Cell Group" or "SCG" at least in some embodiments refers to a subset of serving cells comprising a Primary SCell (PSCell) and zero or more SCells for a UE configured with DC. The term "Primary SCG Cell" refers to the SCG cell in which a UE performs random access when performing a reconfiguration with sync procedure for DC operation.

The term "Master Node" or "MN" at least in some embodiments refers to a NAN that provides control plane connection to a core network. The term "Secondary Node" or "SN" at least in some embodiments refers to a NAN providing resources to the UE in addition to the resources provided by an MN and/or a NAN with no control plane connection to a core network.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "IAB-node" at least in some embodiments refers to a RAN node that supports new radio (NR) access links to user equipment (UEs) and NR backhaul links to parent nodes and child nodes. The term "IAB-donor" at least in some embodiments refers to a RAN node (e.g., a gNB) that provides network access to UEs via a network of backhaul and access links.

The term "Transmission Reception Point" or "TRxP" at least in some embodiments refers to an antenna array with one or more antenna elements available to a network located at a specific geographical location for a specific area.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting Backhaul Adaptation Protocol (BAP), F1 application protocol (F1AP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Radio Unit" or "RU" at least in some embodiments refers to a logical node hosting PHY layer or Low-PHY layer and radiofrequency (RF) processing based on a lower layer functional split.

The term "split architecture" at least in some embodiments refers to an architecture in which an RU and DU are physically separated from one another, and/or an architecture in which a DU and a CU are physically separated from one another. The term "integrated architecture at least in some embodiments refers to an architecture in which an RU and DU are implemented on one platform, and/or an architecture in which a DU and a CU are implemented on one platform.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an access network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges NI signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "network function" or "NF" at least in some embodiments refers to a functional block within a network infrastructure that has one or more external interfaces and a defined functional behavior. The term "network service" or "NS" at least in some embodiments refers to a composition of Network Function(s) and/or Network Service(s), defined by its functional and behavioral specification(s).

The term "RAN function" or "RANF" at least in some embodiments refers to a functional block within a RAN architecture that has one or more external interfaces and a defined behavior related to the operation of a RAN or RAN node. Additionally or alternatively, the term "RAN function" or "RANF" at least in some embodiments refers to a set of functions and/or NFs that are part of a RAN.

The term "Application Function" or "AF" at least in some embodiments refers to an element or entity that interacts with a 3GPP core network in order to provide services. Additionally or alternatively, the term "Application Function" or "AF" at least in some embodiments refers to an edge compute node or ECT framework from the perspective of a 5G core network.

The term "edge compute function" or "ECF" at least in some embodiments refers to an element or entity that performs an aspect of an edge computing technology (ECT), an aspect of edge networking technology (ENT), or performs an aspect of one or more edge computing services running over the ECT or ENT.

The term "network function virtualization" or "NFV" at least in some embodiments refers to the principle of separating network functions from the hardware they run on by using virtualization techniques and/or virtualization technologies. Additionally or alternatively, the term "network function virtualization" or "NFV" involves the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge. The term "virtualized NF" or "VNF" at least in some embodiments refers to an implementation of an NF that can be deployed on a Network Function Virtualization Infrastructure (NFVI). Additionally or alternatively, the term "virtualized NF" or "VNF" at least in some embodiments refers to a software-based NF operating on multi-function, multi-purpose compute resources (e.g., x86, ARM processing architecture, and the like), which are used by NFV in place of dedicated physical equipment. The term "Network Functions Virtualization Infrastructure Manager" or "NFVI" at least in some embodiments refers to a totality of all hardware and software components that build up the environment in which VNFs are deployed. The term "Virtualized Infrastructure Manager" or "VIM" at least in some embodiments refers to a functional block that is responsible for controlling and managing the NFVI compute, storage and network resources, usually within one operator's infrastructure domain.

The term "virtualization container" or "container" at least in some embodiments refers to a partition of a compute node that provides an isolated virtualized computation environment. The term "OS container" at least in some embodiments refers to a virtualization container utilizing a shared Operating System (OS) kernel of its host, where the host providing the shared OS kernel can be a physical compute node or another virtualization container.

The term "virtual machine" or "VM" at least in some embodiments refers to a virtualized computation environment that behaves in a same or similar manner as a physical computer and/or a server. The term "hypervisor" at least in some embodiments refers to a software element that partitions the underlying physical resources of a compute node, creates VMs, manages resources for VMs, and isolates individual VMs from each other.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node"

used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. The term "protocol stack" at least in some embodiments refers to an implementation of a networking protocol suite or protocol family, wherein individual protocols within the suite are defined or designed for one or more specific purposes and each protocol module can be an individual layer of a stack of protocols.

The term "RAT type" at least in some embodiments may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also IEEE Standard for Local and Metropolitan Area Networks: Overview and Architecture, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.1 lad, IEEE 802.11ay, and the like); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., *IEEE Standard for Low-Rate Wireless Networks*, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, *IEEE Standard for Local and metropolitan area networks—Part 15.6: Wireless Body Area Networks*, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/ standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (*IEEE Standard for Information technology—Local and metropolitan area networks—Specific requirements—Part* 11*: Wireless LAN Medium Access Control* (*MAC*)*and Physical Layer* (*PHY*) *Specifications Amendment* 6*: Wireless Access in Vehicular Environments*, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "reliability" at least in some embodiments refers to the ability of a computer-related component (e.g., software, hardware, or network element/entity) to consistently perform a desired function and/or operate according to a specification. Additionally or alternatively, the term "reliability" at least in some embodiments refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "dataflow" or "data flow" at least in some embodiments refers to the movement of data through a system including software elements, hardware elements, or a combination of both software and hardware elements. Additionally or alternatively, the term "dataflow" or "data flow" at least in some embodiments refers to a path taken by a set of data from an origination or source to destination that includes all nodes through which the set of data travels.

The term "stream" at least in some embodiments refers to a sequence of data elements made available over time. At least in some embodiments, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some embodiments refers to a manner of processing in which an object is not represented by a complete logical data structure of nodes occupying memory proportional to a size of that object, but are processed "on the fly" as a sequence of events.

The term "distributed computing" at least in some embodiments refers to computation resources that are geographically distributed within the vicinity of one or more localized networks' terminations. The term "distributed computations" at least in some embodiments refers to a model in which components located on networked computers communicate and coordinate their actions by passing messages interacting with each other in order to achieve a common goal.

The term “service” at least in some embodiments refers to the provision of a discrete function within a system and/or environment. Additionally or alternatively, the term “service” at least in some embodiments refers to a functionality or a set of functionalities that can be reused.

The term “microservice” at least in some embodiments refers to one or more processes that communicate over a network to fulfil a goal using technology-agnostic protocols (e.g., HTTP or the like). Additionally or alternatively, the term “microservice” at least in some embodiments refers to services that are relatively small in size, messaging-enabled, bounded by contexts, autonomously developed, independently deployable, decentralized, and/or built and released with automated processes. Additionally or alternatively, the term “microservice” at least in some embodiments refers to a self-contained piece of functionality with clear interfaces, and may implement a layered architecture through its own internal components. Additionally or alternatively, the term “microservice architecture” at least in some embodiments refers to a variant of the service-oriented architecture (SOA) structural style wherein applications are arranged as a collection of loosely-coupled services (e.g., fine-grained services) and may use lightweight protocols.

The term “network service” at least in some embodiments refers to a composition of Network Function(s) and/or Network Service(s), defined by its functional and behavioral specification.

The term “session” at least in some embodiments refers to a temporary and interactive information interchange between two or more communicating devices, two or more application instances, between a computer and user, and/or between any two or more entities or elements. Additionally or alternatively, the term “session” at least in some embodiments refers to a connectivity service or other service that provides or enables the exchange of data between two entities or elements. The term “network session” at least in some embodiments refers to a session between two or more communicating devices over a network. The term “web session” at least in some embodiments refers to session between two or more communicating devices over the Internet or some other network. The term “session identifier,” “session ID,” or “session token” at least in some embodiments refers to a piece of data that is used in network communications to identify a session and/or a series of message exchanges.

The term “quality” at least in some embodiments refers to a property, character, attribute, or feature of something as being affirmative or negative, and/or a degree of excellence of something. Additionally or alternatively, the term “quality” at least in some embodiments, in the context of data processing, refers to a state of qualitative and/or quantitative aspects of data, processes, and/or some other aspects of data processing systems.

The term “Quality of Service” or “QoS’ at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term “Quality of Service” or “QoS’ at least in some embodiments refers to mechanisms that provide traffic-forwarding treatment based on flow-specific traffic classification. In some implementations, the term “Quality of Service” or “QoS” can be used interchangeably with the term “Class of Service” or “CoS”.

The term “Class of Service” or “CoS” at least in some embodiments refers to mechanisms that provide traffic-forwarding treatment based on non-flow-specific traffic classification. In some implementations, the term “Class of Service” or “CoS” can be used interchangeably with the term “Quality of Service” or “QoS”.

The term “QoS flow” at least in some embodiments refers to the finest granularity for QoS forwarding treatment in a network. The term “5G QoS flow’ at least in some embodiments refers to the finest granularity for QoS forwarding treatment in a 5G System (5GS). Traffic mapped to the same QoS flow (or 5G QoS flow) receive the same forwarding treatment.

The term “QoS Identifier” at least in some embodiments refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term “reliability flow” at least in some embodiments refers to the finest granularity for reliability forwarding treatment in a network, where traffic mapped to the same reliability flow receive the same reliability treatment. Additionally or alternatively, the term “reliability flow” at least in some embodiments refers to the a reliability treatment assigned to packets of a dataflow The term “reliability forwarding treatment” or “reliability treatment” refers to the manner in which packets belonging to a dataflow are handled to provide a certain level of reliability to that dataflow including, for example, a probability of success of packet delivery, QoS or Quality of Experience (QoE) over a period of time (or unit of time), admission control capabilities, a particular coding scheme, and/or coding rate for arrival data bursts.

The term “forwarding treatment” at least in some embodiments refers to the precedence, preferences, and/or prioritization a packet belonging to a particular dataflow receives in relation to other traffic of other dataflows. Additionally or alternatively, the term “forwarding treatment” at least in some embodiments refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "channel coding" at least in some embodiments refers to processes and/or techniques to add redundancy to messages or packets in order to make those messages or packets more robust against noise, channel interference, limited channel bandwidth, and/or other errors. For purposes of the present disclosure, the term "channel coding" can be used interchangeably with the terms "forward error correction" or "FEC"; "error correction coding", "error correction code", or "ECC"; and/or "network coding" or "NC".

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n-k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol.

The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service (see e.g., 3GPP TS 38.415 v16.6.0 (2021 Dec. 23) ("[TS38415]") and 3GPP TS 38.413 v16.8.0 (2021 Dec. 23) ("[TS38413]"), the contents of each of which are hereby incorporated by reference in their entireties); a PDU Session type can be IPv4, IPv6, IPv4v6, Ethernet, Unstructured, or any other network/connection type, such as those discussed herein. The term "PDU Session Resource" at least in some embodiments refers to an NG-RAN interface (e.g., NG, Xn, and/or E1 interfaces) and radio resources provided to support a PDU Session. The term "multi-access PDU session" or "MA PDU Session" at least in some embodiments refers to a PDU Session that provides a PDU connectivity service, which can use one access network at a time or multiple access networks simultaneously.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of [TS38300]), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "network socket" or "socket" at least in some embodiments refers to an element that serves as an endpoint for sending and receiving data across a network or for inter-process communication. The structure and properties of a socket can be defined by one or more APIs, and may be identified by a socket address or the like.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "data rate" at least in some embodiments refers to a transmission speed of a network. Additionally or alternatively, the term "data rate" at least in some embodiments refers to the amount of data transmitted during a specified time period and/or the speed at which data is transferred from one entity or element to another entity or element. Additionally or alternatively, the term "data rate" at least in some embodiments can be used interchangeably with the "bit rate", "data signaling rate", "symbol rate", "throughput", and/or "data transfer rate".

The term "bit rate" at least in some embodiments refers to the number of bits that are conveyed or processed per unit of time.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wired or wireless link between a transmitter and a receiver.

The term "throughput" or "network throughput" at least in some embodiments refers to a rate of production or the rate at which something is processed. Additionally or alternatively, the term "throughput" or "network throughput" at least in some embodiments refers to a rate of successful data delivery over a communication channel.

The term "goodput" at least in some embodiments refers to a number of useful information bits delivered by the network to a certain destination per unit of time.

The term "channel capacity" at least in some embodiments refers to an upper bound on the rate at which data can be reliably transmitted over a communication channel and/or given noise on a channel.

The term "bandwidth" at least in some embodiments refers to the maximum rate of data transfer across a given path. Additionally or alternatively, the term "bandwidth" at least in some embodiments refers to data carrying capacity of a network or transmission medium.

The term "delay" at least in some embodiments refers to a time interval between two events. Additionally or alternatively, the term "delay" at least in some embodiments refers to a time interval between the propagation of a signal and its reception.

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "processing delay" at least in some embodiments refers to an amount of time taken to process a packet in a network node.

The term "transmission delay" at least in some embodiments refers to an amount of time needed (or necessary) to push a packet (or all bits of a packet) into a transmission medium.

The term "propagation delay" at least in some embodiments refers to amount of time it takes a signal's header to travel from a sender to a receiver.

The term "network delay" at least in some embodiments refers to the delay of an a data unit within a network (e.g., an IP packet within an IP network).

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "latency" at least in some embodiments refers to the amount of time it takes to transfer a first/initial data unit in a data burst from one point to another.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "packet processor" at least in some embodiments refers to software and/or hardware element(s) that transform a stream of input packets into output packets (or transforms a stream of input data into output data); examples of the transformations include adding, removing, and modifying fields in a packet header, trailer, and/or payload.

The term "data pipeline" or "pipeline" at least in some embodiments refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments refers to a unit of data carried by a packet-switched network or otherwise associated with a packet-switched network. A datagram may be structured to have a header section or trailer section that carries control information and a payload section that carries user data. The term "datagram" at least in some embodiments may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in [IEEE80211], and/or other like data structures.

The term "information object" or "InOb" refers to a data structure that includes one or more data elements. each of which includes one or more data values. Examples of InObs include electronic documents, database objects, data files, resources, webpages, web forms, applications (e.g., web apps), services, web services, media, or content, and/or the like. InObs may be stored and/or processed according to a data format. Data formats define the content/data and/or the arrangement of data elements for storing and/or communicating the InObs. Each of the data formats may also define the language, syntax, vocabulary, and/or protocols that govern information storage and/or exchange. Examples of the data formats that may be used for any of the InObs discussed herein may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), Keyhole Markup Language (KML), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other data format and/or language discussed elsewhere herein.

The term "information element" or "IE" at least in some embodiments refers to a structural element containing one or more fields. Additionally or alternatively, the term "information element" or "IE" at least in some embodiments refers to a field or set of fields defined in a standard or specification that is used to convey data and/or protocol information.

The term "field" at least in some embodiments refers to individual contents of an information element, or a data element that contains content. The term "data frame" or "DF" at least in some embodiments refers to a data type that contains more than one data element in a predefined order. The term "data element" or "DE" at least in some embodiments refers to a data type that contains one single data. Additionally or alternatively, the term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data useable to locate other data and may be implemented a variety of ways (e.g., a pointer, an index, a handle, a key, an identifier, a hyperlink, etc.).

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, and/or other data structures, as comprising a sequence of optional or mandatory data elements (DEs), data frames (DFs), information elements (IEs), and/or the like. However, the requirements of any particular standard should not limit the scope of the present disclosure, and as such, any combination of containers, frames, DFs, DEs, IEs, values, components, fields, actions, features, and/or data structures are possible, including any combination of containers, frames, DFs, DEs, IEs, values, components, fields, actions, features, and/or data structures that are strictly required to be followed in order to conform to such standards or any combination of containers, frames, DFs, DEs, IEs, values, components, fields, actions, features, and/or data structures strongly recommended and/or used with or in the presence/absence of optional elements.

The present disclosure includes the aforementioned description and the accompanying drawings. The present disclosure shows and described, by way of examples and not of limitation, specific implementations in which the subject matter may be practiced. The present disclosure shows and describes the inventive aspects in sufficient detail to enable those skilled in the art to practice the teachings disclosed herein. Although the present disclosure shows and describes specific example implementations, various modifications and changes may be made to these implementations without departing from the broader scope of the present disclosure. Other aspects may be utilized and derived from the implementations discussed herein, such that structural and logical substitutions and changes may be made without departing from the scope of the present disclosure. The present disclosure is not to be taken in a limiting sense, and the scope of various aspects is defined by the appended claims, along with the full range of equivalents to which such claims are entitled.

The invention claimed is:

1. An apparatus employed as a Radio Access Network (RAN) function in a disaggregated RAN architecture that includes a plurality of RAN functions, the apparatus comprising:

memory circuitry to store program code of the RAN function; and processor circuitry connected to the memory circuitry, wherein the processor circuitry is to execute the program code to:

receive, from a RAN controller, configuration data including information for routing edge data to an edge compute function, receive, from a user equipment (UE), a network packet including edge data intended for delivery to an edge computing application (app) based on scheduling information, extract the edge data from the network packet using data extraction information in the configuration data, send the extracted edge data to an edge compute function, obtain processed edge data from the edge compute function, insert the processed edge data into the network packet, and send the network packet towards a destination node;

wherein:

the edge compute function is to be configured based upon UE context information of the UE and network address forwarding information.

2. The apparatus of claim 1, wherein the memory circuitry is to store an edge-specific dataflow of a network protocol stack, and the processor circuitry is to execute the program code to:

operate edge-specific dataflow to process the extracted edge data for consumption by the edge compute function.

3. The apparatus of claim 2, wherein, to insert the processed edge data into the network packet, the processor circuitry is to execute the program code to:

operate edge-specific dataflow to rebuild the network packet to include the processed edge data.

4. The apparatus of claim 2, wherein:

the RAN function is configured to perform one or more sublayers of a network protocol stack, other RAN functions of the plurality of RAN functions are configured to perform other sublayers of the network protocol stack, and the edge-specific dataflow includes performing operations of the one or more sublayers and performing operations of lightweight versions of the other sublayers of the network protocol stack.

5. The apparatus of claim 4, wherein the edge-specific dataflow includes one or more of a set of core network functions, a transport layer protocol, a network layer protocol, and an application layer protocol.

6. The apparatus of claim 4, wherein the network protocol stack is a Third Generation Partnership Project (3GPP) Fifth Generation (5G) New Radio (NR) protocol stack including a low physical (PHY) sublayer, a high-PHY sublayer, a Medium Access Control (MAC) sublayer, a Radio Link Control (RLC) sublayer, a Packet Data Convergence Protocol (PDCP) sublayer, a Service Data Protocol (SDAP) sublayer, a Backhaul Adaptation Protocol (BAP) sublayer, and an F1 application protocol (F1AP) sublayer.

7. The apparatus of claim 6, wherein the one or more sublayers of the RAN function include the MAC sublayer and the high-PHY sublayer.

8. The apparatus of claim 6, wherein:

the scheduling information includes one or more resource blocks (RBs), and the scheduling information includes a slot number in which the network packet is to be carried, a number of orthogonal frequency division multiplexing (OFDM) symbols used to carry the network packet, a cell radio network temporary identifier (C-RNTI), and a modulation and coding scheme (MCS); and the data extraction information includes a time slot in which the network packet is to be carried, In-phase and Quadrature (I/Q) symbol mapping information, a network address for forwarding data in an uplink (UL) direction, and a network address for data insertion in a downlink (DL) direction.

9. The apparatus of claim 4, wherein the network protocol stack is a Institute of Electrical and Electronics Engineers 802 (WiFi) protocol stack including a low-PHY sublayer, a high-PHY, a MAC sublayer, and a logical link control (LLC) sublayer, and the one or more sublayers of the RAN function include the MAC sublayer and the high-PHY sublayer, and wherein the scheduling information includes traffic specification (TSPEC) data or network allocation vector (NAV) setting information.

10. The apparatus of claim 1, wherein the processor circuitry is to execute the program code to:

configure the edge compute function with edge compute information and edge data information, wherein the edge compute information includes user data context information, edge data processing information, and output forwarding information including an ID of an element to which the processed edge data is to be output, and wherein the edge data information includes the UE context information of the UE, a network address for forwarding data in a UL direction, and a network address for data insertion in a DL direction.

11. The apparatus of claim 10, wherein, to extract the edge data from the network packet, the processor circuitry is to execute the program code to: extract the edge data from a data field of the network packet indicated by the data extraction information.

12. The apparatus of claim 11, wherein the processor circuitry is to execute the program code, before sending the extracted edge data to the edge compute function, to:

perform one or more preprocessing operations on the extracted edge data, wherein the one or more preprocessing operations on the extracted edge data includes frame ordering operations and cyclic redundancy check (CRC) operations; and perform one or more processing operations on the extracted edge data, wherein the one or more processing operations on the extracted edge data includes one or more of decoding operations, de-mapping operations, de-encapsulation operations, decryption operations, translation operations, and transformation operations.

13. The apparatus of claim 12, wherein the processor circuitry is to execute the program code to:

perform one or more application layer processing operations on the extracted edge data before sending the extracted edge data to the edge compute function and after performing the one or more preprocessing operations and the one or more processing operations, wherein the one or more application layer processing operations include one or more of provisioning control information elements, flow control, data forwarding handling, performing one or more request methods, resolving a domain name or uniform resource locator (URL), storing data, and accessing data.

14. The apparatus of claim 13, wherein the processor circuitry is to execute the program code to:

perform one or more application layer processing operations on the processed edge data obtained from the edge compute function, wherein the one or more application layer processing operations include one or more of provisioning control information elements, flow control, data forwarding handling, performing one or more request methods, resolving a domain name or URL, storing data, accessing data, and formatting the edge data for consumption by a transport layer protocol.

15. The apparatus of claim 14, wherein the processor circuitry is to execute the program code, before inserting the extracted edge data into the network packet and after performing the one or more application layer processing operations, to:

perform one or more preprocessing operations on the processed edge data, wherein the one or more preprocessing operations on the processed edge data includes frame ordering operations and CRC operations; and perform one or more processing operations on the processed edge data, wherein the one or more processing operations on the processed edge data includes one or more of encoding operations, mapping operations, encapsulation operations, encryption operations, translation operations, and transformation operations.

16. The apparatus of claim 1, wherein the destination node is the UE, another UE, a RAN node, a RAN function, an edge compute node, a cloud computing service, a web platform, an application server, or a database.

17. The apparatus of claim 1, wherein the plurality of RAN functions include one or more remote units (RUs), one or more distributed units (DUs), and one or more centralized units (CUs), wherein the one or more RUs are connected to the one or more DUs via respective next generation fronthaul interface (NGFI)-I links, the one or more DUs are connected to the one or more CUs via respective NGFI-II links, and the one or more CUs are connected to one or more core network functions via respective backhaul links.

18. A method of operating an edge compute function in association with a Radio Access Network (RAN) function in a disaggregated RAN architecture, the disaggregated RAN architecture including a plurality of RAN functions, the method comprising:

receiving, by the edge compute function from a RAN controller, edge compute information and edge data information based on one or more edge services provided by the edge compute function;

receiving, by the edge compute function, edge data extracted from a network packet by at least one RAN function of the plurality of RAN functions;

processing the extracted edge data by operating the one or more edge apps to provide the one or more edge services involving the extracted edge data; and providing the processed edge data to a destination node indicated by the edge compute information or the edge data information;

wherein:

the edge compute function is to be configured based upon user equipment (UE) context information of a UE and network address forwarding information.

19. The method of claim 18, wherein the method includes:

receiving the edge compute information and the edge data information directly from the RAN controller; or receiving the edge compute information and the edge data information via the RAN function associated with the edge compute function.

20. The method of claim 18, wherein:

the edge compute information includes user data context information, edge data processing information, and output forwarding information including an identifier of an element to which the processed edge data is to be output; and the edge data information includes the UE context information of the UE, a network address for forwarding data in a UL direction, and a network address for data insertion in a DL direction.

21. The method of claim 18, wherein the at least one RAN function is the RAN function associated with the edge compute function or another RAN function not co-located with the edge compute function.

22. The method of claim 21, wherein the at least one RAN function implements a Medium Access Control (MAC) scheduler.

23. The method of claim 18, wherein the destination node is the at least one RAN function, another RAN function, a UE that generated the edge data, another UE, another edge compute function, a cloud computing service, one or more app servers, or a remote database.

* * * * *